Dec. 27, 1960 R. WALKER ET AL 2,966,669
AUTOMATIC SYNCHRO TESTING AND RECORDING APPARATUS
Filed Aug. 6, 1958 16 Sheets-Sheet 1

R. WALKER
J. G. CALLAHAN
G. P. MASELLI
R. J. KELLY
S. ALVINE, JR.
INVENTORS

BY

ATTORNEYS

INVENTORS
RUSSEL WALKER
J.G. CALLAHAN
G.P. MASELLI
R.J. KELLY
S. ALVINE, JR.

BY

ATTORNEYS

Dec. 27, 1960     R. WALKER ET AL     2,966,669
AUTOMATIC SYNCHRO TESTING AND RECORDING APPARATUS
Filed Aug. 6, 1958     16 Sheets-Sheet 4

R. WALKER
J.G. CALLAHAN
G.P. MASELLI
R.J. KELLY
S. ALVINE, JR.

INVENTORS

BY

ATTORNEYS

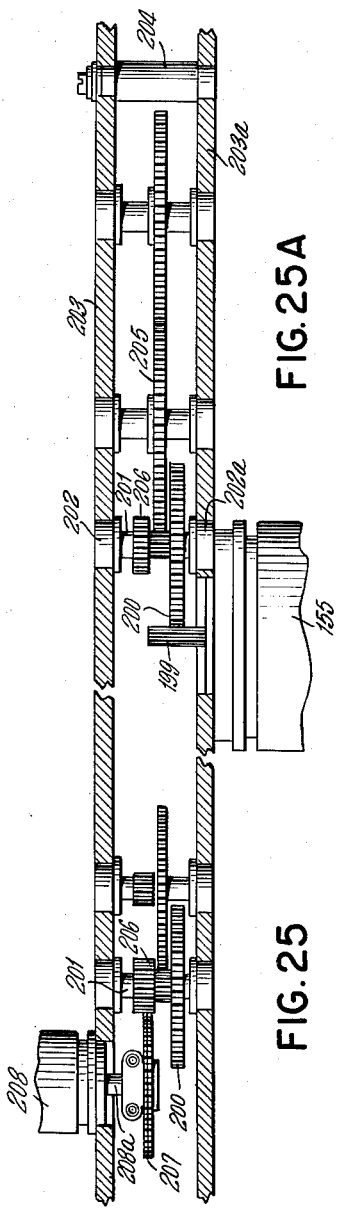
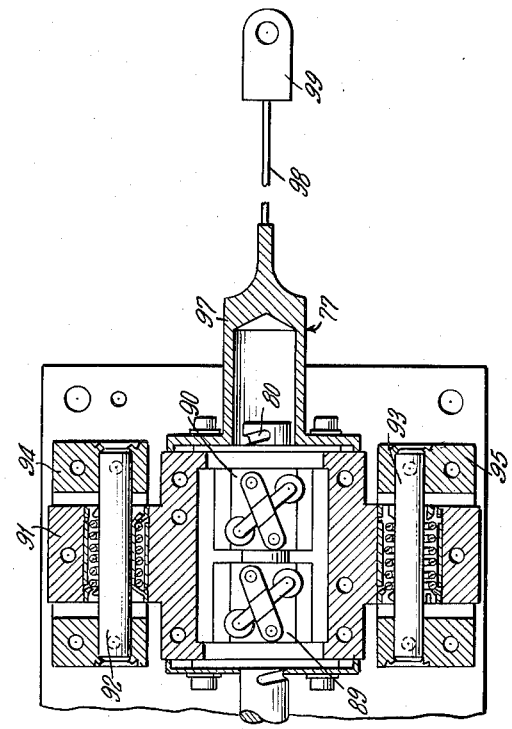
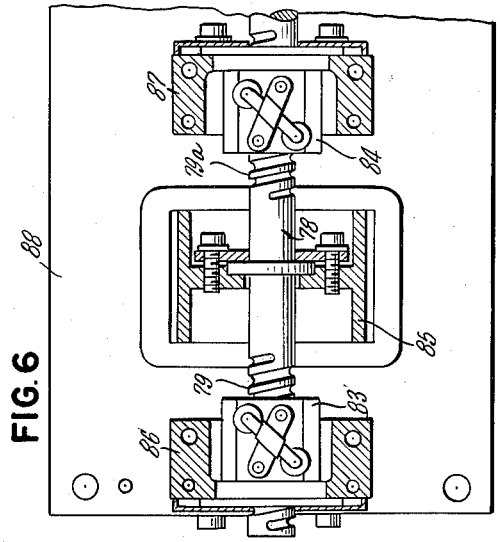

Dec. 27, 1960     R. WALKER ET AL     2,966,669
AUTOMATIC SYNCHRO TESTING AND RECORDING APPARATUS
Filed Aug. 6, 1958     16 Sheets-Sheet 7

INVENTORS
R. WALKER
J.G. CALLAHAN
G.P. MASELLI
R.J. KELLY
S. ALVINE, JR
BY
ATTORNEYS

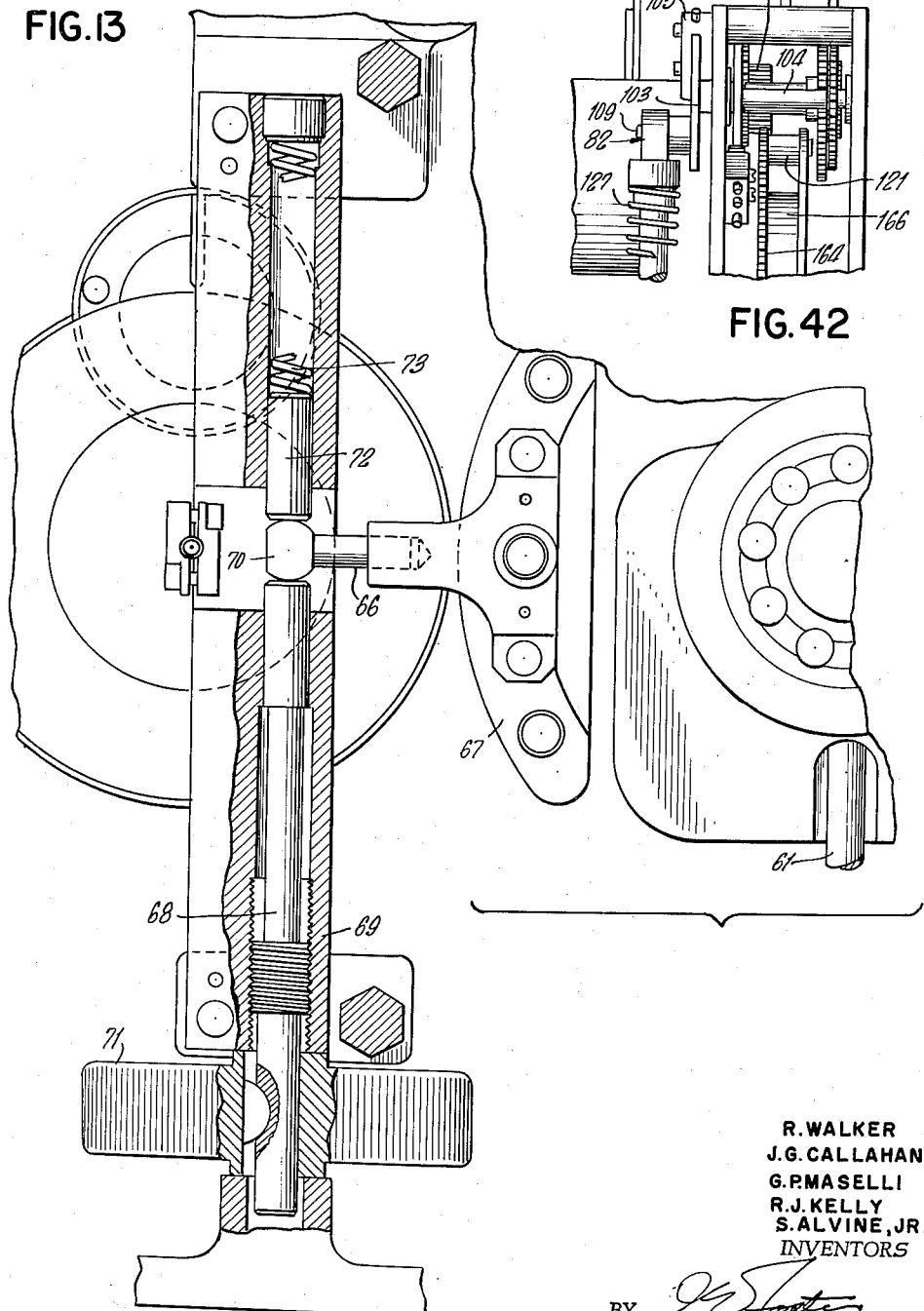
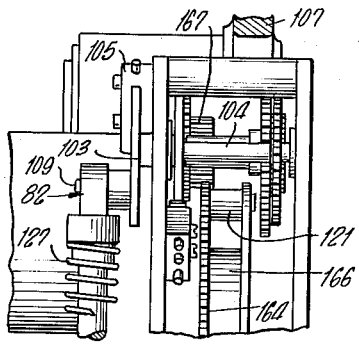

Dec. 27, 1960     R. WALKER ET AL     2,966,669
AUTOMATIC SYNCHRO TESTING AND RECORDING APPARATUS
Filed Aug. 6, 1958     16 Sheets-Sheet 9

R. WALKER
J.G. CALLAHAN
G.P. MASELLI
R.J. KELLY
S. ALVINE, JR.
INVENTORS

BY

ATTORNEYS

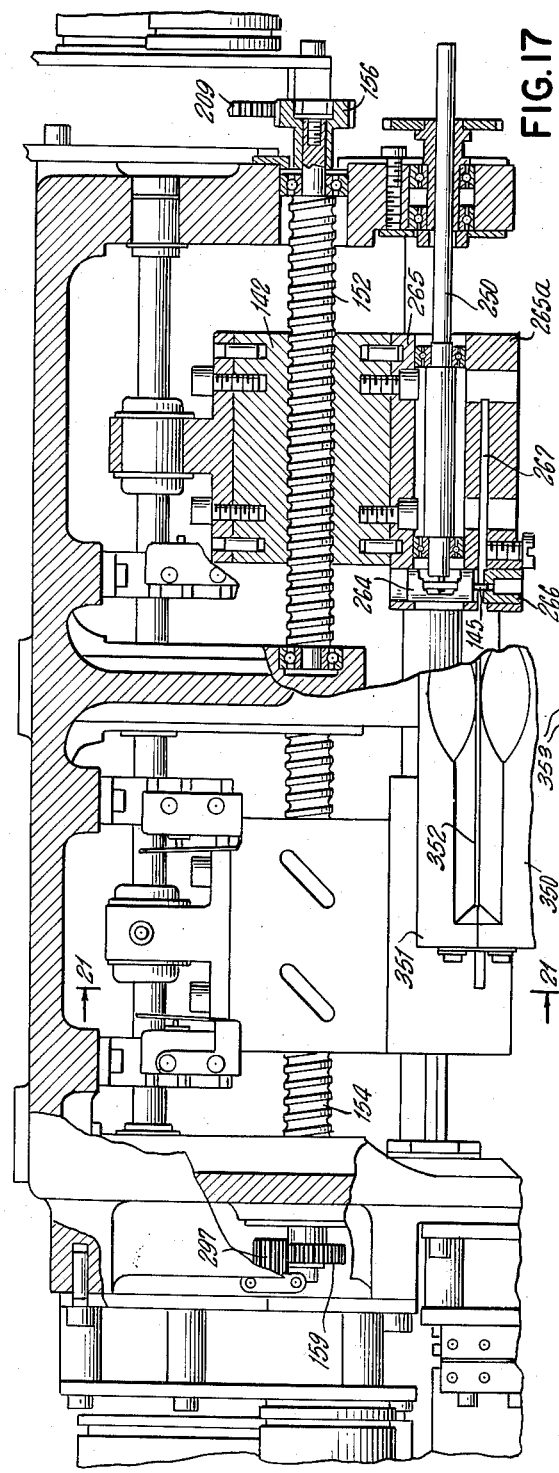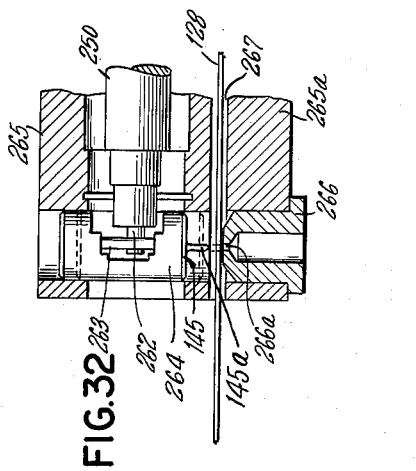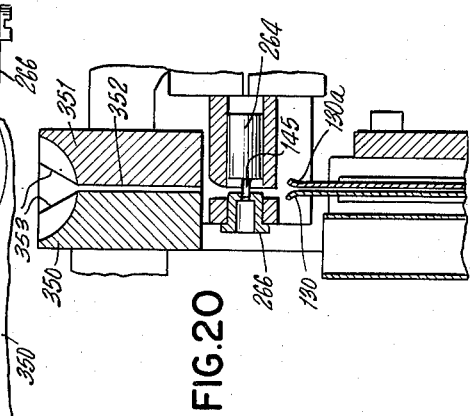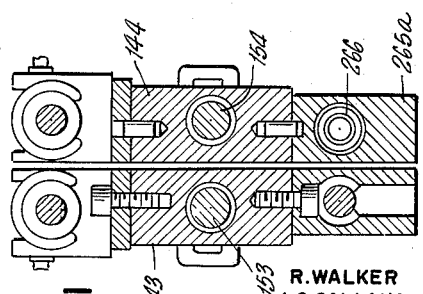

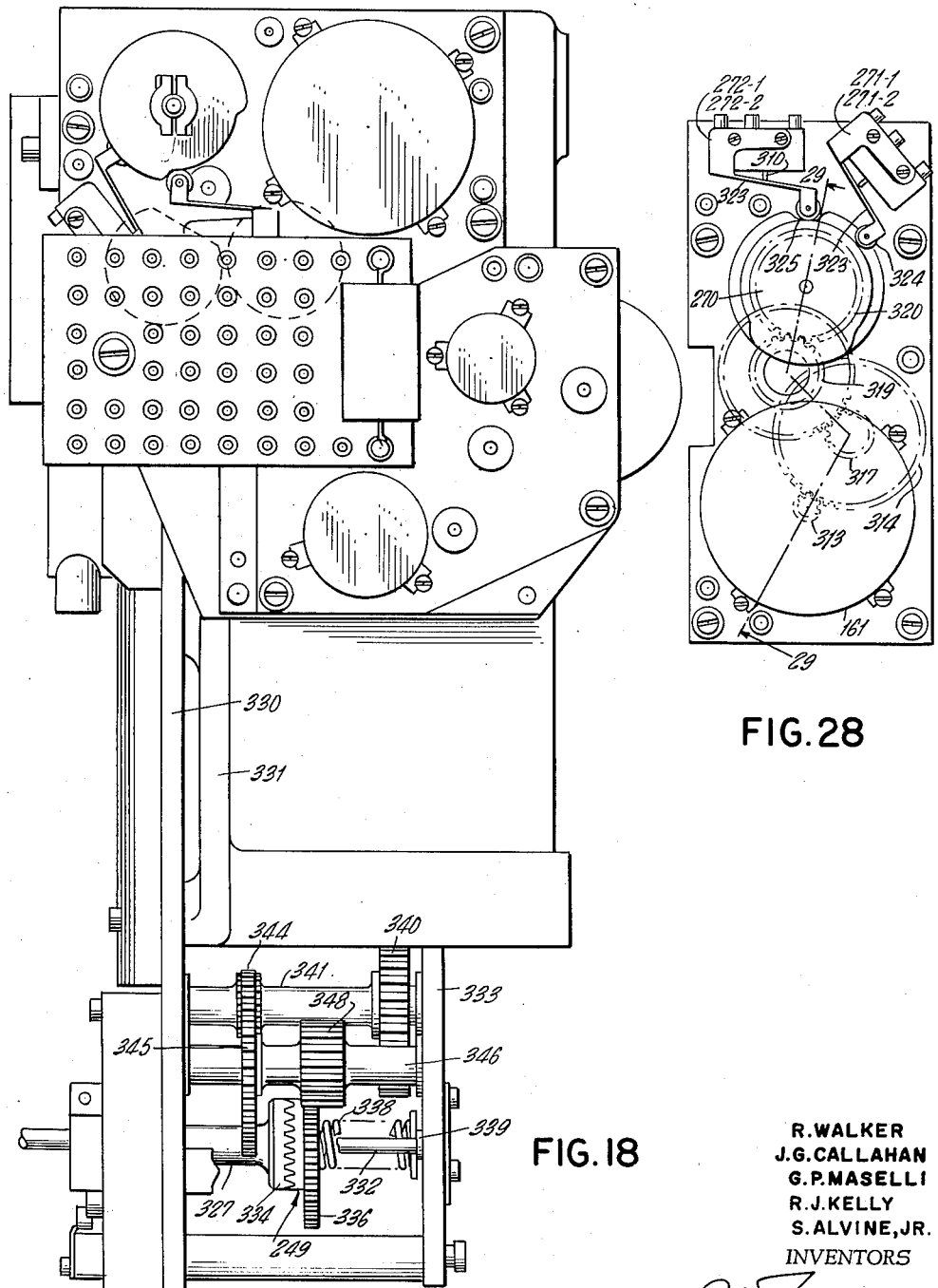

Dec. 27, 1960  R. WALKER ET AL  2,966,669
AUTOMATIC SYNCHRO TESTING AND RECORDING APPARATUS
Filed Aug. 6, 1958  16 Sheets—Sheet 12

INVENTORS
R. WALKER
J. G. CALLAHAN
G. P. MASELLI
R. J. KELLY
S. ALVINE, JR.
BY
ATTORNEYS

Dec. 27, 1960  R. WALKER ET AL  2,966,669
AUTOMATIC SYNCHRO TESTING AND RECORDING APPARATUS
Filed Aug. 6, 1958  16 Sheets-Sheet 13

INVENTORS
R. WALKER
J.G. CALLAHAN
G.P. MASELLI
R.J. KELLY
S. ALVINE, JR.
BY
ATTORNEYS

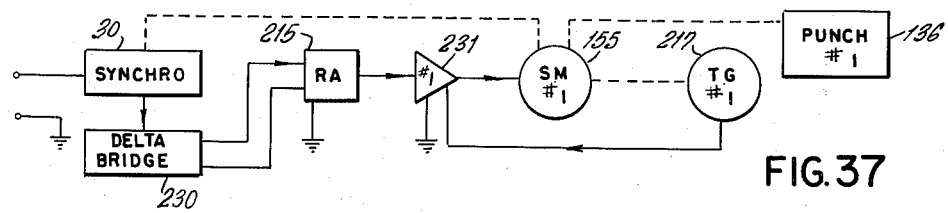
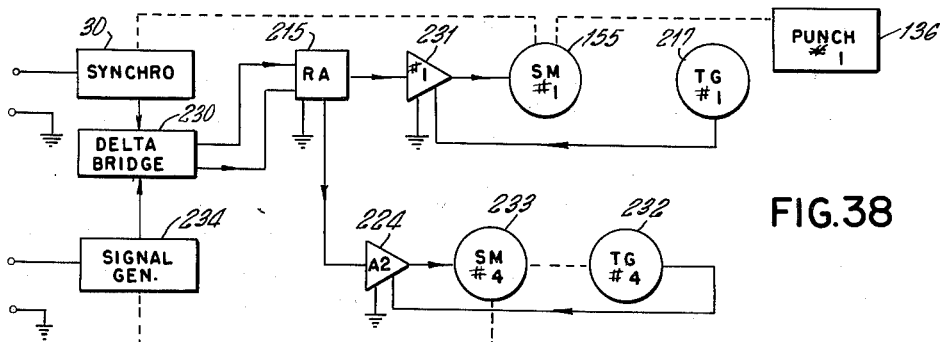
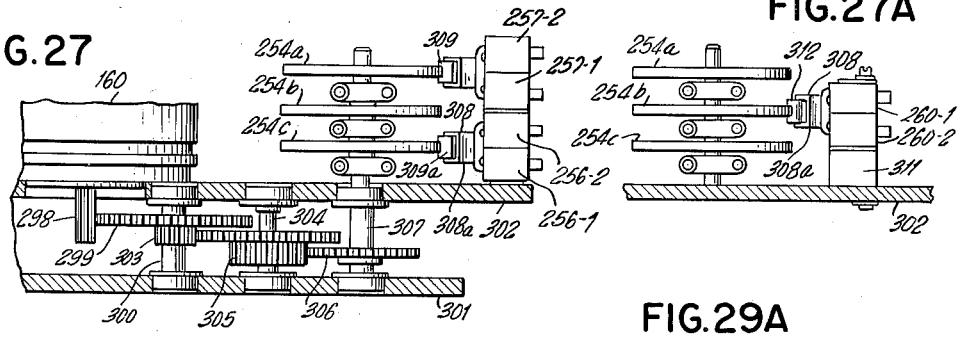
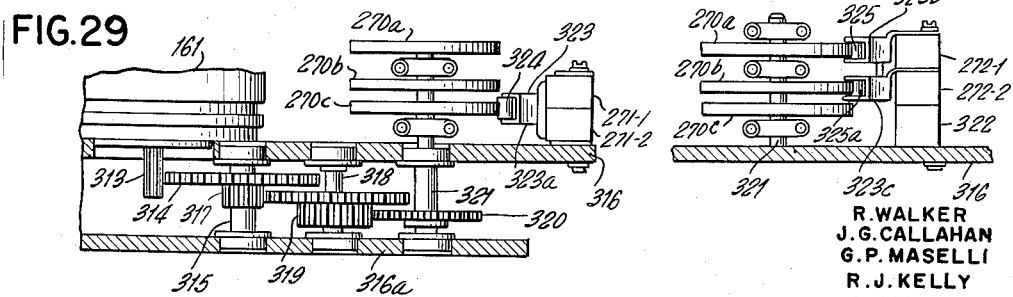

Dec. 27, 1960    R. WALKER ET AL    2,966,669
AUTOMATIC SYNCHRO TESTING AND RECORDING APPARATUS
Filed Aug. 6, 1958    16 Sheets-Sheet 15

R. WALKER
J.G. CALLAHAN
G.P. MASELLI
R.J. KELLY
S. ALVINE
    INVENTORS

Dec. 27, 1960    R. WALKER ET AL    2,966,669
AUTOMATIC SYNCHRO TESTING AND RECORDING APPARATUS
Filed Aug. 6, 1958    16 Sheets-Sheet 16

R. WALKER
J. G. CALLAHAN
G. P. MASELLI
R. J. KELLY
S. ALVINE, JR.
INVENTORS

BY

ATTORNEYS

United States Patent Office 2,966,669
Patented Dec. 27, 1960

2,966,669

AUTOMATIC SYNCHRO TESTING AND RECORDING APPARATUS

Russel Walker, North Caldwell, Robert J. Kelly, Old Tappan, Joseph G. Callahan, Hackensack, Samuel Alvine, Jr., Bloomfield, and George P. Maselli, Dumont, N.J., assignors to General Precision, Inc., a corporation of Delaware Filed Aug. 6, 1958, Ser. No. 753,556

16 Claims. (Cl. 340—315)

This invention relates to the testing of synchros and is particularly directed to a machine for automatically and accurately testing synchro devices to determine the electrical and mechanical characteristics thereof over a range of predetermined angular increments, and at various angular positions of the rotor shaft relative to the synchro stator, and to permanently record the results of such tests, so that they will readily be available as a permanent record.

In their usual operation, synchro transmitters and repeater devices are coupled in such a manner as to accurately transmit from one unit to another, the angular position of the rotor of the transmitter device, or an increment or variation thereof, to a receiver mounted at another point. It is therefore essential that all variations from the required angular position of the rotor shaft, be held within accurately controlled predetermined limits, so that any angular variations encountered be held within allowable limitations for a particular type of application.

Due to the extreme accuracy required in the operation of synchros, and the fact that errors in rotational angular shaft position are frequently multiplied in a servo mechanism or servo system in which the synchro is used, it is essential that each synchro be accurately tested to ascertain its conformity with established standards before it can be incorporated in a system.

While various methods of testing synchros have been available, they are usually manually controlled and operated, the tests being individually conducted and the individual readings manually recorded, so that the process of conducting a long sequence of tests at a large number of angular shaft positions or increments necessarily consumes a great deal of time and is therefore relatively costly. Furthermore, due to the fact that in conducting a series of tests, it is necessary for the operator to mount the unit in several different types of apparatus, the element of human error in adjustment of the apparatus and mounting the synchro and in recording of the readings taken, enters into various phases of the testing, so that such tests are frequently unreliable and vary in their degrees of uniformity.

As the variations between the angular positions of the synchro rotor shaft relative to the stator thereof, frequently vary with the angular position of the rotor shaft and are not uniform, it is necessary that at least some of the tests performed be conducted at uniform angular increments during a complete revolution of the synchro rotor shaft, while other tests are conducted at spaced angular increments or at specific rotational angular positions of the synchro rotor shaft relative to the stator thereof.

Due to the accuracy required in conducting these tests and the multiplicity of tests required, the testing of synchros, both at the plant of the manufacturer thereof and by the user before installation, or after they have been in use, has always been relatively costly and time consuming, as it was necessary to conduct each test individually and to rotate the synchro rotor shaft through uniform angular increments and to various other angular positions required and to record the results of the tests completely and accurately.

Due to the repetitive nature of the tests and the fact that they are of necessity performed by persons not highly skilled, deviations in setting, reading and recording would creep in, so that it was frequently necessary to repeat and recheck these tests in order to determine the acceptability of a particular synchro, in accordance with established standards.

As these synchros are produced in quantities, and as the cost of manufacture and testing is an important factor, the relative cost of testing individual synchros and recording the results of such tests represented a substantial part of the overall cost of manufacturing the units.

Synchros are also made in a wide range of sizes and types, so that it is necessary that either a testing unit, or units be produced for each type and size of synchro, or that the test equipment be so constructed that it is adapted to mount and test a wide range of sizes and types of synchros.

Due to variations in human skill, and the wide variations in test equipment employed, difficulties frequently arise because tests conducted at the plant of the user of the synchros do not agree with tests on the same synchro conducted at the plant of the synchro manufacturer.

A primary feature of the invention is that the apparatus can be utilized to conduct, at one sequence and at one mounting and setting, substantially of the electrical and mechanical tests required to determine the acceptability of a synchro, all of the tests being conducted at one setting to assure a uniform initial basic adjustment, and to obtain a uniform permanent record of each test, which is easily read and interpreted, and in which the record cannot be tampered with or altered, either while the tests are being conducted or after they are completed.

Another feature of the construction is that essentially the same basic apparatus can be utilized for testing a wide range of types and sizes of synchros, provision being made for the accurate replacement of mounting and support structures and electrical control and measuring elements, so that the machine can be adapted for use with any size or type of synchro in a specified range, within a minimum of time and while maintaining uniform testing accuracy at all times.

Another feature of the invention is that the records are made in multiple, so that duplicate copies thereof are available without affecting the accuracy of the tests, or the time required in conducting them.

A major feature of the device is that the results of individual tests can be compared at frequent intervals with tests conducted on reference standard synchros, utilizing the same basic apparatus, and the same mechanical adapters and electronic components, so that any errors in the accuracy of the machine in any of the tests conducted thereby can readily be determined and any necessary replacements or adjustments made, thus maintaining uniform testing accuracy at all times, and at geographically varying points.

A primary feature of the operation of the invention is that once the initial angular relation between the rotor shaft and the stator of the synchro are established, all other angular positions required are automatically established and the corresponding readings automatically recorded, so that the possibility of human error in either positioning the synchro rotor shaft, or reading and recording the results of the individual tests is almost entirely eliminated.

Another feature of the apparatus is that tests conducted at uniform angular increments and individual tests conducted at predetermined angular positions are conducted either simultaneously, or in direct sequence and at the same angular settings, so that the possibility of introducing angular variations between one set of tests and another is eliminated.

Another feature of the apparatus is that interchangeable, readily replaceable electrical control units can be mounted in the apparatus for testing each type and size of synchro, so that the same fundamental circuits can be used in the apparatus over a wide range of synchro voltages, and current input cycles.

Provision is also made so that if a synchro under test is obviously substandard at any one angular position, the rate of operation of the machine can be accelerated and other subsequent tests by-passed in order to reduce to a minimum the time required in testing obviously rejected synchros.

Essentially the same recycling control can also be utilized for accurately resetting the rotor shaft of a synchro under test to any required angular position to conduct special angular position tests, or to recheck tests at specific angular positions without going through the entire test cycle.

The testing apparatus is also so constructed that an individual operator can handle the testing on a plurality of machines simultaneously, the time required for mounting, adjusting and removing a synchro being only a fraction of the time required for conducting a complete set of tests, the operation and angular positioning of the machine being fully automatic after the initial angular position of the synchro stator relative to the rotor shaft of the synchro under test is adjusted.

Another feature of the construction is that test results are recorded by simultaneously punching a plurality of duplicate cards, graduations being provided on each card so that the position of each punch at each angular position, or as the result of a particular test, is so scaled relative to a base indicator as to indicate by inspection the percentage of error or variation from the nominal or established basic positions, the variations from the nominal or established reading at each angular position, or each reading, as a percentage variation, thus enabling an operator to determine by inspection and visual examination, without interpolation, whether a particular synchro meets an established set of standards and if there is any excessive variation at any angular position or in any particular test, thus clearly indicating the points at which the synchro fails to meet the established standards.

The primary object of the invention is therefore to provide an automatic device for testing synchros, which is fully automatic in its operation, can be operated by relatively unskilled personnel, and in which all necessary readings and comparisons at various angular rotor shaft positions are accurately, permanently and indelibly recorded, and in which human error in adjustment and reading is eliminated insofar as practicable, and in which such tests can be conducted on a production scale at only a fraction of the cost normally required on the usual equipment available.

A further object is to provide a machine in which a synchro can accurately be mounted, supported, and the angular position of the stator relative to the rotor thereof adjusted by a relatively unskilled operator without the use of special tools or other auxiliary equipment.

Another object of the invention is to provide a testing machine, in which a single operator can operate a plurality of machines simultaneously, all operations, following the initial mounting and positioning of the synchro stator and the rotor shaft thereof, being fully automatic.

Another object is to provide a machine which can be utilized with equal facility for testing a wide range of sizes and types of synchros, provision being made for mounting interchangeable units for receiving and supporting the synchro stator and the rotor shaft, and for accommodating the electrical characteristics and voltage cycles of a particular synchro type, without affecting the basic construction of the machine and the operation thereof in any manner.

Another object is to provide a machine in which the readings are permanently and indelibly recorded, in multiple, on record cards, the cards being so designated that the position of the punch marks thereon indicates the percentage of error at a particular position or test, the set of cards being mounted in such a manner that the proper starting positioning of the cards and the guide which supports them automatically initiates the flow of electric current required in the operation of the machine, and permits the operating cycle of the machine to be initiated.

A major object is to provide a device in which the electrical characteristics of a synchro can accurately be measured and determined at various predetermined angular rotor shaft positions, the electrical characteristics being measured and determined by specific established standards, the variations in characteristics being automatically amplified and converted, where necessary, so that such variations may be utilized to position and actuate a plurality of punches which are so positioned relative to the record cards, that they indicate visually, the percentage variations between the required electrical characteristics and those of a particular synchro under test.

Provision is therefore made for the utilization of automatically controlled servo motors which are controlled by readings of electrical characteristics taken at predetermined angular positions, the readings taken and the variations thereof being amplified and converted automatically and electronically, so that they automatically control the positioning and operation of a co-ordinated punching device, the punches of which punch the designated readings at predetermined points on a set of record cards and indicate visually the percentage variation between the reading as determined by the electrical components provided and the required nominal reading at each angular position of the synchro shaft and of each specific characteristic of the synchro.

Another feature of the apparatus is that the voltage and current characteristics measured are amplified and converted to such an extent that the amount of measured voltage or current actually utilized for operating and controlling the recording apparatus, is reduced in significance to such an extent, and external power circuits and amplifiers provided, so that the variations between the indicated voltage, power and current readings, and the actual conditions of the synchro power and current are reduced to an absolute minimum, thus assuring accurate measuring and recording of the readings regardless of the magnitude and character thereof.

Another feature of the machine is that all electrical components, switches, connections and panel boards are so mounted, that individual components can readily be replaced, and terminals, switches and wiring altered or replaced without interrupting in any manner or interfering with the portion of the appaartus which supports and adjusts the synchro rotor shaft relative to the stator thereof, so that the angular positions of the synchro rotor shaft are entirely unaffected by any replacement or adjustment necessary to the electrical control and measuring apparatus.

Another feature of the construction is that all connections and controls necessary to mount and adjust the synchro, and control and operate the apparatus, are conveniently mounted at the front panel thereof, so that the operator does not in any manner interfere with the setting or adjustment of the functional parts of the apparatus when a synchro is mounted therein or adjusted, or when the test is started, or altered in any manner during the conduct thereof.

Another feature of the construction is that a universal connection is introduced between one end of the shaft to which the synchro rotor shaft is connected, and the opposite end thereof, which supports the angular positioning and adjustment mechanism, in order to minimize the effect of any axial variations or misalignment between the synchro rotor shaft and the angular positioning or indexing plate.

The accompanying drawings, illustrative of one embodiment of the invention, together with the description of its construction and the method of operation, adjustment and utilization thereof, will serve to clarify further objects and advantages of the invention.

In the drawings:

Figure 1 is a front elevational view of the case of the synchro testing machine shown in Figures 2 and 3, showing the interchangeable synchro support adapter and plate, the release pedal; also showing the clamp jaws which support the synchro stator, the fine null adjustment knob, the E-Z null indicator, the testing position indicator, an interchangeable range adapter, the record card control push button, and the test control switches, with a set of record cards shown inserted in the card guide and card control mechanism, the synchro stator clamping jaws being shown moved to the release position in dot-dash lines.

Figure 2 is a longitudinal section through the central portion of the apparatus shown in Figures 1 and 3, showing the tubular shaft connecting the synchro rotor shaft to the index plate, the flexible means supporting the index plate end of the tubular shaft to take up any variations between the center of rotation of the index plate and the axis of rotation of the synchro rotor shaft, the clamp jaws supporting the synchro stator, the collet gripping the synchro rotor shaft, the interchangeable adapter plate mechanism supporting the synchro stator, and a portion of the release lever operative to release the synchro stator support jaws and the rotor shaft support collet, taken on the line 2—2, Fig. 1.

Figure 3 represents a partial longitudinal section and partial side elevation of the synchro tester shown in Figures 1, 2 and 4, showing the case, the drive shaft connecting the synchro rotor shaft to the index plate, the index plate control mechanism and the brush and contact discs, shown in greater detail in Figure 7, also a portion of the release lever operative to release the synchro rotor shaft and the stator gripping members, shown in Figure 2, as well as the release pedal attached to the release lever, taken on the line 3—3, Figure 1.

Figure 4 is a rear elevation of a portion of the apparatus shown in Figures 1, 2 and 3, showing the index plate, which is connected to the synchro rotor shaft, and the tangent arm actuating mechanism, which is operative to progressively angularly move the index plate through uniform angular increments, and adjust the angular variations of the synchro rotor shaft at each of the index plate angular positions, the Geneva movement assembly, and a plurality of cams and switches actuated thereby, taken on the line 4—4, Figure 3.

Figure 6 is a partial vertical section and partial rear elevational view of the tangent arm and fine null adjustment mechanism shown in Figure 4, which adjusts the angular variations between the nominal angular positions of the index plate and the synchro rotor shaft, and the actual angular null positions established by the electronic control mechanism, taken on the line 6—6, Figure 3.

Figure 3:
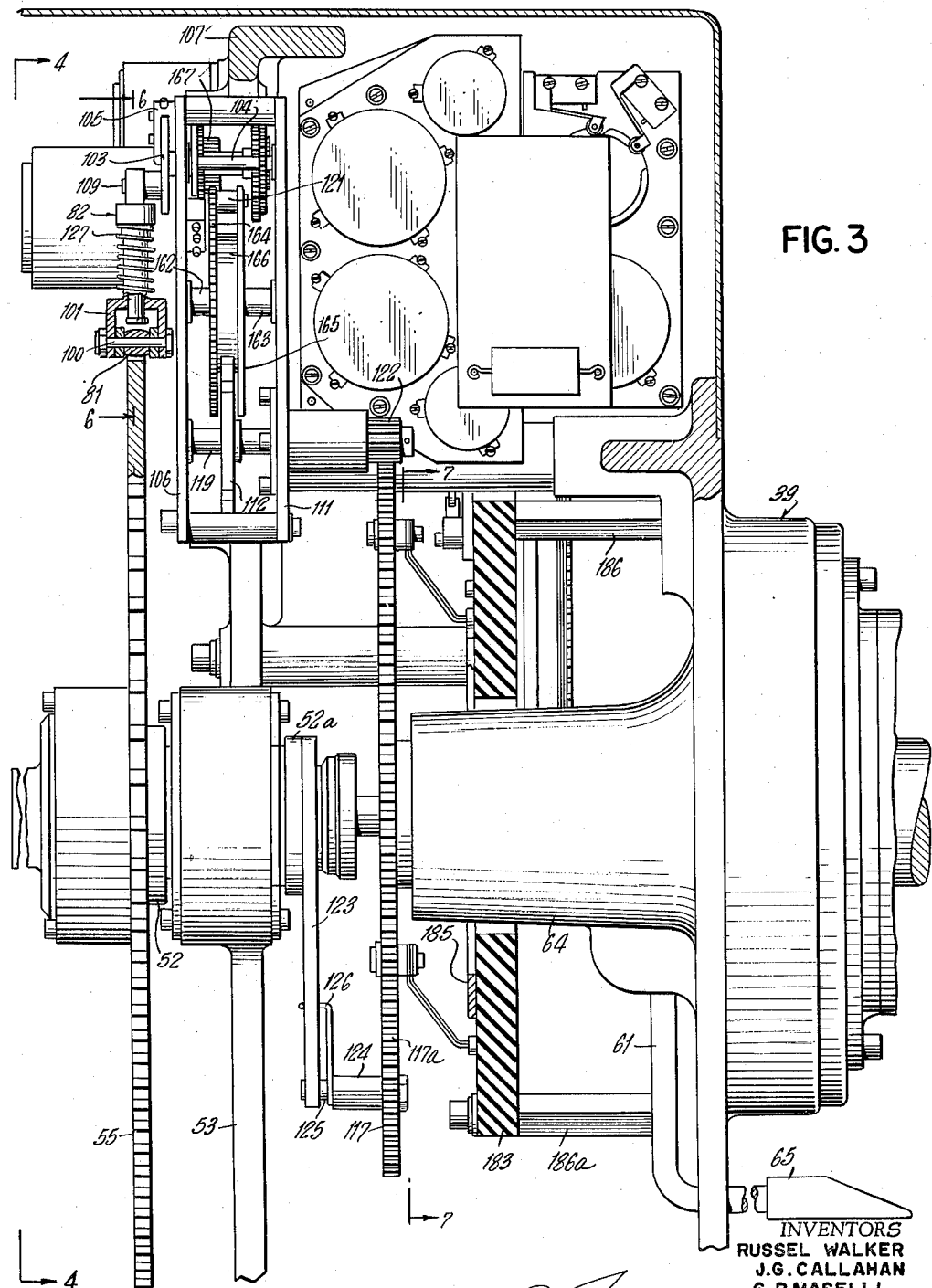

Figure 7 is a partial rear elevational view of the circular switch support disc shown in Figure 3, showing the relative angular position of some of the radially positioned microswitches supported thereby, and the relation between the actuator rollers of the microswitches and the control pins which are used to operate the microswitches, the control pins projecting beyond the face of a gear mounted parallel to the switch support disc, taken on the line 7—7, Figure 3.

Figure 2:
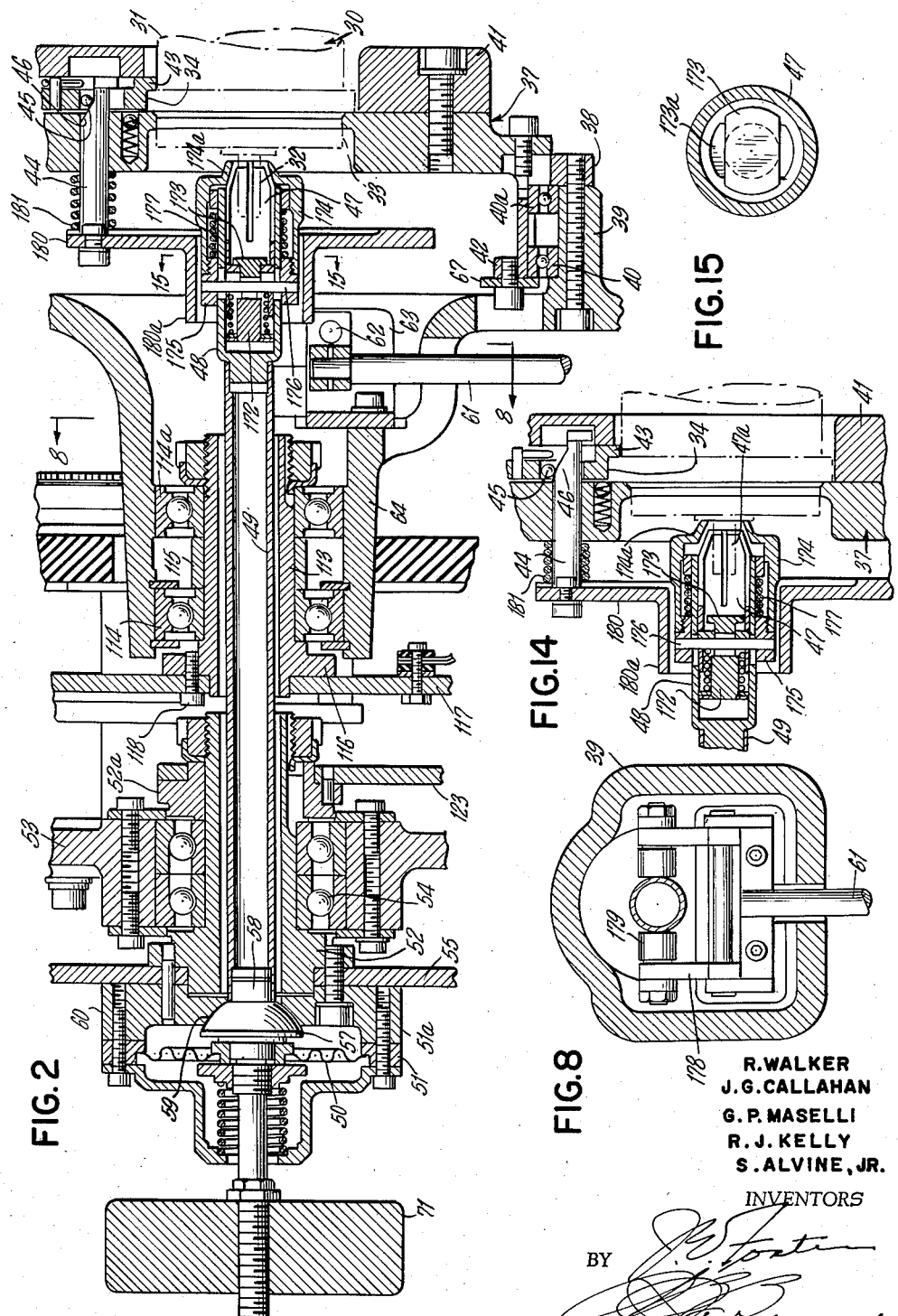

Figure 8 is a vertical section through the actuating mechanism controlled by the release lever shown in Figures 2 and 3, showing the means provided for releasing the roto shaft support collet, shown in Figure 2, and the synchro stator support jaws, taken on the line 8—8, Figure 2.

Figure 9 is a section through the microswitch support disc and the control gear used in conjunction therewith, as shown in Figures 3 and 7, the section being taken through one of the short pins attached to the control gear, which selectively actuates some of the angularly positioned microswitches, taken on the line 9—9, Figure 7.

Figure 10 is a section, similar to Figure 9, through another portion of the microswitch support disc and the control gear, the section being taken through one of the long pins projecting beyond the face of the control gear, which selectively actuates some of the radially positioned microswitches mounted close to the face of the switch support disc, taken on the line 10—10, Figure 7.

Figure 11 is a section similar to Figures 9 and 10, through another portion of the switch support disc and the control gear, the section being taken through another of the long pins projecting beyond the face of the control gear, on the line 11—11, Figure 7.

Figure 1:
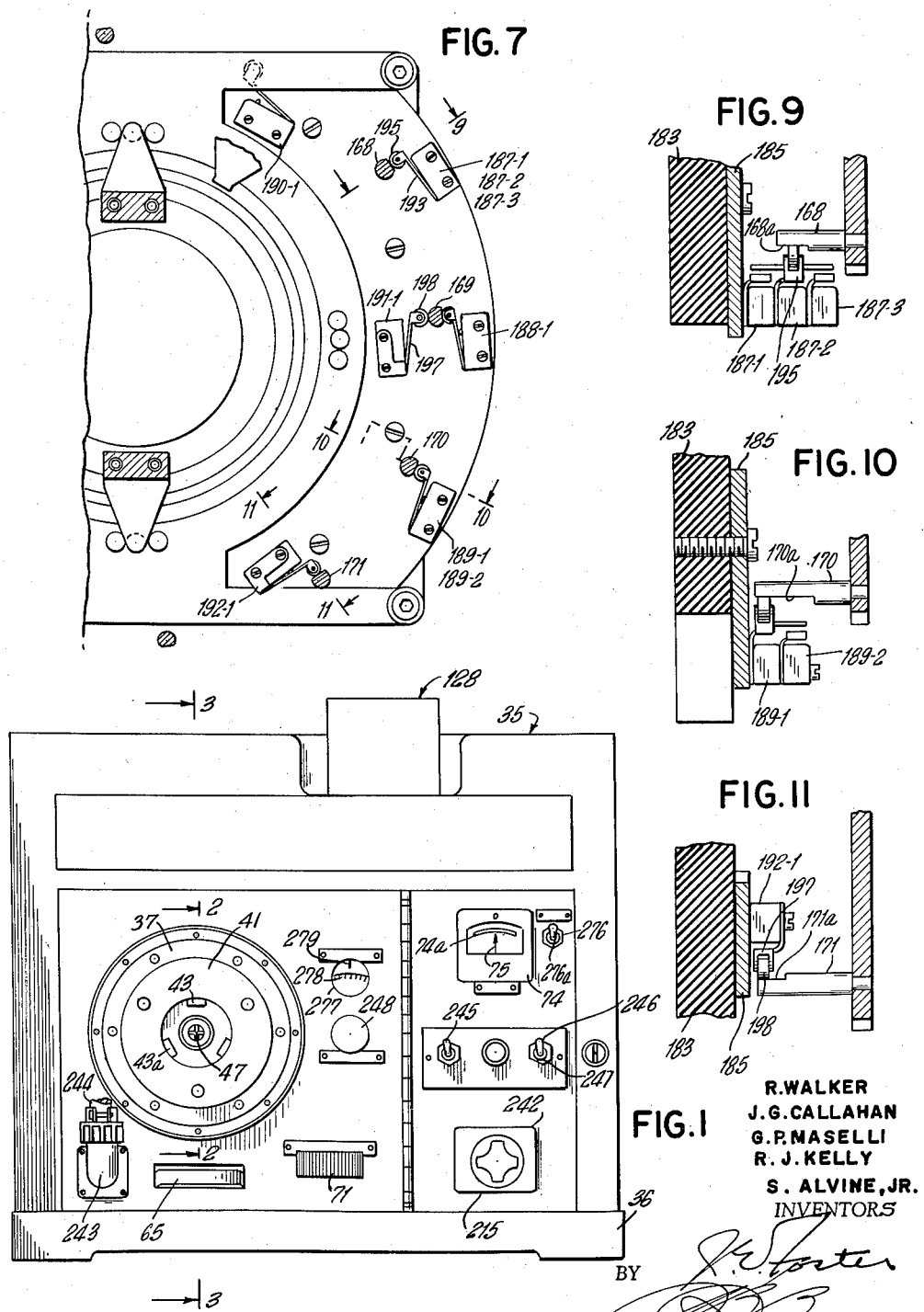
Figure 12:
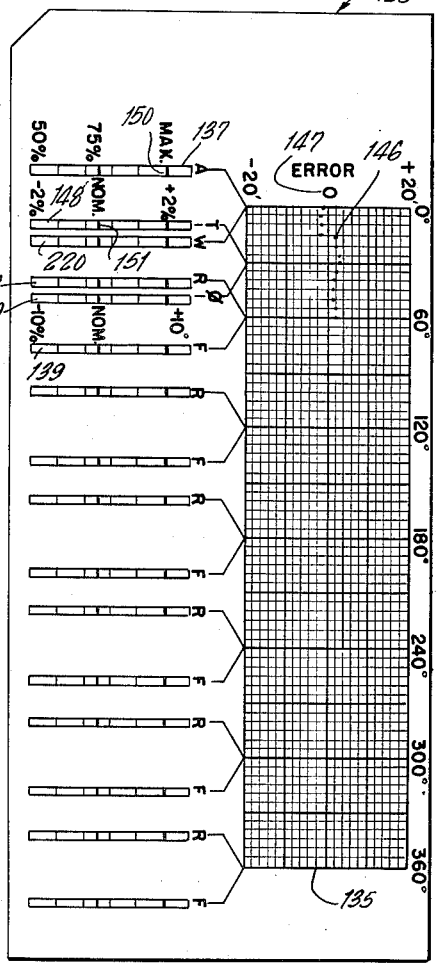

Figure 12 is a front elevational view of one of the record cards used in conjunction with the apparatus shown in Figures 1 and 3, showing the punch areas provided for indicating by the location of the punch marks therethrough, the variations between the nominal electrical values at various angular positions of the synchro rotor shaft, and the electrically determined positions thereof, also the cross-sectioned columns provided for indicating the error between the nominal angular position of the synchro shaft at uniform angular increments and the corresponding electrically established angular position, as determined by the electronic testing equipment.

Figure 5:
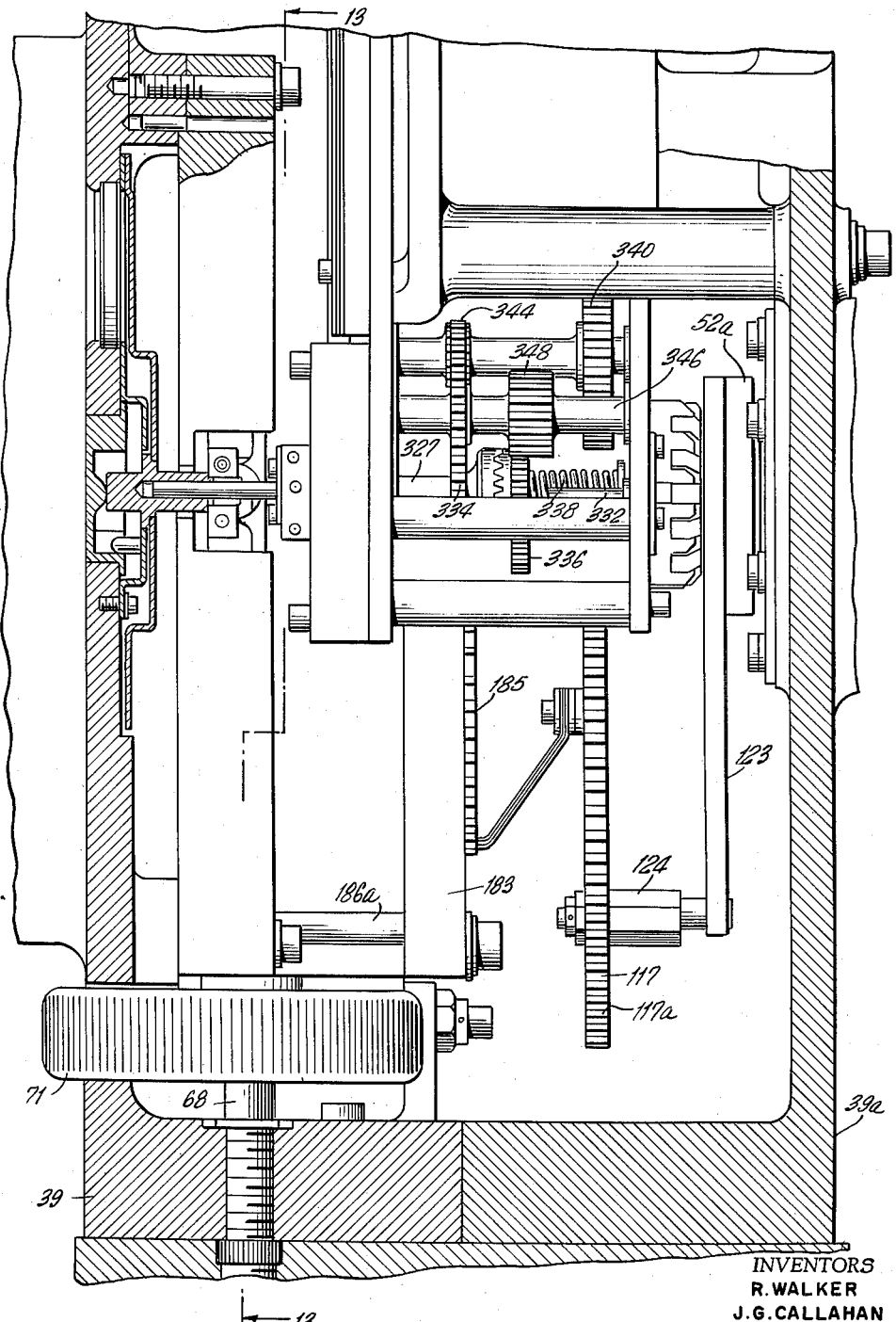
Figure 5 is a partial right-hand side elevation and partial vertical section through the apparatus shown in Figures 1 and 4, showing the fine null adjustment wheel, the switch plate, the gear and switch actuating pin assembly and a portion of the gear drives, taken on the line 5—5, Figure 4.

Figure 13 is a section through the fine null adjustment mechanism shown in Figure 5, showing the adjustment shaft and wheel, and the ball end and sector attached to the synchro stator support mechanism, taken on the line 13—13, Figure 5.

Figure 14 is a longitudinal section, similar to Figure 2, through the forward portion of the mechanism shown in Figure 2, showing the clamping jaws, which support the synchro stator flange, moved into the open or release position, with the control mechanism linking the clamping jaws to the release lever moved to a corresponding position, the section being taken on the line 2—2, Figure 1.

Figure 15 is a cross-section through the synchro shaft support collet, and the collet support pin, shown in Figure 2, showing the head on the pin which retains the collet in its operating position, also the slot through the rear wall of the collet, which enables the collet to be rotated through approximately 90° to the collet release position, the section being taken on the line 15—15, Figure 2.

Figure 16:
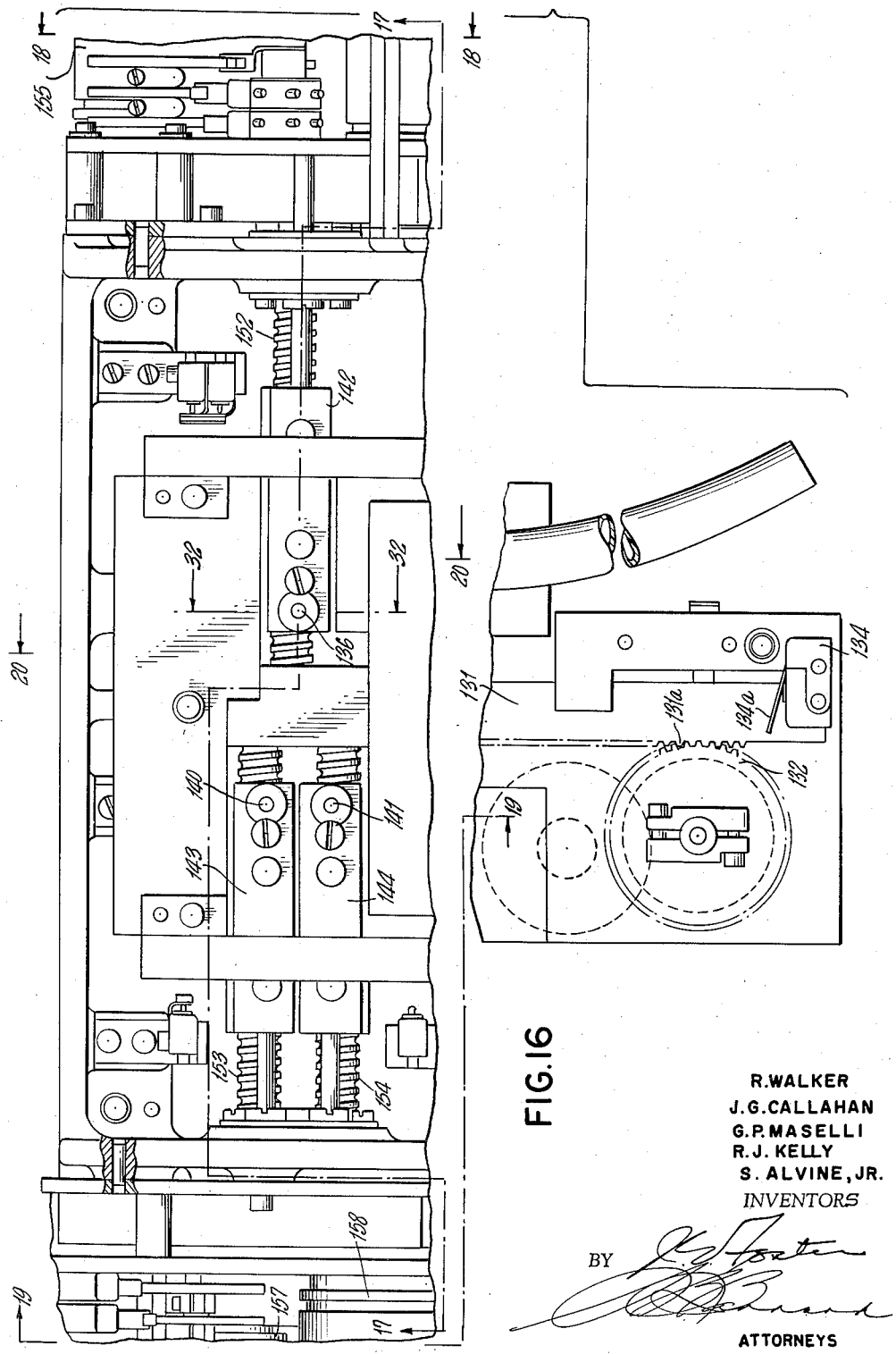

Figure 16 is a front elevational view of the card punching mechanism used in conjunction with the apparatus shown in Figures 1 and 3, showing a portion of the record card guide, the rack and gear used in conjunction with the record card guide, the punch blocks in which the individual punches are mounted, the adjusting lead screws which support and control the lateral movement of the punch blocks, and a portion of the servo motors and cams used to control and actuate the individual punches.

Figure 17 is a partial longitudinal section and partial plan view of the card punching mechanism shown in Figure 16, showing the record card guide, the punch blocks, the threaded lead screws supporting and laterally guiding the punch blocks, one of the punch control shafts, and the punch and die used in conjunction therewith, and some of the microswitches controlled by the punch blocks, taken on the line 17—17, Figure 16.

Figure 18 is a right-hand side elevational view of the record card punching mechanism, shown in Figures 16 and 17, showing a portion of the record card guide, the gear train used to elevate the card control rack, and a portion of the servomotors, cams and cam controlled microswitches located at the right-hand side of the unit, the view being taken on the line 18—18, Figure 16.

Figure 19:
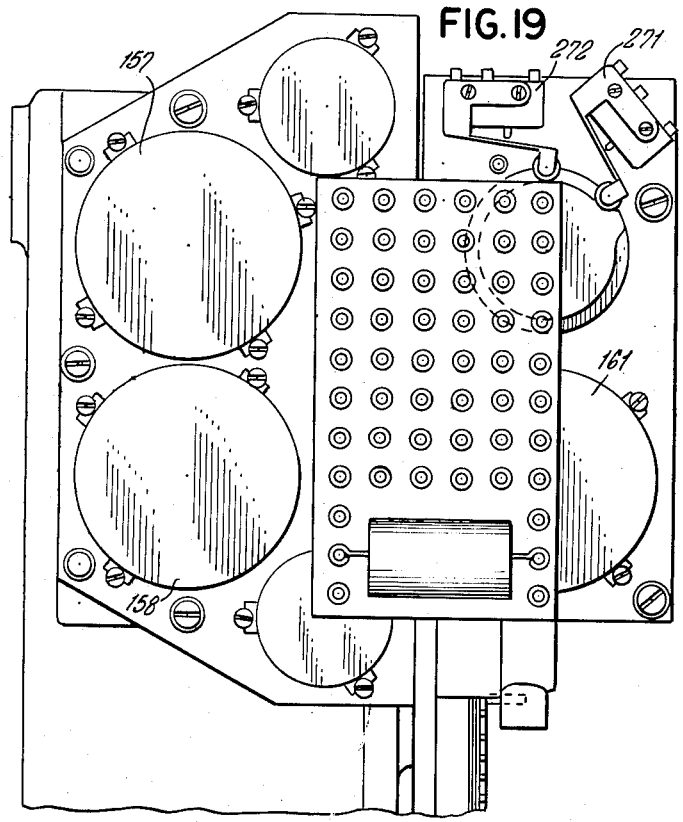

Figure 19 is a left-hand side elevational view of a portion of the record card punching mechanism shown in Figures 16 and 17, showing a portion of the servo motors which control the lateral movement of the punch blocks, and one of the disc cams and the microswitches controlled thereby, which are used to control the operation of some of the punches, taken on the line 19—19, Figure 16.

Figure 20 is a vertical section through the record card guide and a portion of the card punching mechanism shown in Figure 16, showing the relation between one of the punches, the die used in conjunction therewith and the record card slot through the card guide, taken on the line 20—20, Figure 16.

Figure 21 is a vertical section through a portion of the record card punching mechanism shown in Figures 16 and 17, showing two of the parallel punch blocks and the lead screws used to support them and control the lateral movement thereof, as well as the punch control shafts, taken on the line 21—21, Figure 17.

Figure 22:
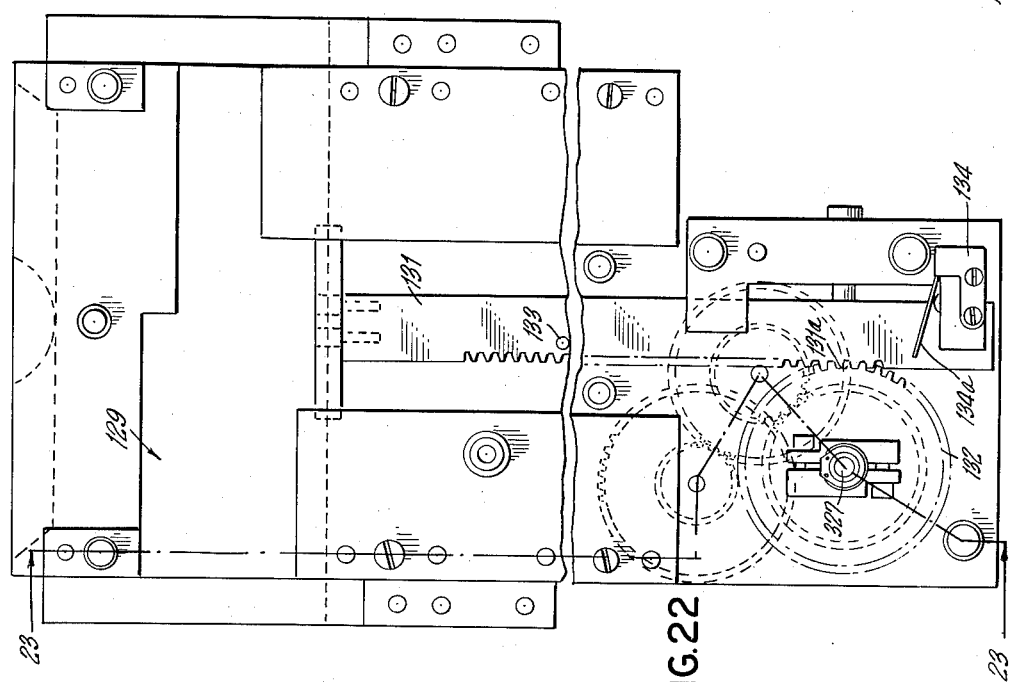

Figure 22 is a front elevational view of the record card guide used in conjunction with the record card punching mechanism shown in Figures 16 and 17, showing the record card control rack and the gear train provided to elevate the rack, also the microswitch controlled by a pin attached to the rack.

Figure 23:
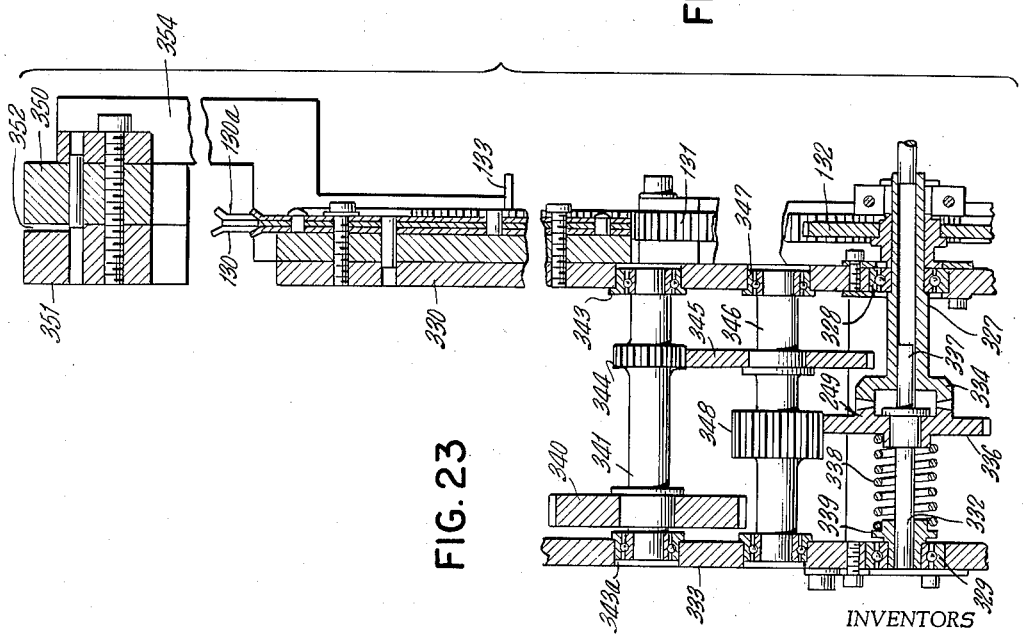

Figure 23 is a vertical section through the record card guide and the gear train for driving the rack shown in Figures 16 and 22, taken on the line 23—23, Figure 22.

Figure 4:
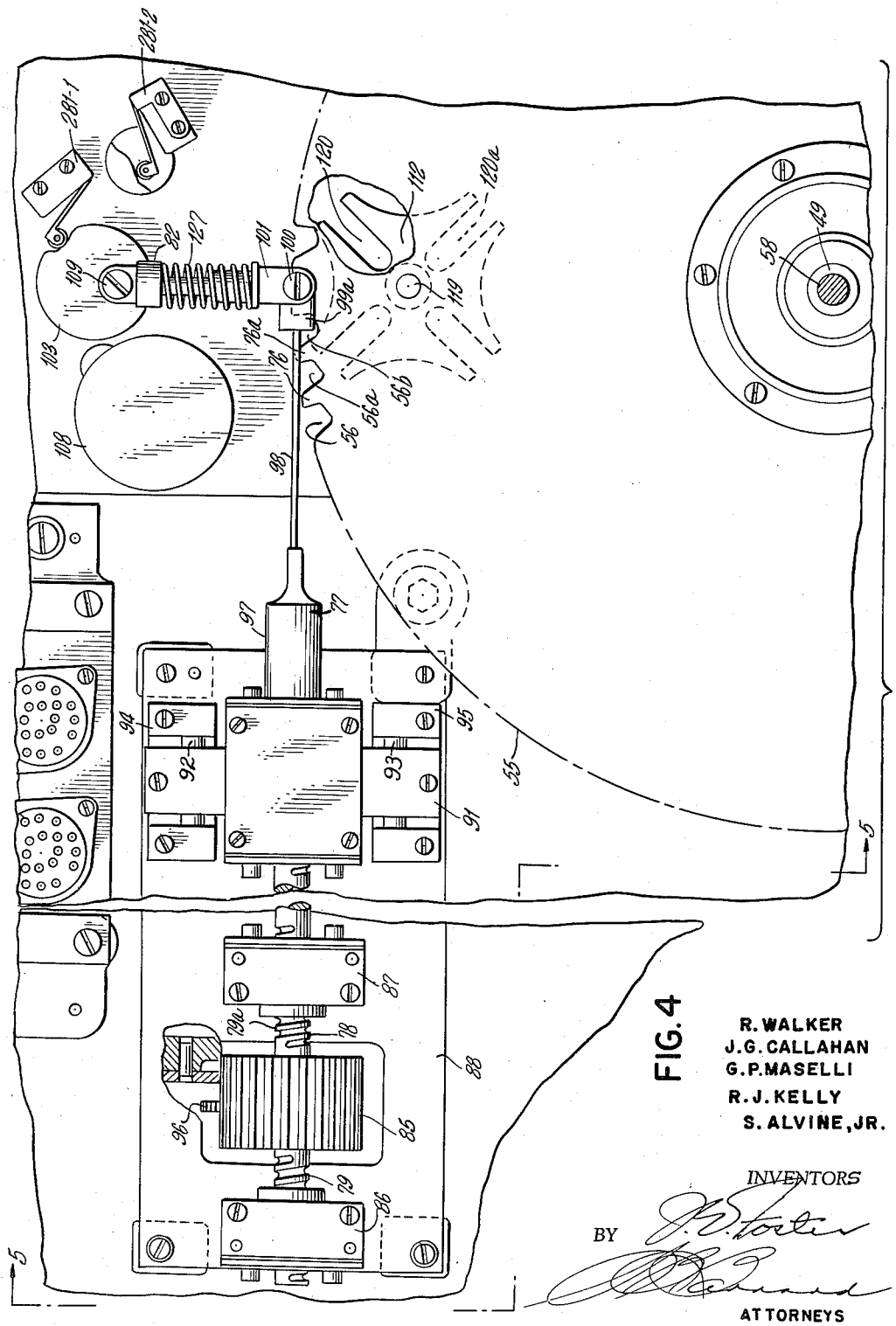
Figure 24:
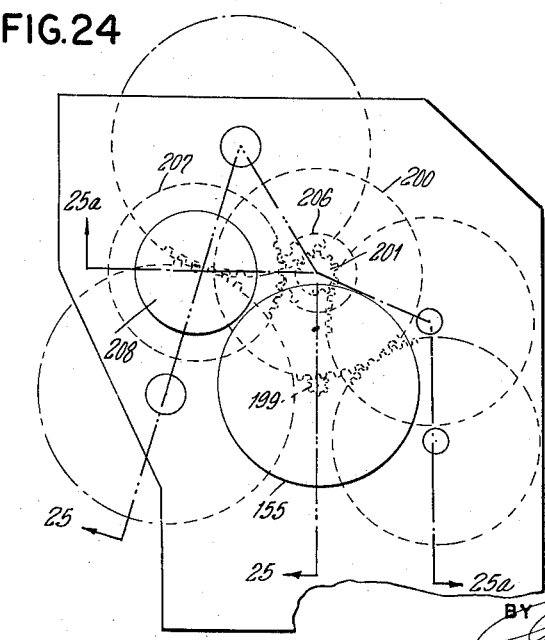

Figure 24 is a plan view of the punch carriage servo of the right-hand punch shown in Figure 16, showing the servo motors controlling the lateral movement of the punch and the gear train driven thereby, to control the lateral positioning of the punch and the index plate tangent arm shown in Figures 4 and 6.

Figures 25, 25a represent stretch-out sections through the servo drives and the gear trains of the right-hand punch, as shown in Figures 16 and 24, the left-hand section, Figure 25 being taken along the line 25—25, Figure 24, and the right-hand section, Figure 25a, being taken along the line 25a—25a, Figure 24.

Figure 26:
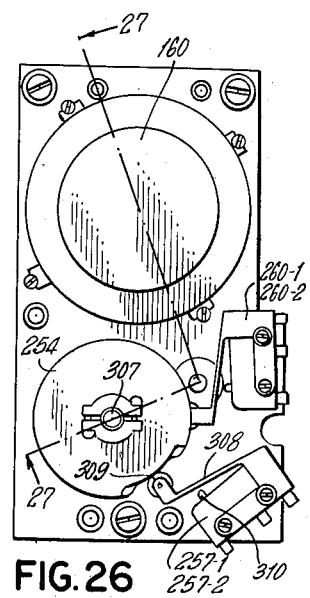

Figure 26 is a plan view of a portion of the drive for operating the right-hand punch shown in Figure 16, showing the servo motor, the switch control plate cam, and a pair of microswitches actuated by the plate cam, the microswitches controlling the operation of the right-hand punch shown in Figure 16.

Figure 27 is a stretch-out section through the punch drive of the right-hand punch shown in Figure 16, as shown in Figure 26, showing the servo motor and the gear train connecting the servo motor to the microswitch control cams, taken on the line 27—27, Figure 26.

Figure 27a is a section, similar to Figure 27, through the mciroswitch control cams shown in Figure 27, and some of the microswitches located adjacent the control cams.

Figure 28 is a plan view of the drive for operating the left-hand punches shown in Figures 16 and 17, showing the servo motor, the switch control plate cams, and a pair of microswitches actuated by the plate cams, the microswitches controlling the operation of the two left-hand punches shown in Figures 16 and 17.

Figure 29 is a stretch-out section through the punch drive for operating the left-hand punches, shown in Figures 16 and 17, as shown in Figure 28, showing the servo motor and the gear train connecting the servo motor to the microswitch control cams, taken on the line 29—29, Figure 28.

Figure 29a is a section similar to Figure 29, through a portion of the microswitch control cams shown in Figure 29, and some of the microswitches located adjacent the control cams, as shown in Figure 28.

Figure 30:
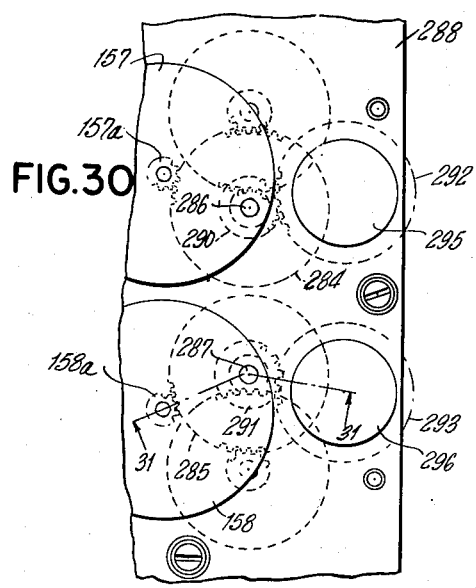

Figure 30 is a plan view of the servo mechanism which controls the lateral movement of the punch carriages shown at the left-hand side of Figures 16 and 17, showing the servo motor and the gear train which controls the lateral movement of the punch carriages to move them into the punching positions.

Figure 31:
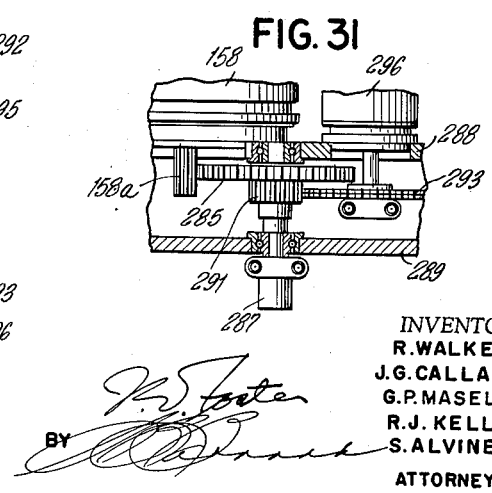

Figure 31 is a stretch-out section through the punch carriage servo-mechanism, which controls the movement of the left-hand punches shown in Figure 16, as shown in Figure 30, showing one of the servo motors and the gear train driven thereby, taken on the line 31—31, Figure 30.

Figure 32 is a section through one of the punch and block assemblies shown in Figure 16, showing the punch block, the punch, die, and the punch actuating shaft, also the position of the record cards relative to the punch, with the punch moved into the punching position shown in dot-dash lines, taken on the line 32—32, Figure 16.

Figure 33:
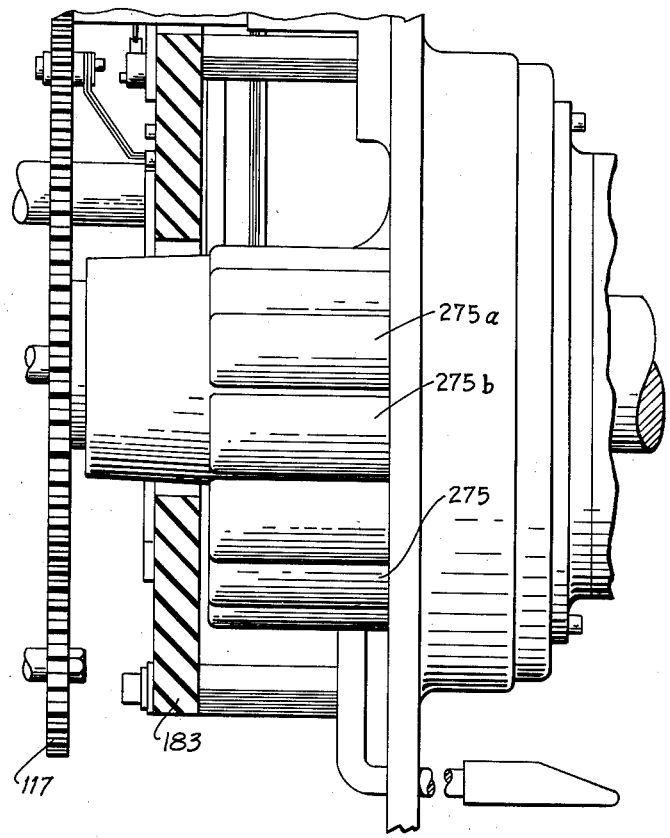

Figure 33 is a left hand side elevational view of the forward portion of the apparatus shown in Figure 1, showing a portion of the electrical control mechanism.

Figure 34:
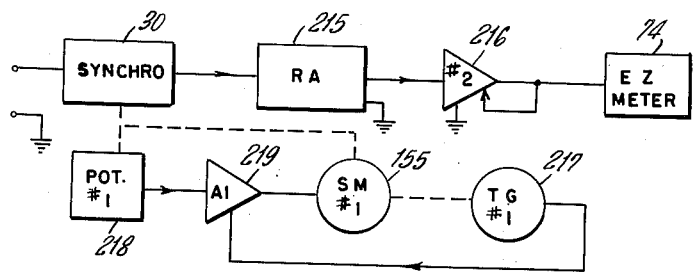

Figure 34 represents a schematic block diagram of the electrical circuit of the servo loop used to establish the electrical zero of a synchro under test, in setting up and adjusting the synchro shaft relative to the stator thereof at the start of a test.

Figure 35:
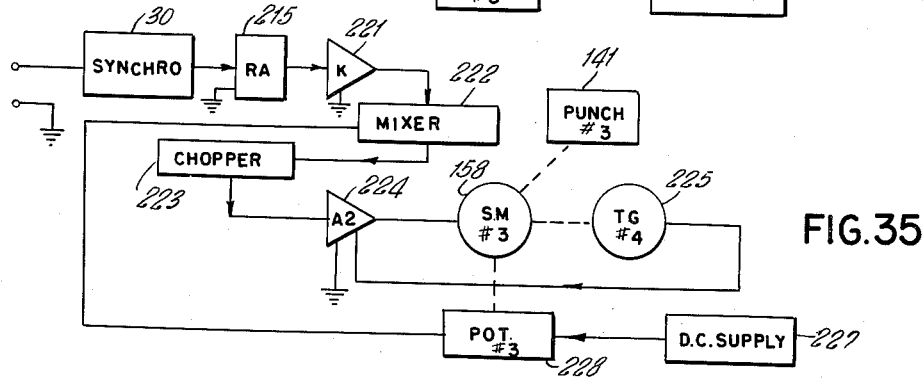

Figure 35 represents a schematic block diagram, similar to Figure 34, of the servo loop as employed in order to establish the open circuit power of the synchro under test at the required angular positions of the synchro rotor shaft, relative to the stator thereof.

Figure 36:
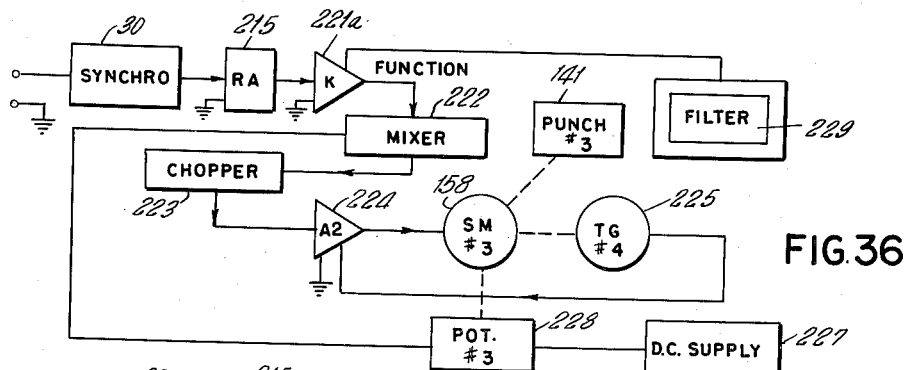

Figure 36 is a schematic block diagram, substantially the same as that shown in Figure 35, of the servo loop employed to establish the fundamental null of the synchro under test at various required angular positions of the synchro rotor shaft relative to the stator thereof.

Figure 37 represents a schematic block diagram of the servo loop employed in order to establish the angle errors of the synchro under test at progressive angular increments of the synchro rotor shaft position relative to the stator thereo, the angle errors being punched on the record cards.

Figure 38 is a schematic block diagram incorporating a portion of the servo loop and circuit shown in Figure 37, which is employed in order to establish the angle error of a control type of synchro, including differential synchros, and control transformers, at angular increments substantially the same as those at which the synchros are tested in conjunction with the servo loop and circuit shown in Figure 37.

Figure 39:
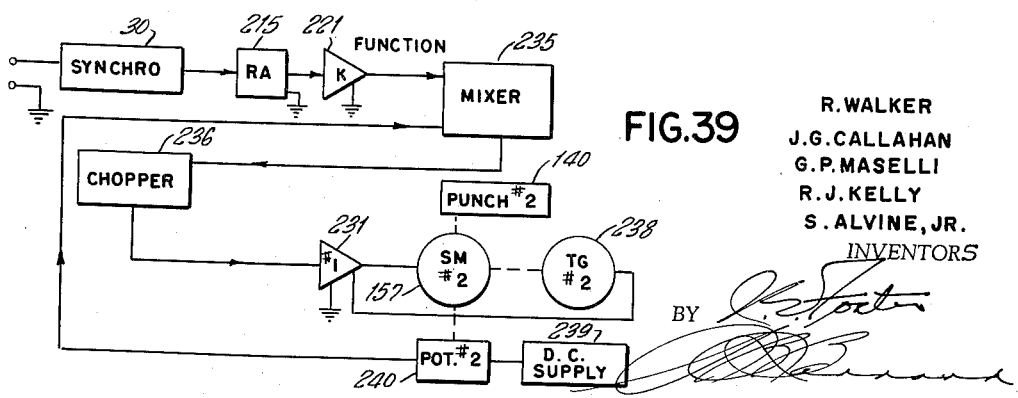

Figure 39 is a schematic block diagram of the servo loop used to establish the open circuit current and the R.M.S. null of the synchro under test at the required angular positions of the synchro shaft and punch the results on the record cards. This servo loop block diagram is generally similar to that shown in Figure 35.

Figure 40:
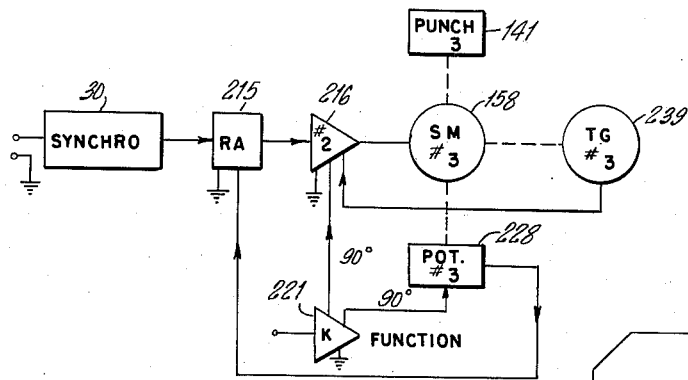

Figure 40 is a schematic block diagram, similar to Figure 39, of the servo loop used to determine the phase shift of the voltage in the synchro under test at the required angular position of the synchro shaft, the primary and secondary voltages being compared to a reference phase which is introduced into the network, the phase shift in electrical degrees being punched in the required positions on the record cards.

Figure 41:
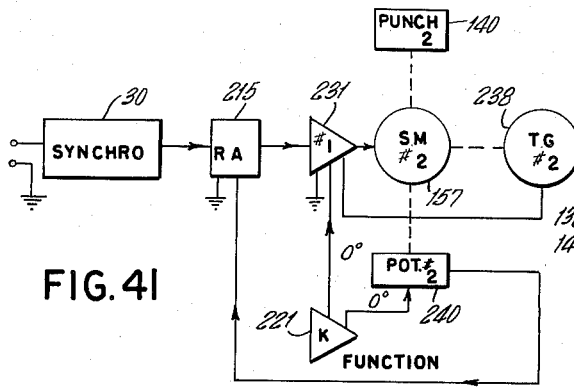

Figure 41 is a schematic block diagram, which is essentially the same as that shown in Figure 40, of the servo loop employed to establish the transformation ratio, or the ratio of the no load maximum secondary voltage to the supply voltage applied to the primary of the synchro under test, at the required angular position of the synchro rotor shaft, the results being punched on the record cards simultaneously with those of the block diagram shown in Figure 40, except that another punch is used.

Figure 42 is an enlarged partial vertical section, and partial side elevational view of a portion of the index plate control mechanism, and the Geneva wheel drive mechanism, shown in Figure 3, showing the pendulum, the cam supporting the pendulum, and the gear train driving the cam and the Geneva wheel control pin, shown in Figure 3, taken on the line 3—3, Figure 1.

It will be understood that the following description of the construction and the method of attachment, control, actuation, sequencing, operation and utilization of the "Automatic Synchro Testing and Recording Apparatus," is intended as explanatory of the invention and not restrictive thereof.

In the drawings, the same reference numerals designate the same parts throughout the various views, except where otherwise indicated.

General

The apparatus shown in Figures 1, 2, 3 and 4 is used for automatically testing synchros, such as the one shown in Figure 2, each synchro 30 consisting of a substantially cylindrical stator 31, which is removably supported by an adapter fitted to the forward end of the housing, in a manner hereinafter described, and a rotor fitted to the interior of the stator concentrically therewith, the rotor having a substantially cylindrical shaft 32 projecting beyond the lower end thereof, left-hand, Figure 2, the rotor shaft being removably supported by the apparatus shown in Figure 2 and hereinafter described. Each synchro has an accurately machined pilot 33 projecting beyond a circular flange 34 integral with the stator housing thereof, the pilot 33 being employed to accurately center the stator 31 relative to a synchro support adapter fitted to the housing, in the manner shown in Figure 2 and hereinafter described.

The entire testing apparatus is mounted within a case 35 of substantially rectangular cross-section, as shown in Figure 1, a major portion of the operating mechanism being supported by a base 36 in the form of a casting located at the bottom of the case, as shown in Figure 1.

As most of the tests conducted on the apparatus are conducted at various rotational angular positions of the synchro rotor shaft relative to the stator thereof, it is of vital importance that these angular rotor shaft positions be accurately established and maintained at uniform angular increments, and as the operation of the machine is entirely automatic, so that no adjustments can be made by the operator while a test is being conducted, the mounting means for supporting the synchro stator and the rotor shaft thereof, the angle positioning means for progressively rotating the synchro rotor shaft through progressive angular increments, and the adjustment means for initially aligning the synchro stator relative to the synchro rotor shaft, are of primary importance in the accuracy of operation of the apparatus.

The major portion of these phases of the construction are shown in Figure 2, 3, 4 and 5.

In order to accommodate a wide range of sizes of synchros and synchro shafts, an adapter assembly 37 is interchangeably fitted to an adapter ring 38 attached to the forward tubular rim of the forward housing 39 of the case, the adapter assembly being supported by a pair of large radial ball bearings 40, 40a fitted to the front end of the forward housing 39, which is mounted at the front end of the case, the ball bearings being co-axial with the pilot 33 of the synchro stator to enable the synchro stator to be rotatably angularly adjusted in order to initially establish the E–Z null position of the synchro rotor shaft relative to the stator thereof.

The rear section 39a of the forward housing, which abuts and is fixedly attached to the forward housing 39, is shown at the right-hand side, Figure 5.

A removable synchro stator support adapter assembly 37 is mounted at the forward face of the forward housing 39, mounted in the case 35, to receive and support one of several sizes and types of synchro stators, a substantially circular adapter plate 41 being attached to the forward face of the central hub of the cylindrical housing 42 of the adapter assembly, to receive and support the synchro stator, an accurately machined bore in the adapter plate 41 being operative to receive and center the pilot of the synchro stator.

As shown in Figures 1 and 2, a plurality of radially positioned clamps 43, 43a is slidably fitted to the adapter plate, each clamp having a stepped flange at the inner radial edge thereof, which engages and clamps the rear face of the circular flange 34, of the synchro stator, as shown in Figure 2. Each clamp has an elongated slot through the center thereof, the slot being fitted over a cylindrical pin 44, a ball 45 fitted to a sloping groove or ramp 46 in the pin 44 engaging the upper surface of the slot, to move the clamp from the clamping position shown in Figure 2, to the release position shown in Figure 14 when the pin 44 is moved forward relative to the case, in a manner hereinafter described in greater detail.

The synchro rotor shaft 32 is gripped by a plurality of radially positioned fingers of a collet 47, located co-axially with the synchro stator 31 and supported by a tubular extension 48 of a long tubular collet shaft 49, the rear end of which is flexibly supported by a circularly corrugated diaphragm 50, which is fixedly attached to a circular plate 51, which is in turn supported by a circular guide 51a, the circular guide being supported by a tubular sleeve 52, which is fitted to the rear wall 53 of the forward housing 39 mounted in the case, a pair of self-aligning ball bearings 54 being provided to accurately center the sleeve 52 within the boss at the center of the housing rear wall.

A substantially circular index plate 55, having a plurality of equally-spaced, radially positioned slots 56, 56a around the outer circumference thereof, as hereinafter described in greater detail, is mounted on the tubular sleeve 52, co-axially with the tubular collet shaft 49, an opening through the center of the index plate 55 being accurately fitted to a pilot on the rear end of the tubular sleeve, in order to accurately center the index plate 55 relative to the rear end of the tubular collet shaft 49.

In order to take up any misalignment between the mounting center of the rear end of the tubular collet shaft 49, and the rotor shaft 32 of the synchro, a spherical segmental pivot 57 is fixedly attached to the rear end of the tubular collet shaft 49, a stub shaft 58, integral with the forward end of the pivot and co-axial therewith, being fixedly attached to the rear end of the tubular collet shaft 49.

The spherical segmental pivot 57 is seated in a mating spherical segmental seat 59 in the forward face of the shaft guide 60, abutting the rear face of the index plate 55 and supported by the tubular sleeve 52, thus accurately centering the rear end of the tubular collet shaft 49 relative to the index plate 55.

The spherical segmental pivot 57 attached to the tubular collet shaft 49, enables the tubular collet shaft to be offset through a relatively small angle to take up any misalignment between the center of the pivoted end of the tubular collet shaft, and the center of the synchro rotor shaft 32 located at the forward end of the tubular collet shaft, the flexible circular diaphragm 50, which drives the tubular collet shaft 49, preventing the transmission of any tubular collet shaft angular misalignment to the index plate 55, which is accurately centered on the pilot of the sleeve 52.

A tubular collar 52a is fitted to the forward end of the tubular sleeve 52, the collar which is keyed to the tubular sleeve locking the inner races of the ball bearings 54, 54a to the sleeve. A nut threadably fitted to the forward end of the tubular sleeve 52 retains the collar in engagement with the inner race of the forward ball bearing 54a.

Thus the angular increments represented by the equally-spaced radially positioned slots 56, 56a located around the outer circumference of the index plate 55, will be transmitted accurately to the synchro rotor shaft 32, even though there may be a slight misalignment between the center of the spherical segmental pivot 57 supporting the rear end of the tubular collet shaft 49, and the center of the synchro rotor shaft 32 fitted to the collet 47.

In order to enable the operator to insert a synchro stator and the rotor shaft 32 thereof into the support means therefor, without disturbing the balance of the operating mechanism of the synchro test apparatus, a release lever 61 pivotally supported by a pivot pin 62, which is mounted in a bracket 63 attached to the forward face of the rear hub 64 of the forward housing 39, is provided adjacent the rear end of the collet 47, the release lever having a manually operated pedal 65 attached to the lower end thereof, the pedal being located in front of the forward wall of the case 35 to enable the operator to press it by hand, while mounting the synchro in the test unit. The release lever is operative to progressively release the three radially positioned clamps 43, 43a, which engage and support the circular mounting flange 34 of the synchro stator, and the radially positioned fingers of the collet 47, which supports the synchro rotor shaft 32, when the release lever pedal is pressed downward by the operator, in a manner hereinafter described in greater detail.

In order to accurately adjust the null position of the synchro rotor shaft 32 relative to the synchro stator, a fine null adjustment mechanism is provided in the forward portion of the case, as shown in Figures 1, 5 and 13.

In order to adjust the angular relation between the synchro rotor shaft 32, which is supported by the collet, and held in its rotational angular position by the index plate 55, a ball ended guide 66 is attached to a rear plate 67, which is attached to the central adapter housing 42, as shown in Figures 1 and 13.

A long fine null adjusting screw 68, which is threadably fitted to a bracket 69 attached to the forward housing 39 of the case, engages one face of the ball end 70 of the guide 66. A fine null adjustment wheel 71, the outer circumference of which is knurled and projects through the forward wall of the case 35, as shown in Figures 1, 5 and 13, is attached to one end of the adjusting screw 68, lower portion, Figure 13, as shown in Figure 13.

The opposite face of the ball end 70 of the guide 66 engages a cylindrical pin 72, reciprocatingly fitted to the other portion of the bracket 69 attached to the forward housing, upper portion, Figure 13, the cylindrical opening through the bracket 69, which supports the cylindrical pin 72, being in co-axial alignment with the internally threaded opening through the portion of the bracket 69 which supports the fine null adjusting screw 68, a coiled compression spring 73 fitted to the interior of the opening through the bracket 69, upper portion, Figure 13, engaging the outer edge of the reciprocating cylindrical pin, thereby forcing it against the ball end 70 and gripping the ball end 70 between the cylindrical pin 72 and the centrally located end of the fine null adjusting screw 68.

As shown in Figure 1, an E-Z meter 74 is mounted in the forward wall of the case, the dial of the E-Z meter having a scale 74a thereon, the zero reading at the center of the scale on the dial indicating the electrical zero of the synchro under test when the pointer 75, pivotally supported adjacent the dial of the E-Z meter indicates a zero reading.

In order to set the stator of the synchro at the null position at the start of a test, thus establishing the starting point, or zero angular position of the synchro rotor shaft 32, relative to the stator thereof, the fine null adjustment wheel 71 projecting through the forward wall of the case, is adjusted until the E-Z meter indicates an electrical zero position. In this manner, the stator of the synchro is set at its zero or null position at the start of the test, while the synchro shaft 32 is held stationary by the collet 47 which is fixedly co-ordinated with the index plate 55 in the manner hereinbefore described.

This null position establishes the starting relation between the synchro rotor shaft and the stator thereof, which cannot be altered during the test, except by the progressive rotational angular movement of the index plate, as the stator of the synchro is held stationary, while the rotor shaft movement can be controlled only by the index plate, no intermediate manual adjustment being possible during the conduct of the tests, which are fully automatic.

The index plate 55 has a series of substantially radially positioned teeth 76, 76a around the outer circumference thereof, the teeth being equally spaced, 5° apart, to a high degree of accuracy, to provide uniform 5° intervals in the rotational angular movement of the index plate and the synchro rotor shaft 32, the rotation of which it controls.

The tangent arm 77, which controls the minor angular adjustment of the index plate over a relatively narrow range, is shown in Figures 4, 6 and 36.

The longitudinal movement of the tangent arm, which controls the adjustment of the rotational angular movement of the index plate 55, is controlled by a lead screw 78 which is located substantially parallel to the plane of the face of the index plate, as shown in Figure 4.

The tangent arm is used merely to adjust the angular position of the index plate, and the synchro rotor shaft, which is co-ordinated therewith, over a relatively small angular range, at each 5° rotational angular position of the index plate, at which a ball 81 pivotally attached to the lower end of a pendulum 82, which is pivotally connected to the outer end of the tangent arm, is fitted to one of the radially positioned slots 56, 56a around the outer circumference of the index plate 55, to make minor adjustments in the angular position of the index plate at each of the test angle positions thereof, to compensate for the electrical error in the synchro, at the particular angle at which the rotor shaft of the synchro is set during the angle error test.

The means for determining the electrical error in the synchro at a particular angular position of the rotor shaft thereof is hereinafter described in greater detail.

The method of rotating the index plate, from one nominal 5° angular position, at which the ball 81 of the pendulum is aligned with one of the slots 56 around the index plate, to the next nominal angular position, 5° away, in which the ball 81 is aligned with the next slot 56a around the index plate, as well as the means provided for elevating the pendulum 82, so that the ball 81 is drawn out of the particular slot 56, 56a around the index plate, and out of range of the teeth 76, 76a adjoining the slots 56, 56a are hereinafter described in greater detail.

The maximum range of angular movement of the index plate, at each angular position, at which the ball 81 of the pendulum 82 is fitted to one of the slots 56, 56a surrounding the index plate 55, is of the order of 0° 20′ in either direction, from the nominal position of the index plate. All other major adjustments of the index plate position from one circumferential slot position to another is controlled by another mechanism, which is co-ordinated with the operation of the pendulum 82 in a manner hereinafter described in greater detail.

The lead screw 78 has a pair of threads 79, 79a of substantially semi-circular cross-section cut around the outer circumference thereof, the threads forming a compound lead screw of 7 and 8 pitch, one thread being right-hand and the other functioning essentially as a left-hand thread, although it is cut right-hand, in a manner hereinafter described.

One end of the lead screw 78 is externally threaded 79, 79a, at 7 threads per inch, right-hand, Figures 4 and 6. The opposite end 80 being externally threaded at 8 threads per inch, right-hand.

The left-hand threaded portion 79, 79a of the lead screw is fitted to a pair of internally threaded sleeve nuts 83 and 84, mounted on opposite sides of the control gear 85, as shown in Figure 6. The sleeve nuts 83 and 84 are restrained from rotation and longitudinal movement by a pair of brackets 86 and 87, which are fixedly attached to a base plate 88, mounted at the index plate side of the base of the bracket.

The right-hand threads 80 on the right-hand end of the lead screw are fitted to a pair of right-hand internally threaded sleeve nuts 89, 90 which are mounted within a slide member 91, which is slidably supported by a pair of substantially cylindrical pins 92 and 93, which are in turn supported by a pair of brackets 94 and 95, which are also fixedly attached to and supported by the base plate 88. The sleeve nuts 89 and 90 are restrained from rotation by the slide member 91, but because the slide member is slidable on the cylindrical pins 92 and 93, the sleeve nuts are longitudinally movable relative to the lead screw 78.

Because one set of sleeve nuts is restrained from longitudinal movement, the lead screw is nominally moved longitudinally in one direction relative to the sleeve nuts 83, 84 by i.e. 0.1427 inch when the lead screw is rotated through one complete revolution by the control gear 85.

Because of the right-hand sleeve nuts 89, 90, Figure 6, are free to slide but are restrained from rotation, the rotation of the lead screw through one complete revolution moves the right-hand sleeve nuts 89, 90 through the difference between the leads of the differential threads at both ends of the lead screw, or 0.1427 minus 0.125 or 0.0177 inch.

This, in effect, provides a compound lead screw which provides a differential movement of 0.0177 inch per revolution of the lead screw 78 and the control gear 85 attached thereto.

A control gear 85 attached to a flange integral with the left-hand portion of the lead screw 78, controls the rotation thereof, the control gear meshing with and being driven by a drive gear 96, which is in turn driven by the gear train of the punch carriage drive and card guide mechanism, which are shown in Figures 16 and 17 and hereinafter described in greater detail.

The right-hand end of the slide member 91 has a bracket 97 attached thereto, the bracket supporting a pair of parallel, substantially cylindrical stems 98, each of which has a rod end plate 99, 99a attached to the outer right-hand end thereof, Figures 4 and 6, the rod end plates straddling and being located substantially parallel to the faces of the index plate 55, as shown in Figures 3 and 4, a pair of aligned openings through the rod end plates, which are located in substantially axial alignment with one of the radial slots 56 located between adjacent teeth 76, 76a around the index plate, the rod end plates supporting a pivot pin or bolt 100 on which a ball 81 is trunnioned, the ball 81 engaging the adjoining edges of a pair of circumferential teeth 76, 76a around the index plate 55 pitch circle, to control the rotational angular movement of the index plate 55 in a manner hereinafter described in greater detail.

The pivot pin 100, which is supported by the rod end plates 99, 99a is fitted to the side flanges of a yoke 101, which forms the lower end of a pendulum 82, which is supported by a plate cam 103.

The plate cam 103 is rotatably supported by a shaft 104 which is substantially parallel to the tubular collet shaft, and located a considerable distance radially therefrom, as shown in Figure 3, the plate cam being guided by a U-shaped bracket 105 attached to a rear plate 106, which is in turn attached to the rear wall 107 of the forward housing 39, as shown in Figure 3.

The differential longitudinal movement of the lead screw 78 is co-ordinated with the pivoted angular movement of the pendulum 82 and the ball 81 fitted to the lower end thereof, so that the pitch line circumference of the index plate 55 is moved throgh a small angle required to compensate for the electrical error in the synchro under test at the particular rotor shaft angular position at which it is being tested, the maximum angular movement being of the order of 0° 20′ in either direction from the nominal angular position of the index plate, when the slide member 91 fitted to the right-hand lead screw sleeve nuts 89 and 90 is moved longitudinally through a corresponding tangential distance, the essential features of the operation of the pendulum and the other elements co-ordinated therewith being hereinafter described in greater detail.

While the ball 81, which progressively fits into the circumferential slots 56, 56a surrounding the index plate 55, controls the angular position of the index plate 55 relative to the starting position thereof, the actual rotation of the index plate 55 from one angular position to the next angular position thereof, is effected by a Geneva wheel mechanism shown in Figures 3 and 4 and hereinafter described in greater detail.

The actual movement of the index plate through a 5° range from one angular position, at which the pendulum 82 is aligned with one of the slots 56 around the circumference of the index plate, to the next angular position, at which the ball 81 of the pendulum 82 fits into the next slot 56a around the index plate, is controlled by a Geneva wheel mechanism shown in Figures 3 and 4, which is driven by an advance motor 108, which is shown in Figure 4.

When the plate cam 103 shown in Figures 3 and 4 is rotated through an angle of 180° from the position shown in Figure 3, by means of the advance motor 108 and the gear train connecting the advance motor to the plate cam 103, the plate cam 103 elevates the pendulum 82, to a position at which the ball 81 is out of engagement with any of the slots 56, 56a around the outer circumference of the index plate.

This enables the Geneva wheel mechanism to progressively angularly move the index plate and the sleeve to which it is attached, continuously during the movement of the index plate from one angular 5° position to the next, as the outer circumference of the ball 81 is free of the bottom of the slot 56 and the surfaces of the teeth 76, 76a at both sides of the slot, except at the exact angular position at which the slot is actually aligned with the center of the ball, at which point the index plate is held in its angular position by the ball 81 at the bottom of the pendulum 82, and the tangent arm 77 which is attached the lower end of the pendulum 82.

In that position, the Geneva wheel mechanism, which is shown in Figures 3 and 4, and hereinafter described in greater detail, rotates the index plate through an angular movement corresponding to the spacing between two slots 56, 56a or an angular movement of 5°.

The rotation of the Geneva wheel, which actually controls the angular movement of the index plate 55 is controlled by and synchronized with the rotation of the advance motor 108, which operates a reduction gear train in a manner hereinafter described in greater detail.

The pendulum 82 shown in Figures 3 and 4 is pivotally supported by the plate cam 103 by means of a screw or other pivot member 109, which is attached to the plate cam 103, a short distance from the center thereof, thus providing an eccentric movement about the plate cam shaft 104, which is trunnioned in a pair of plates 106 and 111, which are located parallel to and forward of the index plate 55, the plates 106 and 111 being located on opposite sides of a Geneva wheel 112, which is rotatably mounted between them in the position shown in Figure 3.

The rotation of the cam plate 103 by means of the advance motor, in the manner hereinafter described in greater detail, elevates the pendulum 82 from the position shown in Figure 3, to a position in which the ball 81, rotatably supported by the pendulum, is moved to a position in which it is out of the slot 56, 56a around the index plate, and out of range of the teeth 76, 76a adjoining the slot 56a, thus enabling the Geneva wheel mechanism to rotate the index plate to the next 5° angular test position.

A tubular sleeve 113 which is concentric with the tubular collet shaft 49, and surrounds a portion of the tubular collet shaft, as shown in Figure 2, is supported by a pair of ball bearings 114 and 114a, fitted to the rear hub 64 of the forward housing 39, shown in Figure 2, the ball bearings being separated by a tubular spacer 115. A substantially circular flange 116, integral with the tubular sleeve 113, is located adjacent the rear end of the tubular sleeve, a large plate gear 117, which is co-axial with and substantially parallel to the index plate 55, being fitted to the rear end of the tubular sleeve 113, adjacent the circular flange 116, the plate gear having teeth 117a around the outer circumference thereof and being attached to the tubular sleeve by a plurality of bolts, screws 118, or other suitable attaching means, inserted through the plate gear 117 and the flange 116 of the tubular sleeve 113.

A relatively short shaft 119, shown in Figure 3, is trunnioned in the pair of plates 106, 111, which are attached to the housing and located forward of the index plate 55 and substantially parallel thereto, the short shaft projecting beyond the forward plate 111, the short shaft being substantially parallel to the tubular collet shaft 49 and located a considerable distance radially therefrom.

A Geneva wheel 112, having four radially positioned equally-spaced slots 120, 120a therethrough, as shown in Figure 4, is fixedly attached to the short Geneva wheel shaft 119, concentrically therewith, the Geneva wheel being located between the plates 106 and 111 and substantially parallel thereto.

The rotation of the Geneva wheel 112 is controlled by a cylindrical pin 121, which is progressively in engagement with one of the radial slots through the Geneva wheel, the method of controlling the movement of the cylindrical pin 121 being hereinafter described in greater detail.

A pinion 122 is attached to the forward end of the short Geneva wheel shaft 119, beyond the forward plate 111 and concentrically with the short shaft 119, the teeth of the pinion meshing with the teeth 117a surrounding the outer circumference of the plate gear 117, thereby rotating the plate gear 117 intermittently, co-ordinated with the intermittent rotation of the Geneva wheel 112.

After the ball 81 attached to the lower end of the pendulum 82, shown in Figures 3 and 4, is disengaged from the circumferential slot 56, 56a around the index plate, the rotation of the advance motor 108, shown in Figure 4, in the manner hereinbefore described, rotates the cam plate 103 through an angle controlled by the rotation of the advance motor 108, the Geneva wheel pin 121 is dropped into one of the radial slots 120, 120a through the Geneva wheel, the continued rotation of the advance motor causing the Geneva wheel to be rotated through an angular range equal to the angle subtended by the spacing between the two radial slots 120, 120a through the Geneva wheel, or an angle of 9°, which is equivalent to an angular movement of 5°, or the angular spacing between two adjoining slots 56 and 56a around the circumference of the index plate 55. The pinion 122 attached to the forward end of the Geneva wheel shaft 119 rotates the plate gear 117, which meshes with it, through an angle equal to the required angular movement of the index plate or 5°.

A radially positioned arm 123 is attached to a tubular collar 52a, which is fitted and attached to the forward end of the tubular rear sleeve 52, by which the index plate 55 is supported, as shown in Figures 2 and 3. A stud, or screw 124 is inserted through the plate gear 117 and fixedly attached thereto, the stud 124 having a smaller cylindrical rear end 125, which is fitted to a radial slot through the radially positioned arm 123, integral therewith, the pin and slot combination causing the radially positioned arm 123 to be moved through an angle conforming exactly to the rotational angular movement of the plate gear 117.

In order to reduce the play between the cylindrical rear end 125 of the stud 124 and the slot through the radially positioned arm 123, a formed spring 126, attached to the stud 124, engages one edge of the arm 123, thereby forcing the cylindrical end of the stud against one face of the slot through the arm at all times. As the index plate 55 and the radially positioned arm 123 are both fixedly attached to the tubular rear sleeve 52, or to the tubular collar 52a, which is in turn attached to the tubular sleeve 52, the tubular sleeve 52 and the index plate 55 attached thereto, are moved through an angle conforming exactly to the angular movement of the radial arm 123. This causes the index plate to be moved through an angular range corresponding to the spacing between two circumferential slots 56, 56a around the circumference of the index plate, thus moving the index plate through a 5° angle. After this index plate angular movement is completed, the ball 81 at the lower end of the pendulum is in line with the next radial slot 56b around the outer circumference of the index plate, the ball being dropped into the slot 56b around the index plate, by the rotation of the cam plate through 360°, and the simultaneous rotational angular movement of the index plate 55, thereby locating the index plate in the next 5° angular position.

When the next slot 56b around the index plate is in line with the position of the axis of the ball 81, the cam plate 103 has been rotated through 360° to its initial position, shown in Figure 4, in which the ball 81 is fitted to the slot 56b through the index plate, so that the ball 81 again actually angularly positions the index plate.

The coiled compression spring 127 which surrounds the cylindrical upper portion of the pendulum 82, as shown in Figures 3 and 4, forces the lower portion of the pendulum and the ball 81 rotatably supported thereby downward, thereby forcing the ball 81 into accurate alignment with the radial slot 56, 56a around the circumference of the index plate 55, at each angular test position, at which the center of the slot 56, 56a, around the index plate is in alignment with the axis of the ball 81, or one edge of one of the teeth 76, 76a adjoining the slot engages the outer circumference of the ball 81.

With 7 and 8 pitch compound threads on the lead screw 78, the differential lead of the lead screw is approximately 0.0177 per revolution of the lead screw 78 and the control gear 85 attached thereto.

With a 12 inch pitch diameter index plate, the length of a 0° —20' arc, which is the maximum required rotational angular adjustment of the index plate, is approximately 0.0021, so that only a relatively small angular movement of the compound thread lead screw mechanism is required to move the index plate through the maximum angular adjustment range required. This provides an extremely sensitive and accurate adjustment of the index plate, and the synchro shaft 32 which is co-ordinated therewith, at each angular test position of the index plate.

The method of co-ordinating the rotation of the advance motor 108, with the rotation of the gear trains forming part of the punch carriage drive mechanism and the card guide mechanism shown in Figure 16, 22 and 23, is hereinafter described in greater detail.

A set of three record cards 128, such as that shown in Figure 12, is inserted in and supported by a card guide 129 shown in Figures 22 and 23, in order to record the results of the tests performed by the testing apparatus on a synchro mounted therein, by punching the record cards in a manner hereinafter described in greater detail.

The record cards 128 are supported between two pairs of channels 130, 130a located on opposite sides of the card guide and spaced from one another a distance slightly greater than the width of the record cards.

A vertical rack 131 having gear teeth 131a cut into one side thereof, the teeth meshing with the teeth of a pinion 132, which is rotated by a gear train in a manner hereinafter described, is attached to the card guide 129, the rack controlling the vertical movement of the record cards 128 after they are inserted in the card guide 129.

The rack 129 has a substantially cylindrical pin 133 inserted in one face thereof and projecting therebeyond, the cylindrical pin 133 being operative to engage the actuator arm 134a of a microswitch 134 located at the bottom of the card guide, the microswitch 134 being operative to initiate the flow of current to the electrical system of the synchro tester, thereby enabling the operation thereof to be started in a manner hereinafter described, when the rack and the card guide 129, with a set of three record cards inserted therein, are moved downward to the starting position of the record cards in a manner hereinafter described in greater detail.

The pinion 132 which meshes with the teeth of the rack 131 moves the rack and card guide upward through a distance equal to the spacing between one pair of punch marks on the right-hand side of the record card, which is equivalent to the angular movement of the index plate and the synchro shaft which is co-ordinated therewith, through an angular increment of 5°, after each punching operation has been completed.

The punched holes in the record card shown in Figure 12 are divided into two groups including the angle error test punch holes, which are made at 5° angular increments of the synchro shaft rotation, in the sectioned columns 135 shown at the right-hand side of each record card, Figure 12. These punched holes are made by means of the right-hand punch 136, shown in Figure 16, which is designated as punch No. 1, the tests punched in the punch areas at the left-hand side of the record card being shown in Figure 12.

The tests recorded in the left-hand punch areas of the record cards shown in Figure 12, are either made at 0°, or the starting position of the synchro rotor shaft 32 relative to the synchro stator, at the 30° synchro rotor shaft position, and at uniform angular increments of 60° from 60° to 360° from the starting position of the synchro rotor shaft relative to the stator thereof.

The tests recorded in the left-hand punch areas include:

(1) Open circuit current and open circuit power at 0° synchro rotor shaft angular position;

(2) The transformation ratio and phase shift at the 30° angular synchro rotor shaft position;

(3) R.M.S. null and fundamental null tests conducted at uniform angular increments of 60° between 60° and 360° of the synchro shaft angular position.

The tests recorded on the left-hand side of the record cards, in the punch areas designated as 137, 138, 139, at the left-hand side of the record cards shown in Figure 12, are selectively punched by means of the two left-hand punches No. 2 and No. 3, 140, 141, the upper left-hand punch 140, designated as punch No. 2 and the lower left-hand punch 141, designated as punch No. 3, being selectively utilized for punching the left-hand punch areas 137, 138 and 139 on the record cards shown in Figure 12.

An outline of the tests recorded in the left-hand punching areas 137, 138 and 139 on the record cards shown in Figure 12, and the respective left-hand punches 140 and 141 used for punching the results of each test will hereinafter be described in greater detail.

Each of the punches 136, 140 and 141 shown in Figures 16 and 17, is supported in an individual punch block, the right-hand punch (No. 1), 136, being supported by punch block 142 and the two left-hand punches 140, 141 (Nos. 2 and 3) individually supported in the punch blocks 143 and 144 respectively, as shown in Figure 16.

Details of the construction of the punches proper 145, and the method of controlling the reciprocating movement of the punches (Nos. 1, 2 and 3) are shown in Figure 32, all of the punches being substantially the same, both in their construction and in the method of controlling the reciprocating movement thereof, the only difference being the position of the punch blocks 142, 143 and 144, and the punches fitted thereto relative to the record card guide, the respective punch locations being co-ordinated with the positions of the corresponding groups of punching areas 137, 138 and 139 and the right-hand columns 135 in the record cards shown in Figure 12, the relation of each punch to the corresponding punching area in the record cards, in the punching position, being vital to the operation of the apparatus, as the exact position of each of the right-hand punched holes 146 relative to the zero line 147 in the right-hand columns, indicates the percentage of error of the angle error reading.

In the left-hand punch areas shown in Figure 12, all of the punch areas with the exception of the punch areas 148, 149, designated at TI, and ϕI, on the record cards, indicate the percentage range of the particular reading, between the maximum position indicated by a black cross line 150 in each punch area, and the minimum recorded position which is the left-hand end of each punch area.

In the two punch areas 148 and 149 on the left-hand side of the record cards, the position of the punched holes indicates the percentage variation between the nominal position indicated by a cross line 151, at substantially the center of each punch area, and the maximum recordable variation indicated on the particular punch area in the record cards, the percentage range depending upon the particular test recorded and the punch area used in recording it.

The lateral movement of the punch block 142 supporting the right-hand punch 136, punch No. 1, is controlled by a lead screw 152, shown in Figures 16 and 17, which is threadably fitted to the punch block 142, the lead screw being driven by a servo mechanism shown in Figures 24, 25 and 25a and hereinafter described in greater detail.

In the same manner, the lateral movement of the two left-hand punch blocks 143, 144 supporting the two left-hand punches 140, 141, punch Nos. 2 and 3 shown in Figure 16, is controlled by a pair of substantially parallel lead screws 153, 154, located at the left-hand side of the apparatus shown in Figure 16, the lead screws 153, 154 being driven and controlled by a servo mechanism shown in Figures 30 and 31 and hereinafter described in greater detail.

The right-hand lead screw 153 shown in Figure 16, which controls the movement of the punch block 142, in which the No. 1 punch 136 is mounted, is driven by a servo motor 155, which is shown in Figures 16, 17 and 18. The lead screw is driven from the servo motor 155 through a train of gears shown in Figures 17, 24, 25, 25a, the details of the gear train and the means of electrically controlling the operation of the servo motor being hereinafter described in detail.

The drive pinion 156 attached to the right-hand end of the lead screw as shown in Figure 17, is driven by the gear train shown in Figures 24, 25, 25a in a manner hereinafter described.

The left-hand lead screws 153 and 154 shown in Figure 16, which selectively control the movement of the punch blocks 143, 144, in which the Nos. 2 and 3 punches are mounted, is driven by a pair of servo motors 157, 158 shown in Figure 16, and Figures 30 and 31, the gear trains respectively connecting the servo motors to the gears 159, 159a mounted at the left-hand end of each of the lead screws 153 and 154, being shown in Figures 17, 30 and 31.

The details of the gear trains connecting the servo motors 157 and 158 to the lead screws 153 and 154, the electronic apparatus controlling the operation of the servo motors 157 and 158 and the servo system used in conjunction therewith, will hereinafter be described in greater detail.

The punch drive mechanism which controls the operation of the No. 1 punch 136, including the face cams which actuate the microswitches, which control the operation of the No. 1 punch 136, together with the gear train connecting the servo motor 160 and the other parts of the servo control mechanism, are shown in Figures 26 and 27 and hereinafter described in greater detail.

The punch drive mechanism, which controls the operation of the Nos. 2 and 3 punches, including the face cams which actuate the microswitches, which control the operation of the Nos. 2 and 3 punches 140, 141, together with the gear trains connecting the servo motor 161 and the other parts of the servo control mechanism, are shown in Figures 28 and 29 and hereinafter described in greater detail.

As shown in Figures 3 and (42), a pair of stub shafts 162, 163 is trunnioned in the plates 106 and 111 shown in Figure 3, the left-hand stub shaft 162 having a gear 164 fixedly attached to the inner edge thereof, the right-hand face of the gear 164, Figure 3, being located adjacent one face of the Geneva wheel 112. A substantially circular disc 165 is located adjacent the righthand face of the Geneva wheel 112, the disc being fixedly attached to the corresponding end of the right-hand stub shaft 163.

A spacer hub 166, located between the gear 164 and the disc 165, spaces the gear 164 and the disc 165 relative to the faces of the Geneva wheel 112.

A Geneva wheel pin 121, the diameter of which is slightly less than the width of the radial slots 120, 120a, through the Geneva wheel, is located between the gear and the disc, near the outer circumference thereof, and fixedly attached thereto, the Geneva wheel pin 121 being operative to progressively fit into one of the slots 120, 120a through the Geneva wheel to rotate the Geneva wheel in a manner hereinafter described.

The shaft 104, which supports the plate cam 103, to which the pivot screw or pin 109 of the pendulum 82 is attached, as shown in Figure 3, is located above the gear 164, and rearward thereof, as shown in Figure 3.

A pinion 167, which meshes with the gear 164, is mounted on a shaft parallel to the shaft 104, which supports the plate cam 103.

A planetary gear train driven by the advance motor 108 drives the pinion 167, which in turn drives the gear to which the Geneva control pin 121 is attached, thereby intermittently rotating the Geneva wheel 112, the shaft which supports it, and the pinion 122 attached to the right-hand end of the support shaft 119.

This progressively angularly moves the plate gear about its axis of rotation, the angular movement of the plate gear being intermittent and directly co-ordinated with the intermittent movement of the shaft which supports the Geneva wheel.

The intermittent rotational angular movement of the plate gear 117, under control of the rotation of the advance motor 108, therefore controls the movement of the microswitch actuator pins 168, 169, 170, 171, shown in Figures 7, 9, 10 and 11, and in that manner controls the operation of the inner and outer banks of microswitches, shown in Figures 7, 9, 10 and 11, which control the sequence of operation of various phases of the apparatus in the manner hereinbefore and hereinafter described in greater detail.

As the angular movement of the pinion which controls the intermittent angular movement of the Geneva wheel, and consequently the rotational angular movement of the plate gear 117, is controlled by the rotation and timing of the advance motor 108, which is in turn co-ordinated with the spacing between the radial slots around the outer circumference of the index plate 55, the angular movement of the plate gear 117, and consequently the operation of the inner and outer banks of microswitches is controlled by the actuator pins attached to the plate gear, the rotation of which is co-ordinated with the angular position of the index plate 55, and consequently the rotational angular movement of the shaft 32 of the synchro under test.

Figures 2, 8, 14 and 15 show the method of supporting and releasing the rotor shaft 32 of the synchro and the flange 34 of the synchro stator.

The synchro rotor shaft 32 is gripped by a collet 47, having a plurality of radially positioned fingers 47a separated by a series of radial slots at the forward end thereof, the fingers 47a of the collet being operative to grip the synchro rotor shaft 32.

As shown in Figures 2 and 14, the collet 47 is supported within the tubular extension 48 of the tubular collet shaft 49 by a cylindrical spindle 172, located at the center of the tubular extension 48, a parallel-faced circular segmental shoulder 173, located at the front end of the spindle, engaging the rear wall of the collet, thereby retaining the collet within the tubular extension.

The rear wall of the collet 47, which is located adjacent the shoulder 173, has a parallel-faced circular segmental slot 173a therethrough, which is slightly larger in cross-sectional contour, than the shoulder 173. When the collet 47 is assembled to the spindle 172, the parallel-faced slot 173a through the rear wall of the collet is aligned with the parallel-faced shoulder, thus enabling the collet 47 to be moved rearward into the position shown in Figure 14, after which the collet is rotated through an angle of approximately 90°, into the position substantially as shown in Figure 15, the ends of the shoulder 173 engaging the surface of the rear wall of the collet adjacent the slot 173a, thereby retaining the collet 47 in substantially the position shown in Figures 2 and 15.

The clamping of the fingers 47a of the collet against the outer circumference of the rotor shaft 32 of the synchro under test, is controlled by a tubular sleeve 174 surrounding the forward end of the tubular extension, the tubular sleeve having a frusto-conical seat 174a at the forward end thereof, which engages the frusto-conical outer circumference of the fingers of the collet, thereby gripping the rotor shaft 32 of the synchro.

The open tubular rear end of the tubular sleeve 174 is threadably fitted to a tubular collar 175, which is fitted to the outer circumference of the tubular extension 48 of the tubular collet shaft. A substantially cylindrical pin 176, is inserted through and fixedly attached to the tubular collar 175, the pin fitting through a pair of elongated slots through the outer circumference of the tubular extension 48 and an aligned elongated slot through the central spindle 172, thereby limiting the lateral movement of the tubular collar 175 and the tubular sleeve 174 attached thereto. A coiled compression spring 177 is fitted between the forward end of the tubular collar and the rear face of a second tubular collar attached to the forward end of the tubular extension 48, the spring 177 forcing the tubular collar 175 and the tubular sleeve attached thereto, rearward, thereby normally forcing the fingers of the collet radially inward and gripping the rotor shaft 32 of the synchro under test.

In order to release the synchro rotor shaft, the pedal 65 attached to the lower end of the release lever, as shown in Figures 1, 2 and 8, is moved angularly downward, thereby moving the lower portion of the control lever angularly rearward, about the pivot pin 62, and in that manner moving the yoke 178 at the upper end of the release lever 61, angularly forward, and moving a pair of rollers 179, rotatably supported at the upper end of the yoke, forward against the rear face of the tubular collar 175, and in that manner forcing the tubular collar 175 and the tubular sleeve 174 attached thereto forward into a position, such as that shown in Figure 14, the frusto-conical seat in the tubular sleeve being moved free of the outer circumference of the fingers 47a of the collet, thereby releasing the rotor shaft 32 of the synchro 30 and allowing it to be removed from the collet 47.

Before the rollers 179 engage the tubular collar 175, the forward movement of the rollers 179, also forces the central hub 180a integral with a circular plate 180, which is attached to the cylindrical pins 44, which support the clamps 43, 43a, which grip the flange 34 of the synchro stator, forward against the pressure of a plurality of coiled compression springs 181, each of which is fitted around one of the cylindrical pins 44, between the circular plate 180, and the rear face of the adapter plate 38 shown in Figure 2.

The forward movement of the circular plate 180 forces the cylindrical pins 44 forward, the sloping ramp 46 of each of the cylindrical pins thereby moving the ball 45 fitted to the groove or ramp in each cylindrical pin radially outward, thus moving the three radially positioned clamps 43, 43a radially outward and releasing the flange 34 of the synchro stator 31a. This allows the synchro stator 31a and the rotor shaft 32 thereof to be completely removed from or inserted into the mounting position shown in Figure 2. The degree of movement of the clamps 43, 43a is controlled by the extent to which the pedal 65 and the release lever to which it is attached are moved.

After the synchro stator 31a and the rotor shaft 32 thereof are inserted in the mounted position shown in Figure 2, the synchro stator may be radially adjusted, relative to the rotor shaft, which is held in a relatively fixed position by the collet 47, in order to establish the null position at the start of a test.

By moving the pedal 65 and the release lever to which it is attached angularly downward over a relatively short distance, the rollers 179 attached to the yoke end of the release lever engage the open end of the central hub 180a of the circular plate 180, before the rollers 179 reach the tubular collar 175. This enables the circular plate 180 to move the cylindrical pins 44, forward, thereby moving the flange clamps 43, 43a radially outward, thus freeing the flange 34 of the synchro stator 31a, and thereby allowing the synchro stator 31a to be manually rotated in order to adjust the rotational angular relation between the rotor shaft 32 and the stator 31a, of the synchro under test, the rotor shaft 32 of the synchro being held stationary by the jaws of the collet 47, which is unaffected, as the tubular collar 175 attached to the tubular extension of the tubular collet shaft 49 has not yet been reached by the rollers 179.

Figures 3, 5 and 7 show the mechanism provided to actuate a plurality of substantially radially positioned micro-switches, mounted on a plastic switch support disc 183 which is co-axial with, and substantially parallel to the index plate 55.

As shown in Figures 7, 9, 10 and 11, the plate gear 117 has a plurality of switch actuator pins 168, 169, 170 and 171 fixedly attached thereto, and substantially perpendicular to the forward face of the plate gear 117, the pins 168, 169, 170 and 171 being utilized to control the operation of a plurality of radially positioned microswitches, shown in Figures 7, 9, 10 and 11, and hereinafter described in greater detail.

A switch support disc 183 having a thin annular ring 185 attached to the rear face thereof, is mounted forward of the plate gear 117 and substantially parallel thereto, the switch support disc 183 being supported by a plurality of spacers 186, 186a, attached to the forward wall of the housing 39.

A plurality of rows of microswitches is attached to the rear face of the annular ring 185, which is in turn attached to the rear face of the plastic switch support disc 183, in the manner shown in Figures 7, 9, 10 and 11, the microswitches being selectively controlled by the actuator pins 168, 169, 170 and 171 attached to the plate gear, and projecting forwardly therefrom in a manner hereinafter described in greater detail.

The microswitches consist of three banks of microswitches 187, 188, 189, located around the outer circumference of the support disc 180, the first bank 187 having three microswitches 187–1, 187–2, and 187–3, located substantially parallel to the switch support disc, and abutting one another as shown in Figure 9. The second bank 188 having a single microswitch 188–1 mounted adjacent the rear face of the annular ring 185, is attached to the switch support disc 183, in a manner similar to the microswitch shown in Figure 11, the third bank 189 having two microswitches 189–1, 189–2 therein, as shown in Figure 10, one microswitch 189–1 being located adjacent the annular ring 185 attached to the switch support disc 183, the other microswitch 189–2 being located adjacent the side of the microswitch 189–1.

In the second bank 188, a single microswitch 188–1 is located directly against the face of the annular ring 185 attached to the switch support disc 183.

In addition to the outer banks of microswitches shown in Figures 7, 9 and 10, a plurality of inner banks 190, 191 of microswitches, is located radially around the inner circumferential edge of the annular ring 185, in the relative positions shown in Figure 7.

Each microswitch of the outer banks of microswitches has an actuator arm 193 pivotally attached to the edge thereof, directed toward the center of the switch support disc, as shown in Figures 7, 9 and 10, each actuator arm 193 having an actuator roller 195 trunnioned on the outer end thereof, the actuator rollers 195 engaging the flat surfaces on the ends of the actuator pins 168, 169, 170, 171, shown in Figures 7, 9, 10 and 11, to control the operation of the microswitches in a manner hereinafter described in greater detail.

Each of the microswitches in each of the inner banks 190, 191, 192 of microswitches, has an actuator arm 197 pivotally attached to the outer end thereof, the actuator arm being directed toward the outer circumference of the switch support disc, each actuator arm 197 having an actuator roller 198 trunnioned at the outer end thereof in substantially the same manner as the outer banks of microswitches shown in Figures 7, 9 and 10.

Each of the inner banks 190, 191, 192 of microswitches has a single microswitch 190–1, 191–1, 192–1 located adjacent the rear face of the annular ring 185, in the manner shown in Figure 11, the face of the actuator roller 198 attached to the actuator arm 197 of each microswitch being substantially parallel to the face of the annular ring 185.

The switch actuator pins 168, 169, 170 and 171, shown in Figures 7, 9, 10 and 11 and hereinbefore described, include a relatively short pin 168, which extends from the forward face of the plate gear 117 to a point a considerable distance from the rear face of the annular ring 185 attached to the switch support disc, the pin having a relatively short flat surface 168a on the face thereof, directed toward the outer circumference of the switch support disc, the flat surface 168a of the pin being operative to engage the outer circumference of the actuator roller 195 of one of the outer banks of microswitches 187, 188, 189, shown in Figure 7, the flat face 168a of the short pin 168 being relatively short and in substantial alignment with the actuator roller 195 of the second microswitch 187–2 and 189–2, in some of the outer banks of microswitches 187, 189, the flat face of the actuator pin being operative to force the actuator roller 195 and the actuator arm of the microswitch, by which it is supported, inward toward the case of the microswitch, thereby forcing a plunger reciprocatively fitted to the microswitch, inward toward the microswitch case, and in that manner moving the microswitch to which the actuator arm is attached to its current control position, hereinafter described in greater detail, the actuator pin engaging the microswitch actuator roller when the plate gear 117 is rotated to a position in which the axis of the actuator pin is in substantial radial alignment with that of the actuator roller of one of the outer banks of microswitches 187, 188, 189.

Similarly, a plurality of intermediate actuator pins 169, 170 is provided at selected radial positions around the forward face of the plate gear 117, each of the intermediate actuator pins having a relatively long flat face 169a, 170a on the forward portion thereof, the flat face being directed toward the outer circumference of the microswitch support disc. Depending upon the radial position of the intermediate actuator pin, relative to the outer row of microswitches 187, 188, 189, the flat face 169a, 170a of one of the intermediate pins selectively engages one of the actuator rollers 195 of one or more microswitches, the length and location of the flat faces 169a, 170a of the actuator pins 169, 170 being such that the flat face of the actuator pin either engages one of the microswitches 187-1, 188-1, 189-1, which is located adjacent the rear face of the annular ring 185 attached to the switch support disc 183, or the second microswitch of a particular bank 187, 189, or both, depending upon the position of the actuator roller 195 of the particular microswitch in the bank, when the intermediate actuator pin 169, 170 passes it.

In addition to the actuator pins which engage the actuator rollers 195 of the outer banks of microswitches, a plurality of relatively long actuator pins 171 is attached to the plate gear 117, the actuator pins 117 extending from the forward face of the plate gear 117, to a point a short distance from the rear face of the annular ring 185, each actuator pin having a relatively short flat face 171a on the portion thereof directed toward the center of the switch support disc 183, the flat face 171a of the actuator pin being operative to engage the outer circumference of the actuator roller 198, of one of the inner row of microswitches 190-1, 191-1, 192-1, shown in Figures 7 and 11, the flat face of the actuator pin being relatively short and in substantial alignment with the actuator roller 198 of one of the inner row of microswitches located adjacent the rear face of the annular ring 185, as shown in Figure 11. The flat face 171a of the actuator pin 171 is therefore operative to force the actuator roller 198, and the actuator arm 197 of the microswitch, by which it is supported, toward the case of the microswitch, thereby moving the control plunger of the microswitch into the operating or current control position. The flat face 171a of the actuator pin 171 engages the microswitch actuator roller when the plate gear 117 is rotated into a position in which the axis of the actuator pin 171 is in substantial radial alignment with the actuator roller 198 of one of the inner row of microswitches 190, 191 and 192.

Figures 24, 25 and 25a show the servo motor and the gear train used to longitudinally move the punch carriage or punch block 142, supporting the No. 1 punch 136 shown in Figure 16, and the servo motor and gear train used to operate the tangent arm 77 shown in Figures 4 and 6.

The right-hand gear train shown in Figures 24 and 25a is driven by a motor 155 having a toothed rotor shaft 199 rotatably projecting beyond the flange thereof, the rotor shaft 199 meshing with and driving a gear 200, which is fixedly attached to a shaft 201, which is supported by a pair of ball bearings 202, 202a, which are mounted in a pair of parallel substantially flat plates 203, 203a shown in Figures 25 and 25a, the flat plates being separated by a plurality of substantially cylindrical spacers 204.

The speed of the motor shaft is reduced by a planetary gear train 205, which drives the right-hand lead screw 152 shown in Figure 16, the lead screw longitudinally positioning the punch block 142, which supports the No. 1 punch 136 in the manner hereinbefore described in greater detail.

A pinion 206 which is fixedly attached to the shaft 201, which supports the gear 200 driven by the motor shaft 199 shown in Figure 25a, also drives an anti-backlash spring loaded gear 207, which is attached to the shaft 208a of a potentiometer 208, which is supported by the upper plate 203 in the position shown in Figure 25, the axis of the potentiometer 208 being substantially parallel to the axis of the shaft 201 shown in Figures 25 and 25a.

The motor 155 and the gear train, shown in Figures 25 and 25a, drive a gear 209, which meshes with a pinion 156, attached to the right-hand end of the right-hand lead screw 152, thus transmitting the rotation of the motor 155 to the lead screw 152.

The punch positioning motor 155 also drives a gear 96 which meshes with the control gear 85 shown in Figure 4, the control gear 85 rotating the lead screw 78, which has compound threads 79, 79a, 80 around the outer circumference thereof, the compound threads 79, 79a and 80 of the lead screw controlling the longitudinal movement of the tangent arm 77, and in that manner the angular adjustment of the index plate 55 and the shaft 32 of the test synchro, which is synchronized therewith, in the manner hereinbefore described in detail.

Block diagrams

Figures 34 through 41 show circuit and block diagrams of the electrical and mechanical connections of the various components of the apparatus used in performing specific tests, using the apparatus shown in the drawings and photographs.

The servo loop shown in Figure 34 is used to establish the electrical zero at the start of a test after a synchro 30 is mounted in the testing apparatus.

The electrical zero of a synchro is the rotational angular position of the synchro rotor shaft with respect to the synchro stator, in which minimum voltage is induced in the secondary winding, and the secondary voltage is in phase with the primary voltage.

In this diagram shown in Figure 34, the E-Z meter 74 shown in Figure 1, is controlled by the synchro 30 under test, from which the current flows to an interchangeable range adapter 215 selected to conform to the electrical characteristics of the synchro 30 under test, a signal current from the range adapter being amplified and demodulated in the No. 2 amplifier 216, and fed to the E-Z meter 74.

The synchro 30 is mechanically coupled to the No. 1 servo motor 155 which also drives the No. 1 tachometer or damping generator 217.

The number 1 potentiometer 218 is also directly coupled to the synchro under test and the servo motor 155. The current from the number 1 potentiometer 218 is fed to the A-1 amplifier 219, the amplified current being fed to the servo motor 155. The current from the tachometer generator 217 is fed back to the A-1 amplifier 219, to establish a differential current between the current from the No. 1 potentiometer 218 and that from the tachometer generator, which is driven by the servo motor 155. This drives the punch block 142 to a position in which the No. 1 punch is aligned with the zero position in the punch area 135 on the record cards 128, thus establishing the starting position for the electrical error test.

Figure 35 shows a block diagram of the apparatus and the circuit used to check the open circuit power of the synchro 30 under test, which is indicated by a punch mark in the third lefthand punch area 220 from the top, on the record card shown in Figure 12.

The open circuit power of a synchro is the power delivered to the primary winding of the synchro at rated voltage with no load on the output winding.

In this circuit, the current from the synchro 30 under test is fed through a range adapter 215, such as that used in Figure 34, through a phase sensitive K-function amplifier 221, a signal current from the amplifier being fed through a mixer 222, thence through a chopper 223, which converts the D.C. current, the modulated D.C. current from the chopper being fed to an A-2 servo amplifier 224 shown in the drawings, from which it is fed to the servo motor No. 3, 158, shown in Figure 30, the servo motor driving a tachometer generator No. 4, 225, the current from which is fed back to the A-2 amplifier 224, to establish a differential current in the amplifier, which drives the servo motor 158. The servo motor 158 positions the punch block supporting the No. 3 punch, 141, shown in Figures 16 and 17, through a gear train shown in Figures 30 and 31.

An auxiliary D.C. supply current is fed from a D.C. supply source 227 to the No. 3 potentiometer 228, which is directly coupled to the servo motor 158, the servo motor rotatably angularly positioning the potentiometer. The current from the No. 3 potentiometer 228 is fed through the mixer 222, in which it is combined with the amplified current received from the synchro under test, through the K-function amplifier 221, the combined signal current being fed through the chopper 223 to drive the servo motor No. 3, 158.

The details of the operation of the circuit shown in Figure 35 and the various elements thereof will hereinafter be described in greater detail.

The circuit shown in the block diagram shown in Figure 36, is utilized to establish the fundamental null of the synchro under test, the position of the value of the fundamental null at various angular positions of the shaft of the synchro under test, varying from 60° to 360° in 60° increments, being punched in the lefthand punch area 139, marked F on the record cards shown in Figure 12, corresponding with the angular position shown on the record cards 128.

The fundamental null of a synchro, as determined by this test, is the minimum voltage, with harmonics removed, at the secondary winding, and with the primary winding at rated voltage.

The circuit used in establishing the fundamental null of the synchro under test is essentially the same as that shown in Figure 35, except that a filter 229 is incorporated in conjunction with the K-function amplifier 221a shown in Figure 36.

As shown in Figure 36, a filter 229 is connected to the K-function amplifier 221a to filter the signal current received from the synchro 30 under test in the fundamental null test only.

The K-function amplifier 221a shown in Figure 36 also differs from the phase sensitive amplifier 221 used in the open circuit power loop shown in Figure 35, the difference being hereinafter described in greater detail.

The servo loop represented by the block diagram shown in Figure 37, is used to determine the angle error of the synchro under test, which is punched in the right-hand column 135 of the record cards 128, at uniform increments of the angular position of the synchro rotor shaft between 5° and 360°.

The angle error of a synchro is the angular difference between a given position of the synchro rotor relative to the stator, and the position at which the electrical output of the synchro is at the correct value for the given angular position of the synchro rotor shaft.

The current from the synchro 30 under test is fed to the selected range adapted 215 through a delta bridge 230, from which it is fed to the No. 1 amplifier 231, the amplified signal current from the amplifier being used to drive the No. 1 servo motor 155, the servo motor 155 driving a tachometer generator No. 1, 217, in the same manner as that shown in the circuit shown in Figure 34. The current generated by the No. 1 tachometer generator 217 is fed back to the No. 1 amplifier 231, to establish a differential current which is used to drive the servo motor 155. The servo motor 155 rotates the lead screw fitted to the punch block 142 of the No. 1 punch, right-hand, Figure 16, until the center of the punch is located in the correct relative position in the right-hand columns of the record cards 128, through a gear train in the manner shown in Figures 16 and 17, utilizing the gear train shown in Figures 24, 25, 25a. The servo motor 155 is also directly coupled to the shaft of the synchro under test to indicate the angular position of the synchro shaft on the servo motor, the angular position of the synchro rotor shaft being co-ordinated with the vertical position of the record cards 128, relative to the center line of the No. 1 punch 136, in a manner hereinafter described.

The circuit and block diagram shown in Figure 38 is essentially the same as that shown in Figure 37, except that several additional elements shown in the lower portion of Figure 38 are added. This circuit is used for stator tests conducted on several types of control-type synchros only, these including control transformer and differential synchros.

In the modified circuit, shown in Figure 38, the signal current flows from the range adapter 215 to an A-2 amplifier 224, which is essentially the same as that shown in Figure 37, the amplified signal from the amplifier, as modified by a differential signal current received from a tachometer generator No. 4, 232, which is directly coupled to the No. 4 servo motor 233, which is connected to the A-2 amplifier 224, the amplified combined signal from the A-2 amplifier 224 being utilized to drive the No. 4 servo motor 233. The No. 4 servo motor 233 is directly coupled to a signal generator 234, the signal current from which is fed back to the delta bridge 230, which is shown in the circuit shown in Figure 37.

In all other respects, the combination circuit and block diagram shown in Figure 38 is substantially the same as that shown in Figure 37.

The circuit and block diagram shown in Figure 39, which is essentially the same as the circuit shown in Figure 35 for checking open circuit power, is used for determining the open circuit current of the synchro under tests at 0° synchro rotor shaft position, and the R.M.S. null at various angular positions of the synchro shaft, ranging between 60° and 360°, at uniform angular increments of 60°. The open circuit current is punched in the upper left-hand punch area 137 designated on the record cards. The R.M.S. null at various angular positions of the synchro rotor shaft, is punched in the left-hand punch area 138 marked R, which are coupled with the fundamental null punch areas 139, at the various angular positions on the record cards ranging between 60° and 360° at 60° angular increments.

The open circuit current of a synchro, as determined by this test, is the amount of current in the primary winding of the synchro, at rated voltage with no load on the secondary winding.

In this circuit, the current flows from the synchro 30 under test, through the range adapter 215, thence through the K-function amplifier 221, from which the amplified signal current is fed through a mixer 235, the current from a D.C. supply source being fed to the No. 2 potentiometer 240, which is coupled by means of a gear train to the servo motor 157, which drives the No. 2 punch block 143, the current from the potentiometer being combined with the current from the K-function amplifier in the mixer to provide a follow-up signal, which will allow the No. 2 servo motor 157 to drive the potentiometer 240 in order to null out the signal and therefore null out the servo motor. The current from the mixer 235 is fed to a chopper 236, the modulated D.C. current from the chopper coupled with the feedback current from the No. 2 tachometer generator 238, which is directly connected to the No. 2 servo motor 157, being utilized to drive the servo motor 157 in the same manner as that shown in Figure 41.

The No. 2 servo motor 157, which is shown at the left-hand side in Figures 16 and 17 is coupled by a gear train to the left-hand lead screw driving the punch block, which supports the No. 2 punch 140 shown in Figures 16 and 17, to longitudinally position the punch and enable the punch to punch the record cards in the proper relation to the required punch area in the manner hereinbefore described.

The gear train used to drive the lead screw of the No. 2 punch from the servo motor is shown in Figures 30 and 31.

The combination circuit and block diagram shown in Figure 40 is used to measure the phase shift of the current of the synchro under test, which is checked when the synchro rotor shaft is at an angular position of thirty degrees from the starting position, and punched in the left-hand punch area 149 designated as φI on the record cards 128, as a percentage variation from the nominal.

The phase shift of a synchro as measured by this circuit is the difference in electrical degrees between the primary voltage and the secondary voltage.

In this circuit, the current is fed from the synchro 30 under test through the range adapter 215, a signal from the range adapter being fed to the No. 2 amplifier 216, which is also used in the circuit shown in Figure 34, the amplified voltage from the amplifier 216, driving the No. 3 servo motor 158, which is used to rotate the lead screw provided to position the punch block 144 of the No. 3 punch 141, left-hand, Figure 16, in the same manner as the punch shown in Figure 36. The No. 3 servo motor 158, which is also used in the fundamental null circuit, Figure 36, also drives the No. 3 tachometer generator 239, the voltage from the tachometer generator being fed back to the amplifier 216 to stabilize the operation of the servo loop. Punch No. 3 is also used in the fundamental null circuit, Figure 36.

The K-function amplifier 221 is incorporated into the circuit, the quadrature signal voltage from the K-function amplifier, which is fed to the No. 2 amplifier 216, providing a reference voltage to the No. 2 amplifier 216, and also to the No. 3 potentiometer 228, which is driven by the No. 3 servo motor 158. The voltage from the No. 3 potentiometer is fed into the range adapter 215, from which it is fed to the No. 2 amplifier 216 with the feedback voltage from the No. 3 tachometer generator 239 and the amplified quadrature voltage signal from the K-function amplifier 221, to drive the No. 3 servo motor 158.

The No. 3 punch positioning servo motor 158 is shown at the left-hand side, Figures 16 and 17, in the gear train drawings, Figures 30 and 31, the gear trains connecting the punch drive servo motor 161 with the control cams which actuate the microswitches, which in turn control the timing of the operation of the No. 3 punch, being shown in Figures 28 and 29.

Figures 30 and 31 show the punch positioning servo motor 158 and the gear train driven thereby, which controls the lateral movement of the Nos. 2 and 3 punch carriages used in the circuits shown in Figures 40 and 41.

The combination circuit and block diagram shown in Figure 41 is used to measure the transformation ratio of the synchro under test, which is determined simultaneously with the measurement of the phase shift, when the synchro rotor shaft is at an angle of 30° relative to the stator thereof from the starting position of the synchro rotor shaft.

The transformation ratio of the synchro is the ratio of the no-load maximum secondary voltage to the primary voltage.

The operation of the circuit shown in Figure 41 is substantially the same as that shown in Figure 40, except that the direct voltage from the K-function amplifier 221 is used in place of the quadrature voltage.

The signal from the range adapter 215 received from the synchro under test is fed to the No. 1 amplifier 231, which is also used in the angle error test, Figure 37. The amplified signal voltage from the No. 1 amplifier is fed to the No. 2 servo motor 157, which is used to position the punch support block of the No. 2 punch 140, in substantially the same manner as in the circuit shown in Figure 39. The No. 2 servo motor 157 also drives the No. 2 tachometer generator 238, which is also used in the R.M.S. null circuit shown in Figure 39, the voltage from the tachometer generator being fed back to the No. 1 amplifier 231, to stabilize the operation of the servo loop.

The direct voltage signal from the K-function amplifier 221, which is also used in the circuit shown in Figure 40, is supplied as a reference voltage to the No. 1 amplifier 231 and the No. 2 potentiometer 240, which is angularly positioned by the No. 2 servo motor 157, in substantially the same manner as in the circuit shown in Figure 39. The voltage from the No. 2 potentiometer 240 is fed into the range adapter 215, from which it is fed to the No. 1 amplifier 231, in combination with the voltage from the synchro 30, under test, the combined differential signal from the No. 1 amplifier being utilized to drive the No. 2 servo motor 157 in substantially the same manner as in the circuit shown in Figure 40, the No. 2 servo motor 157 driving the left-hand lead screw 153 to position the punch block supporting the No. 2 punch 140, in substantially the same manner as that shown in Figure 40.

The gear trains coupling the lead screw 153 with the No. 2 servo motor are shown in Figures 30 and 31 in combination with the drive used to laterally position the No. 2 punch.

*Operation*

The operation of the synchro testing apparatus hereinbefore described in substantially as follows:

Before a test is started, an adapter plate assembly 37 such as that shown in Figure 2, co-ordinated to the shaft size and stator diameter of the synchro to be tested, is fitted and attached to the forward wall of the forward housing 39, of the case of the synchro tester, in the position shown in Figure 2, to receive the synchro 30 to be tested.

A range adapter 215, such as that mounted behind the lower right-hand opening 242, in the door of the forward wall of the case, shown in Figure 1, and in the schematic circuits and block diagrams shown in Figures 34–41, is inserted into the case in the position shown in the drawings the range adapter being selected to conform to the electrical characteristics of the synchro to be tested.

Before a synchro to be tested is inserted into the apparatus, the shaft 32 of the synchro rotor is lined up with the synchro stator housing, by lining up the mark on the synchro rotor shaft with the reference mark on the synchro stator, thereby setting the synchro rotor shaft in its nominal angular starting position relative to the synchro stator.

When the release pedal 65 attached to the release lever 61 shown in Figures 1 and 3, is pressed downward, it opens the fingers of the collet 47, which supports the synchro rotor shaft and moves the clamps 43, 43a which grip the flange of the synchro stator, shown in Figure 2, radially outward, thereby allowing a synchro 30 to be tested, to be inserted into the position shown in Figure 2.

A synchro 30 such as that shown in Figure 2, is inserted into the mounting position, shown in Figure 2, the rotor shaft 32 of the synchro being fed into the central area between the fingers of the collet 47, and the circular flange 34 of the synchro stator is pressed against the mounting face of the adapter assembly 37, shown in Figure 2.

The release pedal 65 is released until the radial clamps 43, 43a at the forward face of the adapter 37 grip the stator flange, and the fingers of the collet 47 grip the rotor shaft 32 of the synchro.

After the synchro is inserted in the mounted position, the release pedal is again pressed partially downward, until the clamps 43, 43a clamping the stator flange are released, the fingers of the collet 47 still gripping the synchro rotor shaft 32.

The operator then reads the dial on the E-Z meter 74, and manually adjusts the synchro stator relative to the rotor shaft 32 thereof, until it is in approximately the null position, as indicated on the scale 74a on the E-Z meter dial, as shown in Figure 1.

The fine null adjustment wheel 71 is then rotatably adjusted until the pointer 75 of the E-Z meter dial indicates 0, which indicates the null position of the synchro under test.

A set of three record cards 128, all of which are substantial duplicates of one another, and ruled in the manner shown in Figure 12, is inserted into the card guide 129 shown in Figures 22 and 23, into the required position.

The tap 243 is connected to the synchro under test by means of a cable 244, which is connected thereto.

The E-Z start switch lever 245, of the switch shown at the right-hand side of the case, Figure 1, is pressed angularly upward to the E-Z position, in which it remains.

Before the set of record cards is moved into its operating position, the operator moves the pivoted control lever 246, of a power switch 247, shown at the right-hand side, Figure 1, after which the operator presses a button 248, marked "Push," at the right of the synchro adapter, thereby sliding the movable crown gear shown in Figure 18, out of engagement with the fixed position crown gear, and in that manner disconnecting the gear train driven by the advance motor 108, from the crown gear which drives the spur gear 132, which is in engagement with the teeth in the rack 131 shown in Figures 22 and 23. This allows the rack and the card guide 129, to which it is attached, to be moved downward to the starting position for punching the record cards 128, without disturbing the balance of the operating mechanism of the testing apparatus.

The gear train which drives the movable crown gear 249, and connects it to a gear driven by the advance motor 108, is hereinafter described in greater detail.

The record cards 128 are pressed downward by the operator until the pin 133 projecting beyond the face of the rack 131 of the card guide mechanism, as shown in Figures 22 and 23, engages the projecting actuator arm 134a of the interlocking microswitch 134 mounted at the bottom of the card guide, thus initiating the flow of current to the testing apparatus.

The pivoted control lever 245 of the E-Z switch shown in Figure 1, is moved angularly downward by the operator to the position indicated as "Start." After that, the switch control lever 245 is released by the operator, so that it is automatically elevated to the central operating or "Test" position, shown in the drawings.

The detailed operation of the E-Z switch shown in Figure 1 and the relay connected therewith, will hereinafter be described in greater detail.

The servo loop circuit and block diagram used for establishing the electrical zero of the synchro under test, is shown in Figure 34 and was hereinbefore described.

The tests conducted by the apparatus on the synchro 30 mounted therein, are conducted in substantially the following order, at the synchro shaft angular positions indicated, the results of each test being punched in the corresponding punching area on the record cards 128 shown in Figure 12.

A. The angle error, which is a measure, recorded in percent of angle, of the difference between the physical angular position of the rotor shaft of the synchro under test, relative to the stator thereof, as angularly displaced from the synchro rotor shaft starting position, and the corresponding electrical angular position, as electrically determined, is ascertained at uniform angular increments of 5°, at all angular synchro rotor shaft positions, ranging from 0° to 355°, from the starting position of the synchro rotor shaft, relative to the stator thereof.

The angle error in percentage of angle is punched on the record cards 128 in the right-hand column 135 in the manner hereinbefore described.

In performing this test, the servo loop circuit and block diagrams shown in Figures 37 and 38, and hereinbefore described are used selectively, depending upon the type of synchro to be tested.

B. The open circuit current, designated as A on the record cards 128, is determined at the starting synchro rotor shaft position, 0°, and recorded in the upper left-hand punch area 137 of the record cards shown in Figure 12.

The open circuit current and the open circuit power of the synchro under test are measured with the secondary leads open and the synchro under test energized at rated voltage and frequency.

In conducting the open circuit current test, the servo loop circuit and block diagram shown in Figure 39, and hereinbefore described is utilized.

C. The open circuit power test designated W on the record cards, is also conducted at the 0° angular rotation position of the synchro rotor shaft, the results being punched in the punch area 220 at the left-hand side of the record cards 128 shown in Figure 12.

The servo loop circuit and block diagram used in conducting this test is shown in Figure 35 of the drawings, and was hereinbefore described.

D. When the synchro rotor shaft is rotated to a 30° angular position relative to the starting position thereof, the transformation ratio and phase shift of the synchro are determined.

The transformation ratio of a synchro is the ratio of the no-load maximum secondary voltage to the supply voltage applied to the primary winding.

The transformation ratio test, designated as TI on the record cards shown in Figure 12, is conducted at the 30° angular synchro rotor shaft position, relative to the stator, the results being punched in the second left-hand punch area 148 from the top of the record cards.

The servo loop circuit and block diagram shown in Figure 41 is used in conducting this test, the results being punched on the record cards using the No. 2 punch 140, Figure 16.

E. The phase shift determination, designated as φI on the record cards, is also made at the 30° rotational angular position of the synchro rotor shaft. The results of this test are also punched on the left-hand side of the record cards in the punch area 149 marked φI.

This test is conducted using the servo loop circuit and block diagram shown in Figure 40, and utilizing the No. 3 punch 141 for punching the results on the record cards.

The results of the transformation ratio and phase shift determinations are both established at the 30° angular synchro rotor shaft position, both results being punched on the record cards simultaneously, using the No. 2 punch for the transformation ratio, and the No. 3 punch for the phase shift.

F. The fundamental null of the synchro under test is measured at angular intervals of 60°, between 60° and 360°, from the synchro rotor shaft starting position, the results being punched in the left-hand punch area 139, designated as F on the record cards, at the angular positions indicated; the punch mark indicating the reading as a percentage variation from the maximum, as designated in the particular punch area on the record cards.

The circuit and block diagram shown in Figure 36 is used to establish and punch the fundamental null on the record cards, the indication being punched using the No. 3 punch 141.

G. The R.M.S. null of the synchro under test is measured at the same synchro shaft rotational angular positions as the fundamental null, notably 60° to 360° in increments of 60°, the results being punched in parallel left-hand punch areas 138, designated as R on the record cards 128, at the synchro rotor shaft angular positions indicated, the punch marks indicating the percentage of maximum in the same manner as in the fundamental null test hereinbefore described.

The circuit and block diagram shown in Figure 39, which is substantially the same as that used for determining the open circuit current is used to establish and punch the R.M.S. null reading on the record cards, the indication being punched using the No. 2 punch 140. In conducting the angle error test, used to punch the right-hand columns 135 of the record cards, two servos and gear trains shown in Figures 24, 25, 25a and 26, 27 are utilized.

In the No. 1 punch drive servo shown in Figures 26 and 27, the drive shaft 250 of the No. 1 punch 136, which is shown in Figures 16 and 32, is driven by a servo motor 160 through a gear train shown in Figure 27.

The No. 1 punch positioning motor 155 can operate only when the A–1 and A–2 servo amplifiers 219 and 224 shown in the block diagrams, Figures 34 and 38 are at their null position.

The amplifiers are servoed to null.

At the null position, the null relay in the A–1 and A–2 amplifiers 219 and 224, of which there is one in each amplifier, closes, transferring the fixed phase voltage from the No. 1 punch positioning motor 155, to the No. 1 punch drive motor 160.

This furnishes a starting kick to the No. 1 punch drive motor 160, which starts the punch drive motor.

The No. 1 punch drive motor 160 continues to operate, when cam 254b shown in Figure 27, actuates microswitches 260–1 and 260–2 shown in Figures 26 and 27a.

Microswitches 257–1, 257–2 shown in Figures 26 and 27 deliver a false error signal to the A–1 and A–2 amplifiers 219 and 224.

When the A–1 and A–2 amplifiers 219 and 224 get the signal, they are no longer at null.

This opens up the null relays in amplifiers A–1 and A–2, 219 and 224 and transfers the fixed phase voltage, 60 cycle, from the punch drive motor 160 back to the punch positioning motor 155.

In operating the punch 145 shown in Figure 32, the construction of which is essentially the same on all three punches, Nos. 1, 2 and 3, 136, 140 and 141, the punch 145 is reciprocated by a punch drive shaft 250, which has a cylindrical drive pin 262 integral therewith, and eccentrically located relative to the axis of the shaft, at the punch end thereof, the drive pin being fitted to a substantially square actuator 263, which is fitted to a mating channel in the body 264, of the punch 145, the punch drive shaft being operative to move the punch from the free position, shown in Figure 32, to the punching position shown by dot-dash lines, Figure 32, when the punch drive shaft is rotated through 180°. Thus a complete cycle of the punch from the starting position shown in Figure 32, and back to the starting position, requires one complete revolution of the punch drive shaft.

The punch proper, as shown in Figure 32, comprises a substantially cylindrical reciprocating body 264, which is reciprocatively fitted to an opening through the auxiliary punch block 265, which is attached to the punch block 142 which is fitted to the No. 1 lead screw 152, in the manner shown in Figure 17, the punch body having a substantially square channel therethrough, into which the punch actuator 263 is fitted.

A substantially cylindrical punch 145a is integral with the punch end of the punch body, the punch being operative to pass through a circular opening 266a through a cylindrical die 266, which is fitted to the auxiliary punch block 265a in axial alignment with the punch 145.

Each auxiliary punch support block 265a, has a long slot 267 therethrough, the slot allowing a set of record cards 128 to be slidably fitted thereto, in the punching position shown in Figure 32, thereby allowing the punch 145a to pass through the record cards 128, thence through the opening in the die 266, to punch one of the holes in the record cards shown in Figure 12, when the punch is moved from its free position shown in Figure 32, to the punching position shown by dot-dash lines, Figure 32.

The construction and the method of operation of the No. 2 and 3 punches 140, 141 shown in Figures 16 and 17, is substantially the same as that of the 145 punch shown in Figure 32 as hereinbefore described.

The three control cams 254a, 254b, 254c, shown in Figure 27, which are driven by the punch drive motor 160 through the gear train, are used to actuate a plurality of microswitches 256–1, 256–2 and 257–1, 257–2, which are mounted adjacent the cams 254a, 254b, 254c and individually controlled thereby.

The detailed operation of the microswitches and the circuits controlled thereby, is hereinafter described in greater detail.

One of the cams 254b controls the operation of the punch drive motor 160, which drives the punch shaft through the microswitch 260–1, shown in Figure 27a, and therefore controls the actual punching of the test position on the record cards.

The energy trip cam 254b which energizes the punch drive motor 160 through the microswitch 260–1 is shown in Figure 27a.

The punch shaft drive motor 160 is driven through the number of revolutions required to rotate the punch drive shaft 250 through one complete revolution.

After the punch drive motor 160 drives the punch drive shaft through one complete revolution, the cam 254a, shown in Figure 27, releases the microswitches 257–1, 257–2, which stops the punch drive motor 160.

The cams transfer the circuit to the open circuit power test shown in the block diagram, Figure 35, and the open circuit current test shown in the block diagram, Figure 39, both of which are conducted at 0° synchro rotor shaft position, after the angle error punching operation at 0° synchro rotor position is completed.

The open circuit power, which is measured by the apparatus shown in the block diagram, Figure 35, uses a ring demodulator which is hereinafter described in greater detail.

Microswitch No. 256–1 holds in the 60 cycle current to the No. 1 punch drive motor 160, thereby keeping it in operation through one complete punching cycle.

Microswitch No. 256–2 opens the fixed phase current to the Nos. 1, 2 and 3 punch positioning servo motors 155, 157, 158 to prevent movement of the punch blocks 142, 143, 144 supporting the individual punches, while any of the actual punching operations are being performed.

Microswitch No. 260–2 sends a locking signal to the K–8 and K–9 relays, which are mounted on the relay rack.

The K–8 and K–9 relays transfer the circuit to the open circuit power test, shown in the circuit and block diagram, Figure 35 at 0° and 30° synchro rotor shaft angle positions.

At 60° synchro rotor shaft angle position and increments of 60° from 60° to 360°, the microswitch 260–1 locks in the K–9 relay only.

Microswitch 260–1 sends a momentary advance signal to the advance motor 108.

At any other angular position of the synchro rotor shaft, microswitch No. 260-2 operates the advance motor 108, except at shaft angle positions 0°, 60°, 120°, 180°, 240°, 300°, 360°, at which the No. 2 and No. 3 punches 140, 141 operate.

At any angular position other than 0°, 30°, 60°, and multiples of 60° up to 360°, this advance cam 254b controls the operation of the microswitch 260-1, and therefore controls the operation of the advance motor 108, to rotatably advance the index plate 55 through an angular increment of 5°, or the angle represented by the spacing between two radially positioned slots 56 and 56a around the outer circumference of the index plate.

At shaft angle positions of 0°, 30°, 60°, and multiples of 60°, this cam 254b has no effect on the operation of the advance motor 108 and the Geneva wheel 112 to rotatably angularly advance the index plate 55 through 5° increments.

At these angular synchro rotor shaft positions, the same cam 254b transfers the circuitry by means of the microswitch 260-2 to those circuits indicated in the respective block diagrams, Figures 34 through 41, to measure and punch the other synchro characteristics determined at a particular synchro shaft angle.

When the null relay in the A-1 or A-2 amplifiers 219, 224 used in the circuit and block diagrams shown in Figures 34 through 38 closes, in a manner hereinafter described in detail, the null relay transfers the fixed phase current from the No. 1, 2 or 3 positioning servo motor 155, 157, 158 which laterally positions the particular punch, to the corresponding punch drive motor, which actually controls the punching operation of the punch used in conjunction with the specific test.

During the No. 1 punch stroke, one cam 254c shown in Figure 27a, locks the punch drive motor 160, 161 in the operating position by means of the microswitch 256-1, thus continuing the rotation of the particular punch drive motor through the number of revolutions required to rotate the punch drive shaft through one complete revolution, or one complete punching cycle.

In measuring the open circuit current, using the block diagram, shown in Figure 39, the amperage of the current is measured as a function of the voltage in a manner hereinafter described in greater detail.

After the completion of any of the tests performed at 30°, 60° and multiples of 60° to 360°, one of the cams 270c shown in Figures 28 and 29, transfers the circuitry by means of the microswitch 271-1, which controls the operation of the advance motor 108.

Microswitch No. 272-1 holds in the No. 2 and 3 punch drive motor 161.

Microswitch No. 272-2 opens the fixed phase current from the No. 1, 2 and 3 punch positioning servo motors 155, 157, 158.

This holds the punches in place during the actual punching operation.

Microswitch No. 271-1 sends the momentary advance signal to the advance motor 108 under control of cam No. 270c.

At 360° synchro rotor shaft angle position, the microswitch 271-2 shuts the apparatus off.

Figures 30 and 31 show the servo motors 157 and 158 and the gear train used to move the No. 2 and 3 punches 140 and 141 to the punching position relative to the record cards 128.

Figures 28 and 29 show the motor and gear train used to rotate the punch operating shaft 250 in order to move the No. 2 and 3 punches 140 and 141 through the punching operation.

The cams 270a, 270b, 270c, shown in Figure 29 are used to actuate the microswitches 272-1, 272-2 and 271-1, 271-2 mounted adjacent the cams, in order to control the operation of the No. 2 and 3 punches.

One of the cams 270c, shown in Figure 29, controls the operation of the punch drive motor 161 shown in Figure 29, by means of the microswitch 271-1 and reinforces the voltage delivered to the motor in a manner hereinafter described.

Microswitch 272-1, which is controlled by cam 270a, shown in Figures 28 and 29a, holds in the signal to the No. 2, 3 punch drive motor, from the 60 cycle line, during the punching operation of the No. 2, 3 punch drive motor, thereby enabling the No. 2, 3 punch drive motor 161 to complete its punching stroke.

As shown in Figures 28 and 29, a single punch drive motor 161 is used to control the punching operation of the No. 2 and 3 punches, 140, 141 simultaneously.

At the completion of the punching operation, the cam 270a trips a microswitch 272-1, which engages the advance motor 108, which drives the plate gear 117, which in turn drives the rack drive gear 132, shown in Figures 16, 22 and 23, which meshes with the teeth in the card guide control rack 131 in the manner shown in Figures 18 and 23, and hereinafter described in greater detail. The rotation of the gear 132, which is co-ordinated with the intermittent rotational angular movement of the index plate, moves the card guide control rack 131, the card guide and the record cards fitted thereto through a vertical distance equal to the spacing between the horizontal lines in the right-hand columns 135 shown on the record cards 128, Figure 12, which indicates a 5° angular movement of the synchro rotor shaft.

When the synchro rotor shaft 32 is moved into the 5° angular rotation position, relative to the starting position thereof, the servo mechanism and the circuitry controlled thereby are moved into a position to perform the angle error tests, in which the circuit and block diagram shown in Figures 37 and 38 are used.

In the angle error test at the 5° synchro rotor shaft position, a resistance bridge 275 mounted on the forward face of the switch support disc 183, and shown in detail in the drawing Figure 33 and hereinafter described in greater detail, is tied to the rotor of the synchro. At the 5° angular synchro shaft position, the wiper used in conjunction with the radially positioned elements 275a, 275b, of the resistance bridge is located at a 5° angle relative to the starting position of the synchro rotor shaft 32.

The output of the resistance bridge feeds the A-1 servo amplifier 219 which supplies the voltage to the synchro and the punch drive motor.

At each angular position of the synchro rotor shaft, the rotor shaft 32 of the synchro is rotated or jogged until zero voltage is fed to the A-1 servo amplifier 219 by means of the resistance bridge 275.

The rotor shaft of the synchro is tied to the No. 1 punch 136 in a manner hereinafter described.

The rotor shaft of the synchro is rotated or angularly jogged at each angular synchro rotor shaft position, until zero voltage is fed to the A-1 amplifier 219.

During the jogging motion of the synchro rotor shaft the damping action of the synchro reduces the time required for obtaining a zero voltage feeding to the A-1 amplifier 219.

The A-1 amplifier 219 shown in the block diagram, Figure 40 controls the movement of the No. 1 punch 136.

The cycle of operation of the angle error test is repeated at 5° synchro rotor shaft angular intervals until the synchro rotor shaft reaches an angular position of 30°.

At the 30° synchro rotor shaft angle position, the transformation ratio and phase shift of the synchro are measured, using the circuits and block diagrams shown in Figures 40 and 41.

When the index plate 55 advances, one of the actuator pins attached to the plate gear 117, disengages one of the microswitches in one of the radially positioned banks of microswitches 187, 188, 189 or 190, 191, 192 attached to the switch support disc 183, as shown in Figures 7, 9, 10 and 11, the particular switch engaged by one of the actuator pins depending upon the angular position of the index plate 55, and the plate gear 117, which is co-ordinated therewith.

Opening of the microswitch disengages the relays associated with the microswitch and transfers the measuring circuitry back to the angle error test.

The angle error test is continued at 5° synchro rotor shaft angle increments until the 60° synchro rotor shaft angle position is reached.

The microswitches which transfer the circuitry to the fundamental null and the R.M.S. null tests, shown in the block diagrams 36 and 39 respectively, and the cams which control them, are substantially the same as those used at the 0° synchro rotor shaft angle position, as shown in Figures 7, 8, 9, 11, 24 and 27, and hereinbefore described.

At that point 60° synchro rotor shaft angle position, the cams shown in Figures 26 and 27, transfer the operation by means of the microswitches to the fundamental null and R.M.S. null tests, shown in the block diagrams and circuits shown in Figures 36 and 39, after the completion of which the angle error tests are continued until the 115° synchro rotor shaft angle position is reached.

When the punch mark of any test shown on the record cards 128 indicates that the synchro under test does not meet the required specifications of the particular test conducted, and the synchro is therefore rejected, the operator may press the lever 276a of the re-cycle switch 276 shown at the upper right-hand corner, Figure 1, thereby allowing the apparatus to go through its cyclical sequences without punching the record cards, or actually completing the subsequent tests normally required.

This reduces the time required for the apparatus to complete its operating cycle and move the record cards 128 mounted in the card guide to their upper positions, with the card guide 129 at the upper end of its stroke, thus preparing the machine for the insertion of a new set of record cards, and the mounting of a new synchro to be tested.

The re-cycle switch 276 reduces sharply the time required for completing a specific cycle, as no punching or punch carriage movement is required at each angular increment of the synchro rotor shaft rotation during the test.

Where a retest is desired at any angular position or series of angular positions of the synchro rotor shaft, the recycle switch may be operated in the same manner as that hereinbefore described, in conjunction with a rejected test, the cycle continuing without punching, until the desired angular position of the index plate and the synchro rotor shaft is approached, after which the test may again be started in the conventional manner at that point, the testing and punching operations being continued until the desired angular range of the synchro rotor shaft has been traversed, after which the recycling switch can again be operated, the cycle continuing without punching until the synchro rotor shaft again reaches the starting position.

A window 277 is provided in the forward wall of the case 35 of the testing apparatus, as shown in Figure 1, a circular segmental dial 278 being mounted behind the window, the rotational angular movement of the circular segmental dial being co-ordinated with the rotational angular movement of the synchro rotor shaft relative to the synchro stator, with a fixed pointer 279 in engagement with the outer circumference of the circular segmental dial, the pointer indicating the angular position of the rotor shaft 32 of the synchro, and the index plate 55, which is co-ordinated therewith, relative to the starting position of the synchro rotor shaft.

*Switching circuit—Switching and starting*

Portions of the switching circuit showing the method of connecting the various switches used in conjunction with the synchro testing apparatus and the actual microswitches used therewith, as well as the means for supporting and actuating the microswitches are shown in Figures 7, 9, 10 and 11, the microswitches, or snap-action switches used for controlling the punching operations being shown in Figures 18, 19, 26, 27, 28 and 29.

After a set of record cards is inserted into the card guide 129, the record cards are pressed downward by the operator, the card guide 129, in which the record cards 128 are fitted, being moved downward simultaneously, until the pin 133 attached to the rack 131, shown in Figures 22 and 23, engages the actuator lever 134a of the microswitch 134, thereby actuating the microswitch 134.

*Nulling and punch sequence for angle error tests*

After the operation of the No. 1 punch drive motor 160 shown in Figures 26 and 27 is started, the limit switch 256–1 shown in Figures 26 and 27, retains the current in the No. 1 punch drive motor 160 until the punching cycle controlled by the motor is completed.

The fixed phase voltage circuit is opened by microswitch 256–1 which is shown in Figures 26 and 27.

Microswitches 257–1, 257–2 which are also shown in Figures 26 and 27, send false error signals to release the A–1 and A–2 null relays in order to remove the punch drive signals.

A momentary advance signal to advance the motor gate is sent by microswitch 260–1, which is shown in Figures 26 and 27a.

Microswitch 260–2 shown in Figures 26 and 27a, locks out the reference transformer supply and sends a momentary lock-in signal to the K–8 and K–9 relays.

At 0°, 30°, and 60°, microswitch 260–1 has no effect, as at the 0° and 30° synchro shaft angle positions, the advance gate is opened by microswitch No. 187–1 which is shown in Figures 7 and 9.

When the No. 1 punch drive motor 160 has completed the number of revolutions required to complete the punching operation of the No. 1 punch, limit switch No. 256–1 opens the circuit to end the No. 1 punch stroke.

*Current, power, transformation ratio, phase shift and null tests*

The K–8 and K–9 relays are locked in by a locking signal from microswitch No. 260–2 during the No. 1 punch stroke.

At 0°, 30° and 60° synchro shaft angles and every 60° thereafter, the relay is locked in through switch No. 187–2, which is shown in Figures 7 and 9. At all other angles, the lock-in signal has no effect.

The K–9 relay transfers the punch drive path to the No. 2, 3 punch drive motor 161.

The No. 2 and No. 3 servos drive to null.

When both the A–1, 219, and A–2, 224 relays operate, the 60° cycle power is transferred to the No. 2, 3 punch drive motor 161.

The No. 2, 3 punch drive motor 161, shown in Figures 28 and 29 and in the block diagrams, Figures 36, 37, and 40 operates.

The limit switch 272–1 shown in Figures 28 and 29a holds in the No. 2, 3 punch drive from the 60° cycle line.

The No. 1, 2 and 3 fixed phase voltage is opened by switch 272–2 shown in Figures 28 and 29a.

A momentary advance signal is sent to advance the motor by switch 271–1 shown in Figures 28 and 29.

Relay K–16 which operates during advance, sends a false error signal to release the A–1 and A–2 null relays in order to remove the punch drive signal.

Switch 271–2 sends a lock-out signal to the K–2 relay. This signal is ineffective, except at 360° when the K–2 relay is held in only through the lock-in path. At 360°, the K–2 relay is locked out and cuts off the fixed phase voltage, punch drive and relay common to end the test.

No. 1, 2 and 3 fixed phase voltage is returned at the end of the stroke.

The limit switch No. 272–1 shown in Figures 28 and 29a cuts out the No. 2, 3 punch drive to end the stroke. The No. 2 punch drive will complete its stroke at 360°, since the limit switch No. 272–1 holds in the power from the 60° cycle line.

Advance sequence

Advance motor 108 receives a momentary advance signal from the No. 1 or No. 2, 3 punch drive through microswitch 260–1, shown in Figures 26 and 27a or microswitch 271–1 shown in Figures 28 and 29.

Advance motor 108 operates.

At 0° synchro rotor shaft position, limit switch 281–2 shown in Figure 4, closes and holds in relay K–2, through parallel control path until microswitch 189–1 attached to the switch support plate 183 shown in Figures 7 and 10 takes over after indexing the index plate 55 to the 5° synchro rotor shaft angle position.

From the 5° synchro rotor shaft angle position, through 355°, the K–2 relay is held in by switch 189–1 and switch 281–2 has no effect.

Limit switch 282–1 holds in the K–16 relay.

Advance power held in by the K–16 relay.

A false error signal is sent to A–1 and A–2 null circuits to release the A–1 and A–2 null relays 219, 224 and remove the punch drive signal.

The reference transformer power is cut off while advancing.

The tangent arm ball 81 lifts out of the circumferential slot 56, 56a around the index plate 55 shown in Figures 3 and 4.

The Geneva pin 121 shown in Figures 3 and 42 is engaged and indexes the rotor shaft 32 of the synchro under test, the delta bridge, and the card guide 129, which supports the record cards, as shown in Figures 22 and 23, to the next angular synchro rotor shaft position.

At 0° synchro rotor shaft angle position, the card guide rack microswitch 134, shown in Figure 22, is released and locks out starting relay K–1, but fixed phase voltage and punch drive and relay common remain on through parallel operation of the K–2 relay.

Appropriate relays K–3, K–4, K–5, K–6, K–7 or K–9, are operated or released depending upon the angular position of the index plate and consequently the angular position of the actuator pin support plate gear 117 and the switch actuator pins 168, 169, 170, 171 shown in Figures 7, 9, 10 and 11, which control the operation of the radially positioned microswitches, 187–1, 187–2, 187–3 shown in Figures 7 and 9, switch 189–2 shown in Figures 7 and 10, switches 188–1, 191–1, 190–1, shown in Figure 7, and switch 192–1 shown in Figures 7 and 11.

The tangent arm ball 81 shown in Figures 3 and 4 returns into one of the circumferential slots 56, 56a around the index plate 55, shown in Figures 3 and 4.

Limit switch 281–2 releases parallel control path to relay K–2, but relay K–2 remains operated, since switch 189–1 shown in Figure 7, is either closed, for index plate positions of 5° through 355°, or locked in through switch 271–2 shown in Figures 28 and 29, at 360°.

Limit switch 281–1 releases relay K–16.

The A–1 relay input signal is returned.

False error signal is removed from A–1 and A–2 null circuits.

Advance motor power is cut off to end the advance stroke.

After the No. 4 servo has driven the synchro transformer to null, the operating cycle repeats from the nulling and punch sequence at 0° synchro shaft angle position, until relay K–2 is locked out at 360° synchro rotor shaft position.

Figures 30 and 31 show the punch positioning motors 157 and 158, and the gear trains provided to rotate the left-hand lead screws 153, 154, in order to longitudinally position the punch carriages or punch blocks 143, 144, which support the No. 2 and 3 punches 140, 141 as shown in Figure 16.

The two gear trains shown in Figures 30, 31 are each driven by a punch positioning motor 157, 158, each motor having a toothed rotor shaft 157a, 158a projecting beyond the flange thereof, each shaft 157a, 158a meshing with and driving a gear 284, 285, which is fixedly attached to a shaft 286, 287, each of which is supported by a pair of ball bearings, which are mounted in a pair of parallel plates 288, 289, shown in Figure 31, the plates being separated by a plurality of spacers in the same manner as those shown in Figures 25, 25a.

A pinion 290, 291 is mounted on each of the shafts 286, 287, adjacent the gear 284, 285 and co-axial therewith, each pinion 290, 291 driving an anti-backlash spring-loaded gear 292, 293, which is attached to the projecting shaft of a potentiometer 295, 296, each of which is supported by one of the plates 288, in a position substantially parallel to the axis of the corresponding punch positioning motor 157, 158.

Thus each punch positioning motor 157, 158 drives a mating potentiometer 295, 296 at a reduced speed, the speed reduction being accomplished by the planetary gear trains shown in Figures 30 and 31.

The planetary gear train driven by the punch positioning motor 158 also drives a gear 297, which meshes with a pinion 159 attached to the left-hand end of the No. 3 lead screw 154, shown in Figures 16 and 17, thereby co-ordinating the longitudinal movement of the punch block 144 which supports the No. 3 punch with the rotation of the No. 3 punch positioning motor 158.

In the same manner, the planetary gear train driven by the No. 2 punch positioning motor 157, drives a corresponding gear, which meshes with a pinion attached to the left-hand end of the No. 2 lead screw 153, in the same manner as that shown in Figure 17, thereby co-ordinating the longitudinal movement of the punch block 143, which supports the No. 2 punch 140 with the rotation of the No. 2 punch positioning motor 157.

Figures 26, 27 and 27a show the motor and gear train which are used to drive the No. 1 punch, and to actuate the microswitches used to control the operation of the No. 1 punch drive motor and the No. 1 punch positioning motor.

The apparatus shown in Figures 26 and 27 is driven by a servo motor 160, which has a toothed rotor shaft 298 projecting beyond the flanged end thereof, the shaft meshing with and driving a gear 299, which is mounted on a shaft 300, substantially parallel to the motor shaft 298, the shaft being supported by a pair of anti-friction bearings, which are in turn supported by a pair of substantially parallel plates 301, 302, as shown in Figures 26 and 27.

An auxiliary pinion 303, mounted on the shaft 300 coaxially with the gear, drives an intermediate shaft 304, which is substantially parallel to the shaft 300, the intermediate shaft having an intermediate pinion 305 attached thereto, which meshes with a cam drive gear 306, which is mounted on a cam support shaft 307, which is located substantially parallel to the shaft 300 and supported by a pair of anti-friction bearings which are fitted to the parallel plates 301, 302 in the same manner as the shaft 300.

The cam support shaft 307 projects beyond the outer plate 302 as shown in Figure 27, a plurality of plate cams 254a, 254b, 254c being fixedly attached to the shaft 307, the cams 254a, 254b, 254c being substantially parallel to the outer plate.

Adjacent the cams 254a, 254b, 254c, a plurality of banks of microswitches 256–1, 256–2, 257–1, 257–2 and 260–1, 260–2 are mounted, as shown in Figures 26, 27 and 27a, one bank shown in Figure 27 consisting of two pair of microswitches 256–1, 256–2, 257–1, 257–2, which are located in abutting relationship adjacent the outer surface of the plate 302.

Each microswitch 256–1, 256–2, 257–1, 257–2 has an actuator arm 308 pivotally attached thereto, the actuator arm being angularly directed toward the corresponding cam 254a, 254b, 254c, as shown in Figure 26.

Each pair of actuator arms 308, 308a of each pair of abutting microswitches 256–1, 256–2 and 257–1, 257–2 has an actuator roller 309 rotatably attached thereto, the actuator roller 309, 309a, being aligned with the outer cam 254a or the inner cam 254c, so that each pair of microswitches 256–1, 256–2 and 257–1, 257–2 is simultaneously actuated by the same cam 254a or 254c and controlled by the same actuator roller 309 or 309a.

Each actuator roller is operative to engage the circumferential cam surfaces of the adjacent cam 254a, 254c to force the actuator arms 308, 308a of the pair of microswitches toward their respective cases, thereby forcing a plunger 310, which is reciprocatingly fitted to each of the microswitches, inward toward the case of the microswitch and in that manner activating the microswitch 256–1, 256–2, 257–1 and 257–2.

The operation and method of connecting the microswitches 256–1, 256–2, 257–1 and 257–2 to the motor 160 and the other parts of the apparatus was hereinbefore described in detail.

The shaft 250 which operates the No. 1 punch 145 in the manner shown in Figure 32, is driven by the gear train shown in Figures 26 and 27, so that the motor 160 actually controls the operation of the punch shown in Figure 32, in the manner hereinbefore described.

The microswitches 260–1, 260–2 shown in Figure 27a, are supported by the outer plate 302 in substantially the same manner as the microswitches shown in Figure 27, the microswitches 260–1, 260–2 being angularly located relative to the cams 254a, 254b, 254c, in the relative positions shown in Figure 26.

A switch spacer 311 is located adjacent the outer plate 302, shown in Figures 27 and 27a, the two microswitches 260–1, 260–2 being located beyond the spacer 311 and substantially parallel to the outer plate 302.

Each microswitch 260–1, 260–2 has an actuator arm 308, 308a pivotally attached thereto in the same manner as the microswitches shown in Figure 27, a common roller 312 being rotatably supported by each pair of actuator arms 308, 308a, the common roller 312 being aligned with the central cam 254b, so that both microswitches 260–1 and 260–2 are operated simultaneously by the rotation of the same cam 254b.

The microswitchs 260–1, 260–2 are controlled and energized in the same manner as the microswitches 257–1, 257–2, 256–1, 256–2 shown in Figure 27, the microswitches 260–1 and 260–2 both being controlled by the central cam 254b.

Figures 28, 29 and 29a show the motor and gear train which are used to drive the No. 2 and 3 punches 140, 141, in substantially the same manner as those shown in Figures 26, 27 and 27a. The motor and gear train are also used to drive the cams which actuate the microswitches used to control the operation of the No. 2 and 3 punch drive motor 161 and the No. 2 and 3 punch positioning motors 157, 158.

The apparatus shown in Figures 28 and 29, is driven by a servomotor 161, which has a toothed rotor shaft 313, co-axial therewith and projecting beyond the flange thereof, the shaft meshing with and driving a gear 314, which is mounted on a shaft 315, substantially parallel to the motor shaft 313, the shaft being supported by a pair of anti-friction bearings, which are in turn supported by a pair of substantially parallel plates 316, 316a.

An auxiliary pinion 317 mounted on the shaft 315, co-axially with the gear 314, drives an intermediate shaft 318, which is substantially parallel to the shaft 315, the intermediate shaft having an intermediate pinion 319 attached thereto, which meshes with and drives a cam drive gear 320, which is mounted on a cam support shaft 321, which is located substantially parallel to the shaft 315 and supported by a pair of anti-friction bearings which are fitted to the parallel plates 316, 316a.

The shaft 321 projects beyond the outer plate 316, as shown in Figure 29, a plurality of plate cams 270a, 270b, 270c being fixedly attached to the shaft 321, the plate cams 270a, 270b, 270c being substantially parallel to the outer plate 316.

Adjacent the cams 270a, 270b, 270c, a pair of banks of microswitches 271–1, 271–2 and 272–1, 272–2 is mounted, as shown in Figures 28 and 29, one bank of microswitches, shown in Figure 29, consisting of two microswitches 271–1, 271–2, which are located adjacent the outer plate 316, the other bank having a pair of microswitches 272–1, 272–2 which are separated from the outer plate 316 by a spacer 322, which is mounted adjacent the outer surface of the outer plate 316.

Each microswitch shown in Figures 29 and 29a has an actuator arm 323 pivotally attached thereto, the actuator arms being angularly directed toward the cams 270a, 270b, 270c shown in Figure 28.

In the microswitches shown in Figure 29, each actuator arm 323, 323a of each microswitch 271–1, 271–2 has an actuator roller 324 rotatably attached thereto, the actuator roller 324 being aligned with and in engagement with the inner cam 270c, so that both microswitches 271–1, 271–2 are simultaneously activated by the cam 270c, and controlled by a common actuator roller 324.

In the microswitches 272–1, 272–2 shown in Figure 29a, each microswitch 272–1, 272–2 has an actuator arm 323b, 323c pivotally attached thereto, in the same manner and angular relation as those shown in Figures 28 and 29.

Each actuator arm 323b, 323c has an individual actuator roller 325, 325a rotatably fitted to the outer end thereof, the individual actuator rollers 325, 325a being aligned with and individually in engagement with the outer cams 270a, 270b as shown in Figure 29a.

Each actuator roller 324, 325, 325a is operative to engage the circumferential cam surface of the adjacent cam to force the individual actuator arm 323b, 323c, or the pair of actuator arms 323, 323a, of the microswitches, toward their respective cases, thereby forcing the plunger 310, which is reciprocatingly fitted to each of the microswitches, toward the case of the microswitch, and in that manner activating the microswitches 271–1, 271–2, or 272–1, 272–2.

The operation and method of electrically connecting the microswitches 271–1, 271–2 or 272–1, 272–2 to the motor 161 and to the other parts of the apparatus was hereinbefore described in detail.

The shafts 250 which individually operate the No. 2 and 3 punches 140, 141, in the manner shown in Figure 32 and hereinbefore described, are driven by the gear train shown in Figures 28 and 29, so that one motor 161 controls the operation of the No. 2 and 3 punches 140, 141 shown in Figures 16 and 32 in the manner hereinbefore described.

The microswitches 272–1, 272–2 shown in Figure 29a are supported by the outer plate 316 in substantially the same manner as those shown in Figure 29. A spacer 322 is located adjacent the outer surface of the outer plate 316, shown in Figure 29a, the two microswitches 272–1, 272–2 in the bank being located beyond the spacer 322, so that the individual actuator arms 323b, 323c and the actuator rollers 325, 325c attached thereto are aligned with the outer plate cams 270a, 270b.

Figures 18 and 23 show the gear train, which drives the gear 132 which meshes with the teeth on the rack 131 to elevate the rack 131 and the card guide 129 to which it is attached, in co-ordination with the rotational angular movement of the index plate 55.

The tubular shaft 327 which supports the elevating gear 132 is substantially perpendicular to the forward wall of the case and supported by a pair of anti-friction bearings 328, 329, the forward bearing 328 being supported by a plate 330 attached to the forward wall of a card punch frame 331 which is fitted to the case 35, the rear bearing 329 which supports an auxiliary shaft 332 being mounted in a rear plate 333, which is substantially parallel to the forward wall of the card punch frame, right-hand, Figure 23.

A bevel crown gear 334, which is integral with the rear end of the tubular shaft 327, meshes with a mating movable crown gear 249 which is integral and in a cluster with a spur gear 336, the gear cluster being slidably supported by an enlarged section of the auxiliary shaft 332.

An extension 337 of the auxiliary shaft 332, which is supported by the interior of the tubular shaft 327, is fitted to the center of the tubular shaft 327, thereby coaxially aligning the auxiliary shaft 332 with the tubular shaft 327.

A coiled compression spring 338, which surrounds the auxiliary shaft 332 is mounted between a tubular collar 339 supported by the rear end of the auxiliary shaft 332 and the rear face of the spur gear 336, which is integral with the movable crown gear 249, the compression spring forcing the movable crown gear into engagement with the mating crown gear 334.

A spur gear 340, which is mounted on a shaft 341, which is substantially parallel to the tubular shaft 327 is driven by a gear train which is in turn driven by the advance motor 108, thereby co-ordinating the rotation of the spur gear 340 with the intermittent rotation of the Geneva wheel 112 and therefore the rotational angular positioning of the index plate 55.

The shaft 341 is located between the plates 330 and 333 and trunnioned in a pair of anti-friction bearings 343, 343a fitted to the plates 330, 333 in the same manner as the bearings 328, 329 supporting the tubular shaft 327, and the auxiliary shaft 332.

A pinion 344 integral with the shaft 341 meshes with a gear 345 which is mounted on an intermediate shaft 346, which is substantially parallel to the tubular shaft 327. The intermediate shaft 346 is also supported by a pair of anti-friction bearings 347 which are individually fitted to the plates 330 and 333.

A pinion 348 integral with or attached to the intermediate shaft 346, meshes with the spur gear 336 which is in a cluster with the movable crown gear 249, thereby driving the spur gear 336 and the movable crown gear 249.

In that manner the rotation of the spur gear 340 which is driven by the advance motor, through a reduction gear train, drives the intermediate shaft 346, the tubular crown gear support shaft, and therefore the gear 132 which meshes with the teeth in the rack 131.

Because of the multiple reductions between the shaft 341 and the tubular shaft 327, the angular movement of the elevating gear 132, which meshes with the teeth in rack 131, is considerably less than that of the spur gear 340 which is driven by the advance motor 108.

As the advance motor 108 directly controls the rotation of the Geneva wheel 112 and therefore the rotational angular positioning of the index plate and the synchro shaft 32 which is directly co-ordinated therewith, the rotational angular movement of the spur gear 340 is directly co-ordinated with the rotational angular positioning of the index plate 55.

In that manner the elevation of the record cards 128, through one line space in the punch area 135 shown on the record cards is exactly co-ordinated with the rotational angular movement of the index plate from one circumferential slot 56 to the adjacent circumferential slot 56a around the index plate, or an angular movement of 5°.

The pair of crown gears 334, 249 enables an operator to force the movable crown gear 249 out of engagement with the fixed crown gear 334, by moving the cluster including the crown gear 249 rearward, against the pressure of the coiled compression spring 338.

This enables the rack drive gear 132 to be rotated independently of the other gears in the train shown in Figure 23.

This enables the rack 131 and the card guide 129 to which it is attached to be moved downward, when the record cards are inserted into the card guide 129 at the start of a test, without disturbing the balance of the gear train.

As the movable crown gear is rotated into a position corresponding with the zero degree angular position of the synchro rotor shaft 32 at the start of a test, the rack drive gear 132 is automatically moved into a corresponding position, when the compression spring 338 is released, thereby allowing the compression spring 338 to force the teeth of the movable crown gear 249 into engagement with the fixed position crown gear 334.

As the card guide, supporting the record cards, is manually forced downward by the operator, to a point where the 0° angle punching position at the top of the record cards 128 is in alignment with the center of the No. 1 punch 136, the record cards are in their correct position for punching at the start of the test.

The face of the pinion 348 which meshes with the gear 336 integral with the movable crown gear 249 is sufficiently wide, so that even when the movable crown gear 249 is moved rearward, out of engagement with the fixed position crown gear 334, the pinion 348 remains in mesh with the gear 336, thus maintaining the required synchronization between the angular position of the index plate 55 and the movable crown gear 249 until the advance motor 108 is energized in the manner hereinbefore described.

As the rack drive gear 132 is moved into a position corresponding to the 0° angular position of the index plate by the movable crown gear 249, this automatically co-ordinates the record card position with the rotational angular position of the index plate 55, and the synchro rotor shaft, this relationship being maintained throughout the test cycle, as the gear 132 is continuously in mesh with the teeth in the rack 131, and the crown gears 249 and 334 continuously in mesh with one another after the test is started.

The movement of the movable crown gear 249 is controlled by the operator, who presses a button 248 marked "Push" at the front of the case, when the record cards are inserted into the card guide, thus enabling him to force the record cards and the card guide down to their starting position, without disturbing the gears co-ordinated with the index plate 55.

Figures 17 and 20 show a pair of guide blocks 350, 351 which are provided to guide the record cards 128 through the channels 130, 130a of the card guide 129, a slot 352 through the central portions of the guide blocks 350, 351 being in vertical alignment with the channels 130, 130a, thereby directly guiding the record cards toward the channels 130, 130a and therefore the card space between the punch body 264, and the die 266, located in alignment with the punch, as shown in Figure 20.

A beveled guide trough 353 is located at the upper end of the guide blocks 350, 351, in alignment with the slot 352, thereby guiding the set of record cards inserted by the operator, toward the slot 352 through the guide blocks and therefore the channels 130, 130a which support the record cards, the record cards being accurately aligned with the punch 145 and the die 266, thus facilitating accurate punching of the record cards 128.

The guide blocks 350, 351 are attached to an offset bracket 354 which is attached to the forward wall of the case 35, by a plurality of screws, or other suitable attaching means, thereby rigidly supporting the guide blocks 350, 351 and accurately aligning the slot 352 through the guide blocks 350, 351 with the record card support channels 130, 130a.

It will be apparent to those skilled in the art, that the present invention is not limited to the specific details described above and shown in the drawings, and that various modifications are possible in carrying out the features of the invention and the operation and the method of support, control, actuation, sequencing and utilization thereof, without departing from the spirit and scope of the appended claims.

What is claimed is:

1. A device for testing a synchro consisting of a substantially cylindrical stator, a rotor co-axial with the stator, the rotor having a shaft attached thereto projecting beyond one end of the stator, comprising a housing, a removable adapter attached to the housing for removably supporting the synchro stator, a tubular shaft mounted within the housing substantially co-axially with the shaft of the synchro rotor, means supported by the tubular shaft adapted to removably grip the synchro rotor shaft, a pivot member attached to the end of the tubular shaft, opposite the synchro rotor shaft gripping means, means attached to the housing adapted to receive and pivotally support the pivot member, a flexible support member attached to the tubular shaft adjacent the pivot member, a plurality of radially positioned clamps attached to the removable adapter, adapted to removably retain the synchro stator, manually controllable means adapted to progressively release the synchro stator clamps, and the synchro rotor shaft gripping means, to permit rotary adjustment of the synchro stator, while the rotor shaft thereof is held substantially stationary by the gripping means, a substantially circular index plate attached to the end of the tubular shaft near the pivot support means thereof, said index plate having a series of equally spaced, radially positioned slots around the outer circumference thereof, means selectively fitted to the index plate adapted to progressively rotatably displace said index plate through substantially equal angular increments corresponding with the spacing between the radial slots, a set of record cards adapted to record data determined by the synchro testing device, means for supporting and progressively locating the record cards, co-ordinated with the progressive angular position of the synchro rotor shaft, means controlled by the record card support and locating means adapted to control the flow of electrical current to the testing device, punch means adapted to indicate on the record cards, synchro test data determined by the testing device, means adapted to selectively, independently position the punching means, to selectively establish the recording positions relative to the record cards, and means adapted to actuate the punching means to transfer the recording data to the record cards.

2. In combination with a synchro testing device, as in claim 1, an independently controlled mechanism having an actuating member selectively fitted to the circumferential slots around the index plate, adapted to introduce fine angular variations into the rotational angular position of the index plate and the synchro rotor shaft co-ordinated therewith, electrically controlled means adapted to control the operation of said index plate fine adjustment mechanism, at each established angular position of the index plate, means for transmitting to the punching mechanism, the differential between said synchro rotor shaft angular position and the corresponding electrically determined angular position thereof, means for co-ordinating the punch positioning mechanism relative to the record cards in conformity with said synchro rotor shaft angular differential, and means for punching said synchro rotor shaft differential on the record cards.

3. A device for testing a synchro consisting of a stator and a rotor having a projecting shaft attached thereto, coaxial with the rotor, comprising a removable member for supporting the synchro stator, with means fitted to said removable member adapted to independently grip the rotor shaft, manually controllable means co-ordinated with the stator support member, adapted to provide limited rotational movement of the synchro stator relative to the rotor shaft thereof, to establish the initial rotational angular relation between the synchro stator and the rotor shaft thereof, when the synchro is fitted to said support member, co-ordinated with electrically determined corresponding angular positions of said synchro rotor shaft relative to the stator thereof, recording means mounted in said testing device adapted to receive synchro test data determined by the testing device, means for adjustably supporting and locating said recording means, means controlled by the support and adjustment locating means of said recording means adapted to control the flow of current to the testing device, means adapted to indicate on said recording means, test data determined by said testing device, means adapted to selectively position said indicating means relative to the recording means to record thereon the differential between the angular position of the synchro rotor shaft and the electrically determined angular position thereof, and means operative to transfer said differential indication from the indicating means to the recording means.

4. In combination with a synchro testing device, as in claim 3, universally anuglarly adjustable synchronizing means adapted to connect the synchro shaft gripping means with the synchro rotor shaft progressive angular rotating means.

5. In combination with a synchro testing device, as in claim 3, an electrically controllable apparatus operative to angularly move the synchro rotor shaft angular adjustment means through fine increments to co-ordinate the angular position of the synchro rotor shaft with a predetermined nominal angular position at each angular increment thereof, and electrical means adapted to determine the differential angular position of the synchro rotor shaft relative to the nominal angular position thereof.

6. In combination with a synchro testing device, as in claim 3, a pair of differentially threaded cylindrical members coaxially aligned with one another, means individually threadably fitted to said differentially threaded members operative to angularly move the angular positioning means attached to the synchro rotor shaft, to establish a fine adjustment of said angular positioning means at each established angular position thereof.

7. In combination with a synchro testing device, as in claim 3, a substantially circular disc having a plurality of angularly positioned switches attached thereto mounted co-axially with the synchro rotor shaft, a gear member having a plurality of radially positioned switch control members fixedly attached thereto, mounted co-axially with the synchro rotor shaft, substantially parallel to and spacedly located relative to the circular disc, means operative to transfer the angular positions of the synchro rotor shaft angular positioning means to the switch control gear, the switch control members being adapted to selectively actuate the radially positioned switches co-ordinated with the angular position of the synchro rotor shaft angular positioning means.

8. A device for testing synchros, each of said synchros consisting of a substantially cylindrical stator and a rotor having a projecting shaft attached thereto, co-axial with the rotor, comprising a housing, a removable adapter attached to the housing for removably supporting the synchro stator, means co-ordinated with said removable adapter, adapted to independently grip the synchro rotor shaft, manually controllable means co-ordinated with the stator support adapter, adapted to provide limited rotational movement of the synchro stator relative to the rotor shaft thereof, to establish the initial rotational angular relation between the synchro stator and the rotor shaft thereof, when the synchro is fitted to said adapter, means co-ordinated with said removable adapter, adapted to independently grip the end of the synchro rotor shaft projecting beyond the synchro stator, means synchronized with the synchro rotor shaft support means adapted to progressively angularly rotate the synchro rotor shaft through substantially equal angular increments, means adapted to independently adjust the angular positioning means to introduce variations in the synchro rotor shaft rotational angular position, co-ordinated with electrically established corresponding angular positions of said synchro rotor shaft, relative to the stator thereof, recording means mounted in said housing adapted to record synchro test data determined by the synchro testing device, means for adjustably supporting and locating said recording means, means controlled by the support and adjustment means of said recording means adapted to control the flow of current to the testing device, means adapted to indicate on said recording means, test data determined by said testing device, means operative to selectively position said indicating means relative to the recording means to indicate thereon the differential between the adjusted angular position of the synchro rotor shaft, and the electrically determined angular position thereof, and means operative to transfer said differential angular position from the indicating means to the recording means.

9. An apparatus for testing synchros, as in claim 8, in which the recording means includes a set of record cards inserted in said testing apparatus, means for supporting and locating the record cards, a plurality of individually controlled punching mechanisms mounted adjacent the record cards, said punching mechanisms being adapted to punch in the record cards comparative indications determined by individual tests on the synchro, as determined by the testing apparatus, said record cards having punch areas indicated thereon designating specific locations at which results of specific tests are to be punched, co-ordinated with the rotational angular position of the synchro rotor shaft, relative to the stator thereof, the record card supporting and locating means being adapted to move the record cards vertically to align specific punch areas with the punching mechanism co-ordinated with a particular test, and an electrically controlled servo mechanism adapted to horizontally align a specific punch with the corresponding punch area on the record cards, the location of a specific punched hole on the record cards relative to a specific punch area thereon being adapted to indicate the variation of the results of a specific test from the nominal value thereof.

10. A device for testing synchros, as in claim 8, in which the means adapted to progressively angularly rotate the synchro rotor shaft includes a rotatably supported index plate having a plurality of equally spaced radially positioned slots around the outer circumference thereof, a rotatably supported disc having a plurality of radially positioned slots therethrough mounted adjacent and substantially parallel to the rotatably mounted index plate, the location of individual slots through the slotted disc at predetermined rotational angular positions of the disc being co-ordinated with the location of individual radially positioned circumferential slots around the index plate, means adapted to drive the slotted disc, and a pivotally supported pendulum having a portion thereof adapted to selectively fit into one of the radially positioned slots through the slotted disc, and one of the radially positioned circumferential slots around the index plate, operative to transmit the rotational angular movement of the radially slotted disc to the rotatably supported index plate to progressively angularly move the synchro rotor shaft through substantially equal angular increments.

11. A device for testing synchros, as in claim 8, in which the means operative to progressively angularly rotate the rotor shaft, includes a substantially circular index plate attached to the rotor shaft gripping means, located substantially co-axially with the axis of the rotor shaft, said index plate having a plurality of equally spaced radially positioned slots around the outer circumference thereof, a pivotally supported member adapted to progressively fit into the radially positioned slots around the index plate to progressively establish the rotational angular position of the index plate, relative to the starting position thereof, means adapted to move the pivotally supported member from one circumferential slot around the index plate, to the adjoining slot therethrough to progressively angularly rotate the synchro rotor shaft through substantially equal angular increments.

12. An apparatus for testing electrically operated units, each of which consists of a stator and a rotor, the rotor having a projecting shaft attached thereto, co-axial with the rotor; comprising a detachable member including means for supporting the stator, and independent rotatable means adapted to removably grip the rotor shaft, a tubular shaft mounted within the housing substantially co-axially with the shaft of the synchro rotor, means supported by the tubular shaft adapted to removably grip the synchro rotor shaft, a pivot member attached to the end of the tubular shaft, opposite the synchro rotor shaft gripping means, means adapted to receive and pivotally support the pivot member, a flexible support member attached to the tubular shaft adjacent the pivot member, a plurality of radially positioned clamps attached to the removable adapter, adapted to removably retain the synchro stator, manually controllable means adapted to progressively release the synchro stator clamps, and the synchro rotor shaft gripping means, to permit rotary adjustment of the synchro stator, while the rotor shaft thereof is held substantially stationary by the rotor shaft gripping means, a substantially circular index plate attached to the end of the tubular shaft near the pivot support means thereof, said index plate having a series of equally spaced, radially positioned slots around the outer circumference thereof, means selectively fitted to the index plate adapted to progressively rotatably displace said index plate through substantially equal angular increments corresponding with the angular spacing between the radial slots, a set of record cards to record test data determined by the testing apparatus, means for adjustably supporting and progressively locating the record cards, switch means controlled by the record card support and locating means operative to control the flow of current to the testing apparatus, a plurality of independently controlled and positioned punching units mounted adjacent the record cards, adapted to indicate on said record cards test data relating to the electrically operated unit, as determined by the testing apparatus, means adapted to selectively position the punching units, to selectively establishing the recording positions relative to the record cards, said punching units being adapted to transfer the recording data from the indication means.

13. In combination with an apparatus for testing electrically operated units, as in claim 12, a servo mechanism adapted to transfer the variations from the nominal angular position of the rotor shaft of the electrically operated unit, to the actual electrically determined angular position thereof at progressive angular increments, to the punching mechanism, the relative location of the punch marks on the record cards, as established by said punching mechanism being adapted to visually indicate the variations in angular rotor shaft position from the nominal at each angular increment.

14. An apparatus for testing synchros, each of said synchros consisting of a substantially cylindrical stator, and a rotor having a projecting shaft attached thereto, co-axial with the rotor, comprising a housing, a removable adapter attached to the housing for removably supporting the synchro stator, a tubular shaft mounted within the housing substantially co-axially with the shaft of the synchro rotor, means supported by the tubular shaft adapted to removably grip the synchro rotor shaft, a pivot member attached to the end of the tubular shaft, opposite the synchro rotor shaft gripping means, means attached to the housing adapted to receive and pivotally support the pivot member, a flexible support member attached to the tubular shaft adjacent the pivot member, a plurality of radially positioned clamps attached to the removable adapter, adapted to removably retain the synchro stator, manually controllable means adapted to progressively release the synchro stator clamps, and the synchro rotor shaft gripping means, to permit rotary adjustment of the synchro stator, while the rotor shaft thereof is held substantially stationary by the gripping means, a substantially circular index plate attached to the end of the tubular shaft near the pivot support means thereof, said index plate having a series of equally-spaced, radially positioned slots around the outer circumference thereof, means selectively fitted to the index plate adapted to progressively rotatably displace said index plate through substantially equal angular increments corresponding with the spacing between the radial slots, an independently controlled mechanism having an actuating member selectively fitted to the circumferential slots around the index plate, adapted to introduce fine angular variations into the rotational angular position of the index plate and the synchro rotor shaft co-ordinated therewith, electrically controlled means adapted to control the operation of said index plate fine adjustment mechanism, at each established angular position of the index plate, a plurality of record cards mounted in the testing apparatus adapted to record synchro test data determined by the synchro testing apparatus, means for adjustably supporting and progressively locating the record cards, means controlled by the support and progressive locating means of the record cards operative to control the flow of current to the synchro testing apparatus, adjustable means adapted to indicate on said record cards, test data determined by the synchro testing apparatus, mounted adjacent the record cards, means adapted to selectively position the indicating means, to selectively establish the recording positions relative to the record cards, and means operative to transfer the recording data from the indicating means to the record cards.

15. An apparatus for testing synchros, each of said synchros consisting of a substantially cylindrical stator, and a rotor having a projecting shaft attached thereto, co-axial with the rotor, comprising a housing, an adapter removably attached to the housing for removably supporting a synchro stator, clamping means attached to the adapter adapted to retain the synchro stator in engagement with the adapter, a tubular shaft mounted within the housing substantially co-axially with the shaft of the synchro rotor, a collet supported by the tubular shaft adapted to removably grip the projecting portion of the synchro rotor shaft, manually controllable means adapted to progressively release the synchro stator clamping means and the synchro rotor shaft support collet, said manually controllable means being adapted to progressively release the clamping means supporting the synchro stator, and the collet gripping the synchro rotor shaft, to permit rotational adjustment of the synchro stator relative to the rotor shaft thereof, while the synchro rotor is held substantially stationary, and insertion into and removal of the synchro stator and the rotor shaft thereof relative to the adapter and the collet respectively, while both the synchro stator clamps and the rotor support collet are in their released position, the adapter assembly being interchangeable to permit varying sizes of synchro stator, and correspondingly varying sizes of synchro rotor shaft to be selectively fitted to the test apparatus by interchanging the adapter assembly and the synchro shaft collet co-ordinated therewith, index means attached to the tubular shaft adapted to establish and progressively vary the angular relation between the synchro rotor shaft and the stator thereof, a set of record cards adapted to record data determined by the testing apparatus, means for supporting and progressively locating the record cards, co-ordinated with the angular position of the synchro rotor shaft relative to the stator thereof, punch means adapted to indicate on the record cards, synchro test data determined by the testing apparatus, and means adapted to selectively individually locate the punching means, co-ordinated with the momentary position of the record cards.

16. An apparatus for testing synchros, as in claim 15, in which the tubular shaft, coaxial with the synchro rotor shaft, has a substantially spherical segmental pivot member attached thereto, means attached to the housing having a substantially spherical segmental seat therein adapted to pivotally support the pivot member, a flexible diaphragm attached to the tubular shaft near the pivot member, a plate member attached to the housing adapted to support the flexible diaphragm, said pivot member and the flexible diaphragm attached to the tubular support shaft being adapted to allow some angular variation between the axis of the synchro rotor shaft and the axis of the pivot member, without affecting the rotation of the index plate.

References Cited in the file of this patent

UNITED STATES PATENTS

| | | |
|---|---|---|
| 2,625,599 | Downes | Jan. 13, 1953 |
| 2,675,542 | Kress | Apr. 13, 1954 |
| 2,811,692 | Ebbs | Oct. 29, 1957 |
| 2,817,971 | Gruber | Dec. 31, 1957 |